United States Patent
Sun et al.

(10) Patent No.: US 11,582,071 B2
(45) Date of Patent: Feb. 14, 2023

(54) SOUNDING REFERENCE SIGNAL WAVEFORM DESIGN FOR WIRELESS COMMUNICATIONS

(71) Applicant: QUALCOMM Incorporated, San Diego, CA (US)

(72) Inventors: Jing Sun, San Diego, CA (US);
Xiaoxia Zhang, San Diego, CA (US);
Kapil Bhattad, Bangalore (IN);
Tanumay Datta, Bangalore (IN)

(73) Assignee: QUALCOMM Incorporated, San Diego, CA (US)

(\*) Notice: Subject to any disclaimer, the term of this patent is extended or adjusted under 35 U.S.C. 154(b) by 0 days.

(21) Appl. No.: 16/828,368

(22) Filed: Mar. 24, 2020

(65) Prior Publication Data

US 2020/0313932 A1 Oct. 1, 2020

(30) Foreign Application Priority Data

Mar. 28, 2019 (IN) .............................. 201941012233

(51) Int. Cl.
*H04L 12/28* (2006.01)
*H04L 25/02* (2006.01)
(Continued)

(52) U.S. Cl.
CPC ........ *H04L 25/0226* (2013.01); *H04L 5/0007* (2013.01); *H04L 5/0048* (2013.01);
(Continued)

(58) Field of Classification Search
CPC ............. H04L 25/0224; H04L 25/0226; H04L 5/0007; H04L 27/2613; H04L 27/266;
(Continued)

(56) References Cited

U.S. PATENT DOCUMENTS 7,542,504 B2 6/2009 Chang et al.
8,000,273 B2 8/2011 He et al.
(Continued)

FOREIGN PATENT DOCUMENTS

CN 105164930 A 12/2015
EP 2418887 A2 2/2012
(Continued)

OTHER PUBLICATIONS

Indian Patent Application No. 201941012233, filed Mar. 28, 2019, 102 pages.
(Continued)

*Primary Examiner* — John Pezzlo
(74) *Attorney, Agent, or Firm* — Holland & Hart LLP

(57) ABSTRACT

Techniques and devices for wireless communications are described that provide for staggering sounding reference signal (SRS) transmissions in frequency across multiple orthogonal frequency division multiplexing (OFDM) symbols, which may allow multiple UEs to transmit SRS using a common listen-before-talk (LBT) gap for a LBT procedure. The techniques also provide for transmitting an SRS across multiple OFDM symbols using same frequency resources, and an orthogonal cover code (OCC) may be applied to the SRS transmission of each OFDM symbol, which may allow multiple UEs to transmit concurrent SRS using a common LBT gap.

28 Claims, 23 Drawing Sheets

(51) Int. Cl.
*H04L 5/00* (2006.01)
*H04W 74/08* (2009.01)
*H04L 27/26* (2006.01)
*H04J 1/16* (2006.01)

(52) U.S. Cl.
CPC ........ *H04L 5/0051* (2013.01); *H04L 27/2605* (2013.01); *H04L 27/2613* (2013.01); *H04W 74/0808* (2013.01); *H04L 27/26132* (2021.01)

(58) Field of Classification Search
CPC ............. H04W 24/10; H04W 72/0453; H04W 72/0413; H04B 17/318
USPC ........................................ 370/252, 329, 430
See application file for complete search history.

(56) References Cited

U.S. PATENT DOCUMENTS

| | | | |
|---|---|---|---|
| 8,254,329 | B2 | 8/2012 | Ko et al. |
| 8,254,344 | B2 | 8/2012 | Akita et al. |
| 8,428,157 | B2 | 4/2013 | Kakura et al. |
| 8,654,727 | B2 | 2/2014 | Dai et al. |
| 8,675,752 | B2 | 3/2014 | Lahtonen et al. |
| 8,718,001 | B2 | 5/2014 | Zhang et al. |
| 8,750,870 | B2 | 6/2014 | Palanki et al. |
| 8,855,068 | B2 | 10/2014 | Qin et al. |
| 9,036,538 | B2 | 5/2015 | Palanki |
| 9,326,283 | B2 | 4/2016 | Shin et al. |
| 9,369,250 | B2 | 6/2016 | Liu |
| 9,763,251 | B2 | 9/2017 | Papasakellariou et al. |
| 9,794,039 | B2 | 10/2017 | Kwak et al. |
| 9,814,015 | B2 | 11/2017 | Xiao et al. |
| 9,913,239 | B2 | 3/2018 | Tinnakornsrisuphap et al. |
| 10,021,667 | B2 | 7/2018 | Akkarakaran et al. |
| 10,171,210 | B2 | 1/2019 | Gong et al. |
| 10,333,670 | B2 | 6/2019 | Rico Alvarino et al. |
| 10,736,074 | B2 | 8/2020 | Edge et al. |
| 2003/0215035 | A1 | 11/2003 | Amerga et al. |
| 2005/0271012 | A1 | 12/2005 | Agrawal et al. |
| 2006/0128416 | A1 | 6/2006 | Linebarger et al. |
| 2007/0002813 | A1 | 1/2007 | Tenny et al. |
| 2010/0130230 | A1 | 5/2010 | Aggarwal et al. |
| 2011/0003551 | A1 | 1/2011 | Kameno et al. |
| 2012/0021758 | A1 | 1/2012 | Gum et al. |
| 2012/0252487 | A1 | 10/2012 | Siomina et al. |
| 2013/0165052 | A1 | 6/2013 | Chuang |
| 2013/0324154 | A1 | 12/2013 | Raghupathy et al. |
| 2014/0073356 | A1 | 3/2014 | Siomina et al. |
| 2014/0349582 | A1 | 11/2014 | Xiao et al. |
| 2015/0018010 | A1 | 1/2015 | Fischer |
| 2015/0063228 | A1 | 3/2015 | Aldana |
| 2015/0118678 | A1 | 4/2015 | Mandecki et al. |
| 2015/0124673 | A1* | 5/2015 | Ouchi ................. H04W 52/362 370/311 |
| 2015/0133173 | A1 | 5/2015 | Edge et al. |
| 2015/0188678 | A1 | 7/2015 | Wu et al. |
| 2015/0263837 | A1 | 9/2015 | Patel et al. |
| 2015/0289311 | A1 | 10/2015 | Chang et al. |
| 2015/0382205 | A1 | 12/2015 | Lee et al. |
| 2016/0065342 | A1 | 3/2016 | Mirbagheri et al. |
| 2016/0095105 | A1 | 3/2016 | Chen et al. |
| 2016/0165458 | A1 | 6/2016 | Peng et al. |
| 2016/0226647 | A1 | 8/2016 | Wang et al. |
| 2017/0026794 | A1 | 1/2017 | Baker et al. |
| 2017/0104517 | A1 | 4/2017 | Kakishima et al. |
| 2017/0111880 | A1 | 4/2017 | Park et al. |
| 2017/0180194 | A1 | 6/2017 | Noh et al. |
| 2017/0201960 | A1 | 7/2017 | Park et al. |
| 2017/0238298 | A1 | 8/2017 | Wang et al. |
| 2017/0288830 | A1 | 10/2017 | Fischer |
| 2018/0049151 | A1 | 2/2018 | Yoon et al. |
| 2018/0097596 | A1 | 4/2018 | Palanivelu et al. |
| 2018/0124787 | A1 | 5/2018 | Wang et al. |
| 2018/0192404 | A1 | 7/2018 | Maaref et al. |
| 2018/0198509 | A1 | 7/2018 | Nilsson et al. |
| 2018/0217228 | A1 | 8/2018 | Edge et al. |
| 2018/0287682 | A1* | 10/2018 | Kwak ................. H04W 24/10 |
| 2018/0295590 | A1 | 10/2018 | Abedini et al. |
| 2019/0007152 | A1 | 1/2019 | Yi et al. |
| 2019/0020454 | A1 | 1/2019 | Kim et al. |
| 2019/0052443 | A1 | 2/2019 | Cheng et al. |
| 2019/0053287 | A1 | 2/2019 | Lin et al. |
| 2019/0068315 | A1 | 2/2019 | Ryden et al. |
| 2019/0068346 | A1 | 2/2019 | Akkarakaran et al. |
| 2019/0081660 | A1 | 3/2019 | Han et al. |
| 2019/0159182 | A1 | 5/2019 | Ranta-Aho et al. |
| 2019/0165913 | A1 | 5/2019 | He et al. |
| 2019/0166514 | A1* | 5/2019 | Liu ......................... H04L 1/20 |
| 2019/0174440 | A1* | 6/2019 | Kwak ............... H04W 56/0015 |
| 2019/0174454 | A1 | 6/2019 | Priyanto et al. |
| 2019/0178976 | A1 | 6/2019 | Xiong et al. |
| 2019/0190669 | A1 | 6/2019 | Park et al. |
| 2019/0285722 | A1* | 9/2019 | Markhovsky ......... G01S 5/0236 |
| 2019/0349898 | A1* | 11/2019 | Fu ....................... H04W 72/044 |
| 2020/0036556 | A1* | 1/2020 | Wei ......................... H04L 5/005 |
| 2020/0052845 | A1 | 2/2020 | Chuang et al. |
| 2020/0091608 | A1* | 3/2020 | Alpman ................. H01L 25/16 |
| 2020/0178202 | A1 | 6/2020 | Edge et al. |
| 2020/0213161 | A1 | 7/2020 | Zhang et al. |
| 2020/0220676 | A1* | 7/2020 | Xu ............................ H04B 7/06 |
| 2020/0235877 | A1 | 7/2020 | Manolakos et al. |
| 2020/0267718 | A1 | 8/2020 | Park et al. |
| 2020/0275416 | A1 | 8/2020 | Haghighat et al. |
| 2020/0288482 | A1* | 9/2020 | Yi ....................... H04W 72/1289 |
| 2020/0313732 | A1* | 10/2020 | Yang ..................... H04W 72/14 |
| 2020/0313932 | A1* | 10/2020 | Sun ........................ H04L 5/0007 |
| 2020/0336264 | A1 | 10/2020 | Faxer et al. |
| 2020/0351045 | A1 | 11/2020 | Manolakos et al. |
| 2020/0351818 | A1* | 11/2020 | Park ........................ H04W 4/90 |
| 2021/0006372 | A1 | 1/2021 | Cha et al. |
| 2021/0021447 | A1 | 1/2021 | Sun |
| 2021/0036825 | A1 | 2/2021 | Choi et al. |
| 2021/0070451 | A1 | 3/2021 | Manolakos et al. |
| 2021/0083827 | A1 | 3/2021 | Bao et al. |
| 2021/0105812 | A1* | 4/2021 | Rastegardoost .......... H04L 1/08 |
| 2021/0120522 | A1 | 4/2021 | Kim et al. |
| 2021/0144743 | A1* | 5/2021 | Rastegardoost .. H04W 72/1257 |
| 2021/0167924 | A1 | 6/2021 | Bao |
| 2021/0195620 | A1* | 6/2021 | Yoshimura ............ H04W 76/11 |
| 2021/0211957 | A1 | 7/2021 | Kamohara et al. |
| 2021/0227509 | A1* | 7/2021 | Zhang ................... H04W 52/04 |
| 2021/0311158 | A1 | 11/2021 | Akkarakaran et al. |
| 2021/0351887 | A1 | 11/2021 | Qi |

FOREIGN PATENT DOCUMENTS

| | | |
|---|---|---|
| EP | 2663144 A2 | 11/2013 |
| EP | 3041301 A1 | 7/2016 |
| EP | 3306337 A1 | 4/2018 |
| EP | 3490319 A1 | 5/2019 |
| JP | H07111675 A | 4/1995 |
| JP | 2014216951 A | 11/2014 |
| JP | 2016068217 A | 3/2016 |
| JP | 2017098960 A | 6/2017 |
| WO | WO-2007022715 A1 | 3/2007 |
| WO | WO-2010059940 A1 | 5/2010 |
| WO | WO-2011085267 A2 | 7/2011 |
| WO | WO-2013112972 A1 | 8/2013 |
| WO | WO-2013134724 A1 | 9/2013 |
| WO | WO-2014131349 A1 | 9/2014 |
| WO | WO-2015027118 A1 | 2/2015 |
| WO | WO-2016036840 A1 | 3/2016 |
| WO | WO-2016065368 A1 | 4/2016 |
| WO | WO-2016155810 A1 | 10/2016 |
| WO | WO-2016164085 A1 | 10/2016 |
| WO | WO-2017040075 A1 | 3/2017 |
| WO | WO-2017048064 A1 | 3/2017 |
| WO | WO-2018126356 A1 | 7/2018 |
| WO | WO-2018127137 A1 | 7/2018 |
| WO | WO-2019000180 A1 | 1/2019 |
| WO | WO-2019212246 A1 | 11/2019 |

(56) References Cited

FOREIGN PATENT DOCUMENTS

| | | |
|---|---|---|
| WO | WO-2020001380 A1 | 1/2020 |
| WO | WO-2020145873 A1 | 7/2020 |

OTHER PUBLICATIONS

Nokia et al., "Views on DL and UL Reference Signals for NR Positioning", R1-1905262, 3GPP TSG RAN WG1 #96bis, Apr. 8-12, 2019, 8 pages.

Mediatek Inc: "On Downlink OTDOA and Angle based techniques", 3GPP TSG-RAN WG1 #96 Meeting, R1-1903239, Athens, Greece, Feb. 25-Mar. 1, 2019, 8 Pages.

White Paper: "An overview of LTE Positioning", Feb. 2012, SPIRENT, 16 Pages.

3GPP TS 38.211 version 15.2.0 Release 15, 2018, 98 pages.

CATT: "DL Reference Signals for NR Positioning", 3GPP TSG RAN WG1 #97, R1-1906305, Reno, USA, May 13-17, 2019, pp. 1-17.

Fischer S., "Observed Time Difference of Arrival (OTDOA) Positioning in 3GPP LTE", Qualcomm Technologies Inc, Jun. 6, 2014 (Jun. 6, 2014), pp. 1-62, XP055284784, Retrieved from the Internet: URL: http://www.terranautx.com/s/Qualcomm-OTD0A-positioning-in-LTE-June-2014.pdf, p. 9, chapter 3.1;p. 13, chapter 4.2.1;p. 15, chapter 5.1;p. 18, chapter 5.4;pp. 31-33, chapter 6.3;pp. 37-39, chapter 6.5; pp. 40-42, chapters 7.1.1-7.1.3.

Huawei, et al., "Downlink Based Solutions for NR Positioning", 3GPP Draft, R1-1900036, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051592962, 7 pages, Retrieved from the Internet: URL: http://www.3gpp.org/ftp/Meetings%5F3GPP%5FSYNC/RAN1/Docs/R1%2D1900036%2Ezip. [retrieved on Jan. 20, 2019] the whole document.

Intel Corporation: "DL Reference Signals for NR Positioning", 3GPP Draft; R1-1908659 Intel—NRPOS DLRS, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051765267, 27 pages, Retrieved from the Internet: URL: http://www.3gpp.org/ftp/tsg_ran/WG1_RL_1/TSGR1_98/Docs/R1-1908659.zip. [retrieved on Aug. 17, 2019] the whole document.

Intel Corporation: "Offline Discussion Outcome on DL Reference Signals for NR", 3GPP TSG RAN WG1 Meeting #96bis, R1-1905847, Xi'An, China, Apr. 8-12, 2019, pp. 1-12.

LG Electronics: "Discussion on Potential Enhancements for Indoor Positioning", 3GPP Draft, R1-150229 Discussion on potential enhancements for indoor positioning, 3rd Generation Partnership Project (3GPP), vol. RAN WG1, Athens, Greece; Feb. 8, 2015, pp. 1-4, XP050933443, retrieved from the Internet: URL: http://www.3gpp.org/ftp/Meetings_3GPP_SYNC/RAN1/Docs/.

NEXTNAV: "Synchronization for OTDOA Simulations", R1-150691, 3GPP TSG RAN WG1 Meeting #80, Athens, Greece, Feb. 9-13, 2015, 3 Pages.

Media Tek Inc: "Views on Potential Positioning Techniques", R1-1812373, 3GPP TSG-RAN WG1 Meeting #95, Spokane, USA, Nov. 12-Nov. 16, 2018, Date of Publication: Nov. 3, 2018, 6 Pages, http://www.3gpp.Org/Ftp/Tsg_ran/WG1_RL1/TSGR1_95/Docs/R1-1812373.Zip.

Shin et al., "Sounding Reference Signal Measurement in LTE System", 18th International Conference on Advanced Communication Technology (ICACT), Mar. 3, 2016, 6 pages, https://ieeexplore.ieee.org/stamp/stamp.jsp?tp=arnumber=7423548.

Ericsson: "Downlink Positioning Solutions: Design and Evaluations", 3GPP Draft, 3GPP TSG RAN WG1 96, R1-1903139 DL Positioning Solutions, 3rd Generation Partnership Project (3GPP), Mobile Competence Centre, 650, Route Des Lucioles, F-06921 Sophia-Antipolis Cedex, France, vol. RAN WG1. No. Athens, Greece, Feb. 25, 2019-Mar. 1, 2019, Feb. 15, 2019 (Feb. 15, 2019), XP051600835, 28 pages, Retrieved from the Internet: URL: http://www.3gpp.org/ftp/tsg%5Fran/WG1%5FRL1/TSGR1%5F96/Docs/R1%2D1903139%2Ezip, [retrieved on Feb. 15, 2019], Sections 1-5, figure 7.

Ericsson: "Uplink Positioning Solutions: Design and Evaluations", 3GPP Draft, 3GPP TSG RAN WG1 #96, R1-1903140 UL Positioning Solutions, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019 Feb. 15, 2019 (Feb. 15, 2019), XP051600836, 7 Pages, Retrieved from the Internet: URL:http://www.3gpp.org/ftp/tsg%5Fran/WG1%5FRL1/TSGR1%5F96/Docs/R1%2D1903140%2Ezip [retrieved on Feb. 15, 2019] figure 1 p. 3-p. 4.

International Search Report and Written Opinion—PCT/US2020/024617—ISA/EPO—dated Jun. 24, 2020 (191994WO).

Mediatek Inc: "On downlink OTDOA Technique: Potential Reference Signal Design", 3GPP Draft, 3GPP TSG-RAN WG1 Ad-Hoc Meeting 1901, R1-1900203 on downlink OTDOA Technique_FINAL, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593127, 6 Pages, Retrieved from the Internet: URL: http://www.3gpp.org/ftp/Meetings%5F3GPP%5FSYNC/RAN1/Docs/R1%2D1900203%2Ezip, [retrieved on Jan. 20, 2019], Sections 1-5, figures 4-5.

Mediatek Inc: "Reference Signal Design for NR Positioning", 3GPP Draft, 3GPP TSG-RAN WG1 #96bis Meeting, R1-1904500 DL RS Design_Final, 3rd Generation Partnership Project (3GPP), Mobile Competence Centre , 650, Route Des Lucioles, F-06921 Sophia-Antipolis Cedex, France, vol. RAN WG1. No. Xi'An, China, Apr. 8, 2019-Apr. 12, 2019, Apr. 3, 2019 (Apr. 3, 2019), XP051707240, 24 Pages, Retrieved from the Internet: URL: http://www.3gpp.org/ftp/tsg%5Fran/WG1%5FRL1/TSGR1%5F96b/Docs/R1%2D1904500%2Ezip, [retrieved on Apr. 3, 2019], Sections 1-4, figures 2e, 2f.

ETSI TS 138 211 V16.2.0, "Physical Channels and Modulation", 5G, NR, 3GPP TS 38.211, version 16.2.0, Release 16, Jul. 2020, pp. 1-135.

Vivo: "Discussion on DL RS for NR Positioning", R1-1908174, 3GPP TSG RAN WG1 #98, Prague, CZ, Aug. 26-30, 2019, 13 pages.

Ericsson: "RAT Dependent NR Positioning Solutions", 3GPP Draft, 3GPP TSG-RAN WG1 #95, R1-1813592, RAT Depndent NR Positioning Solutions, 3rd Generation Partnership Project (3GPP), Mobile Competence Centre, 650, Route Des Lucioles, F-06921, Sophia-Antipolis Cedex, France, vol. RAN WG1. No. Spokane. United States, Nov. 12, 2018-Nov. 16, 2018, http://www.3gpp.org/ftp/Meeting%5F3GPP%5FSYNC/RAN1/Docs/R1%2D1813592%2Ezip [retrieved on Nov. 11, 2018]p. 7-p. 15.

Keating R, et al., "Overview of Positioning in 5G New Radio", 2019 16th International Symposium on Wireless Communication Systems (ISWCS), IEEE, Aug. 27, 2019 (Aug. 27, 2019), pp. 320-324. XP033636268, DOI: 10.1109/ISWCS.2019.8877160 [retrieved on Oct. 18, 2019] p. 323-p. 324.

"3rd Generation Partnership Project; Technical Specification Group Radio Access Network; NR; Physical Layer Procedures for Data (Release 16)", 3GPP Standard, Technical Specification, 3GPP TS 38.214, 3rd Generation Partnership Project (3GPP), Mobile Competence Centre, 650, Route Des Lucioles, F-06921, Sophia-Antipolis Cedex, France, vol. RAN WG1, No. V16.0.0, Dec. 2019, Jan. 14, 2020 (Jan. 14, 2020), XP051860777, pp. 1-147, Retrieved from the Internet: URL: http://ftp.3gpp.org/Specs/archive/38_series/38.214/38214-g00.zip, 38214-g00.docx [retrieved on Jan. 14, 2020] Sections 5.16.1-5.1.6.1.1, 5.1.6.3, 5.1.6.5, 5.2.1.2., 5.2.1.4 and 5.2.2.25, paragraphs [5.2.1.5], [5.2.2], paragraph 5.2.1 .6, paragraph 5.4, paragraph 6.1, p. 122-p. 123.

Specification of U.S. Appl. No. 62/726,480, filed Sep. 4, 2018, 28 Pages.

Specification of U.S. Appl. No. 62/740,459, filed Oct. 3, 2018, 12 Pages.

\* cited by examiner

SOUNDING REFERENCE SIGNAL WAVEFORM DESIGN FOR WIRELESS COMMUNICATIONS

CROSS REFERENCE

The present application for Patent claims the benefit of India Provisional Patent Application No. 201941012233 by Sun et al., entitled "SOUNDING REFERENCE SIGNAL WAVEFORM DESIGN FOR WIRELESS COMMUNICATIONS," filed Mar. 28, 2019, assigned to the assignee hereof, and which is hereby incorporated by reference in its entirety.

FIELD OF DISCLOSURE

The following relates to wireless communications, and more specifically to sounding reference signal (SRS) waveform design for wireless communications.

DESCRIPTION OF RELATED ART

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some deployments, a base station may configure one or more UEs to transmit a sounding reference signal (SRS) using SRS resources, which may be used to measure signals transmitted by the UE and determine one or more channel metrics of the UE. Additionally, in some cases, the UE and the base station may communicate using a shared radio frequency spectrum band (e.g., an unlicensed radio frequency spectrum band). A wireless device which wants to transmit on the shared radio frequency spectrum band may first perform a listen before talk (LBT) procedure, such as a clear channel assessment (CCA) procedure, before transmitting to determine whether any other wireless device is currently transmitting in the shared radio frequency spectrum band. If the shared radio frequency spectrum band is available, the wireless device may transmit on the shared radio frequency spectrum band after completing the LBT procedure. If unavailable, the wireless device may perform a subsequent LBT procedure at a later time before attempting to transmit on the shared radio frequency spectrum band. In cases where the base station configures SRS resources, a UE may perform an LBT procedure prior to transmitting SRS. In order to enhance the likelihood of a successful LBT, the base station may avoid scheduling any transmissions for a time period associated with the LBT procedure, which may be referred to as an LBT gap. Such LBT gaps reduce network efficiency, and thus techniques to reduce a number of occasions where an LBT gap is scheduled may help to enhance network efficiency and capacity.

SUMMARY

The present disclosure relates to improved methods, systems, devices, and apparatuses that support sounding reference signal (SRS) waveform design for wireless communications. In various aspects, the present disclosure provides for staggering SRS transmissions in frequency across multiple orthogonal frequency division multiplexing (OFDM) symbols, which may allow multiple UEs to transmit SRS using a common listen-before-talk (LBT) gap for an LBT procedure. In other aspects, the present disclosure provides for transmitting an SRS across multiple OFDM symbols using the same frequency resources (e.g., a same resource element in consecutive OFDM symbols), and an orthogonal cover code (OCC) may be applied to the SRS transmission of each OFDM symbol, which may allow multiple UEs to concurrently transmit SRS using a common LBT gap.

A method of wireless communication at a UE is described. The method may include identifying a SRS configuration for transmission of a SRS to a base station, the SRS configuration providing SRS resources within at least a first OFDM symbol, a second OFDM symbol, a third OFDM symbol, and a fourth OFDM symbol, mapping, based on the SRS configuration, a first portion of the SRS to occupy a first subset of frequency resources of the first OFDM symbol, a second portion of the SRS to occupy a second subset of frequency resources of the second OFDM symbol, a third portion of the SRS to occupy a third subset of frequency resources of the third OFDM symbol, and a fourth portion of the SRS to occupy a fourth subset of frequency resources of the fourth OFDM symbol, where the first subset of frequency resources, the second subset of frequency resources, the third subset of frequency resources, and the fourth subset of frequency resources are non-uniformly staggered in frequency relative to each other, and transmitting the SRS to the base station based on the mapping.

An apparatus for wireless communication at a UE is described. The apparatus may include a processor, memory coupled with the processor, and instructions stored in the memory. The instructions may be executable by the processor to cause the apparatus to identify a SRS configuration for transmission of a SRS to a base station, the SRS configuration providing SRS resources within at least a first OFDM symbol, a second OFDM symbol, a third OFDM symbol, and a fourth OFDM symbol, map, based on the SRS configuration, a first portion of the SRS to occupy a first subset of frequency resources of the first OFDM symbol, a second portion of the SRS to occupy a second subset of frequency resources of the second OFDM symbol, a third portion of the SRS to occupy a third subset of frequency resources of the third OFDM symbol, and a fourth portion of the SRS to occupy a fourth subset of frequency resources of the fourth OFDM symbol, where the first subset of frequency resources, the second subset of frequency resources, the third subset of frequency resources, and the fourth subset of frequency resources are non-uniformly staggered in frequency relative to each other, and transmit the SRS to the base station based on the mapping.

Another apparatus for wireless communication at a UE is described. The apparatus may include means for identifying a SRS configuration for transmission of a SRS to a base station, the SRS configuration providing SRS resources within at least a first OFDM symbol, a second OFDM symbol, a third OFDM symbol, and a fourth OFDM symbol, mapping, based on the SRS configuration, a first portion of the SRS to occupy a first subset of frequency resources of the first OFDM symbol, a second portion of the SRS to occupy a second subset of frequency resources of the second OFDM symbol, a third portion of the SRS to occupy a third subset of frequency resources of the third OFDM symbol, and a fourth portion of the SRS to occupy a fourth subset of frequency resources of the fourth OFDM symbol, where the first subset of frequency resources, the second subset of frequency resources, the third subset of frequency resources, and the fourth subset of frequency resources are non-uniformly staggered in frequency relative to each other, and transmitting the SRS to the base station based on the mapping.

A non-transitory computer-readable medium storing code for wireless communication at a UE is described. The code may include instructions executable by a processor to identify a SRS configuration for transmission of a SRS to a base station, the SRS configuration providing SRS resources within at least a first OFDM symbol, a second OFDM symbol, a third OFDM symbol, and a fourth OFDM symbol, map, based on the SRS configuration, a first portion of the SRS to occupy a first subset of frequency resources of the first OFDM symbol, a second portion of the SRS to occupy a second subset of frequency resources of the second OFDM symbol, a third portion of the SRS to occupy a third subset of frequency resources of the third OFDM symbol, and a fourth portion of the SRS to occupy a fourth subset of frequency resources of the fourth OFDM symbol, where the first subset of frequency resources, the second subset of frequency resources, the third subset of frequency resources, and the fourth subset of frequency resources are non-uniformly staggered in frequency relative to each other, and transmit the SRS to the base station based on the mapping.

In some examples of the method, apparatuses, and non-transitory computer-readable medium described herein, the first subset of frequency resources may be offset by zero resource elements (REs) relative to a reference point, the second subset of frequency resources may be offset by four REs relative to the reference point, the third subset of frequency resources may be offset by two REs relative to the reference point, and the fourth subset of frequency resources may be offset by six REs relative to the reference point.

In some examples of the method, apparatuses, and non-transitory computer-readable medium described herein, the first subset of frequency resources, the second subset of frequency resources, the third subset of frequency resources, and the fourth subset of frequency resources may be staggered from a single antenna port.

In some examples of the method, apparatuses, and non-transitory computer-readable medium described herein, the first subset of frequency resources, the second subset of frequency resources, the third subset of frequency resources, and the fourth subset of frequency resources may have an overlapping bandwidth span.

In some examples of the method, apparatuses, and non-transitory computer-readable medium described herein, the first subset of frequency resources, the second subset of frequency resources, the third subset of frequency resources, and the fourth subset of frequency resources lie in the same set of physical resource blocks (RBs).

In some examples of the method, apparatuses, and non-transitory computer-readable medium described herein, the mapping further may include operations, features, means, or instructions for identifying the first subset of frequency resources as a first set of uniformly spaced REs within the first OFDM symbol, the second subset of frequency resources as a second set of uniformly spaced REs within the second OFDM symbol, the third subset of frequency resources as a third set of uniformly spaced REs within the third OFDM symbol, and the fourth subset of frequency resources as a fourth set of uniformly spaced REs within the fourth OFDM symbol.

In some examples of the method, apparatuses, and non-transitory computer-readable medium described herein, the mapping further may include operations, features, means, or instructions for identifying a first starting RE within the first OFDM symbol based on a first RE offset for the first OFDM symbol, identifying a second starting RE within the second OFDM symbol based on a second RE offset for the second OFDM symbol, identifying a third starting RE within the third OFDM symbol based on a third RE offset for the third OFDM symbol, and identifying a fourth starting RE within the fourth OFDM symbol based on a fourth RE offset for the fourth OFDM symbol.

In some examples of the method, apparatuses, and non-transitory computer-readable medium described herein, the first RE offset, the second RE offset, the third RE offset, and the fourth RE offset provide a uniform spacing of a combined set of REs that combines the first set of uniformly spaced REs, the second set of uniformly spaced REs, the third set of uniformly spaced REs, and the fourth set of uniformly spaced REs.

Some examples of the method, apparatuses, and non-transitory computer-readable medium described herein may further include operations, features, means, or instructions for determining a SRS sequence for each of the first portion of the SRS, the second portion of the SRS, the third portion of the SRS, and the fourth portion of the SRS based on an amount of frequency resources in each of the first subset of frequency resources, the second subset of frequency resources, the third subset of frequency resources, and the fourth subset of frequency resources.

In some examples of the method, apparatuses, and non-transitory computer-readable medium described herein, a same SRS sequence may be determined for each of the first portion of the SRS, the second portion of the SRS, the third portion of the SRS, and the fourth portion of the SRS.

In some examples of the method, apparatuses, and non-transitory computer-readable medium described herein, the first OFDM symbol, the second OFDM symbol, the third OFDM symbol, and the fourth OFDM symbol each include a set of RBs, and where each of the first portion of the SRS, the second portion of the SRS, the third portion of the SRS, and the fourth portion of the SRS occupy frequency resources according to a pattern that repeats every two or more RBs within each OFDM symbol.

Some examples of the method, apparatuses, and non-transitory computer-readable medium described herein may further include operations, features, means, or instructions for transmitting one or more repetitions of at least a portion of the SRS to the base station.

In some examples of the method, apparatuses, and non-transitory computer-readable medium described herein, the one or more repetitions may be transmitted in groups of SRS symbols, and where each group of SRS symbols may be mapped according to the SRS configuration to provide associated portions of the SRS that may be staggered in frequency.

In some examples of the method, apparatuses, and non-transitory computer-readable medium described herein, the one or more repetitions of at least the portion of the SRS may be transmitted to the base station according to a frequency hopping pattern.

In some examples of the method, apparatuses, and non-transitory computer-readable medium described herein, the frequency hopping may be performed in groups of SRS symbols, and where each group of SRS symbols may be formatted according to the SRS configuration to provide associated portions of the SRS that may be staggered in frequency.

In some examples of the method, apparatuses, and non-transitory computer-readable medium described herein, the SRS configuration indicates a number of OFDM symbols across which the SRS may be to be sent using different staggering offsets and an index that indicates a number of staggering offsets to be used on the number of OFDM symbols.

A method of wireless communication at a base station is described. The method may include configuring at least a first UE with a first SRS configuration for transmission of a first SRS, where the first SRS configuration provides resources for the first SRS within at least a first OFDM symbol, a second OFDM symbol, a third OFDM symbol, and a fourth OFDM symbol and receiving, based on the first SRS configuration, a first portion of the first SRS in a first subset of frequency resources within the first OFDM symbol, a second portion of the first SRS in a second subset of frequency resources within the second OFDM symbol, a third portion of the first SRS in a third subset of frequency resources within the third OFDM symbol, and a fourth portion of the first SRS in a fourth subset of frequency resources within the fourth OFDM symbol, where the first subset of frequency resources, the second subset of frequency resources, the third subset of frequency resources, and the fourth subset of frequency resources are non-uniformly staggered in frequency relative to each other.

An apparatus for wireless communication at a base station is described. The apparatus may include a processor, memory coupled with the processor, and instructions stored in the memory. The instructions may be executable by the processor to cause the apparatus to configure at least a first UE with a first SRS configuration for transmission of a first SRS, where the first SRS configuration provides resources for the first SRS within at least a first OFDM symbol, a second OFDM symbol, a third OFDM symbol, and a fourth OFDM symbol and receive, based on the first SRS configuration, a first portion of the first SRS in a first subset of frequency resources within the first OFDM symbol, a second portion of the first SRS in a second subset of frequency resources within the second OFDM symbol, a third portion of the first SRS in a third subset of frequency resources within the third OFDM symbol, and a fourth portion of the first SRS in a fourth subset of frequency resources within the fourth OFDM symbol, where the first subset of frequency resources, the second subset of frequency resources, the third subset of frequency resources, and the fourth subset of frequency resources are non-uniformly staggered in frequency relative to each other.

Another apparatus for wireless communication at a base station is described. The apparatus may include means for configuring at least a first UE with a first SRS configuration for transmission of a first SRS, where the first SRS configuration provides resources for the first SRS within at least a first OFDM symbol, a second OFDM symbol, a third OFDM symbol, and a fourth OFDM symbol and receiving, based on the first SRS configuration, a first portion of the first SRS in a first subset of frequency resources within the first OFDM symbol, a second portion of the first SRS in a second subset of frequency resources within the second OFDM symbol, a third portion of the first SRS in a third subset of frequency resources within the third OFDM symbol, and a fourth portion of the first SRS in a fourth subset of frequency resources within the fourth OFDM symbol, where the first subset of frequency resources, the second subset of frequency resources, the third subset of frequency resources, and the fourth subset of frequency resources are non-uniformly staggered in frequency relative to each other.

A non-transitory computer-readable medium storing code for wireless communication at a base station is described. The code may include instructions executable by a processor to configure at least a first UE with a first SRS configuration for transmission of a first SRS, where the first SRS configuration provides resources for the first SRS within at least a first OFDM symbol, a second OFDM symbol, a third OFDM symbol, and a fourth OFDM symbol and receive, based on the first SRS configuration, a first portion of the first SRS in a first subset of frequency resources within the first OFDM symbol, a second portion of the first SRS in a second subset of frequency resources within the second OFDM symbol, a third portion of the first SRS in a third subset of frequency resources within the third OFDM symbol, and a fourth portion of the first SRS in a fourth subset of frequency resources within the fourth OFDM symbol, where the first subset of frequency resources, the second subset of frequency resources, the third subset of frequency resources, and the fourth subset of frequency resources are non-uniformly staggered in frequency relative to each other.

In some examples of the method, apparatuses, and non-transitory computer-readable medium described herein, the first subset of frequency resources may be offset by zero REs relative to a reference point, the second subset of frequency resources may be offset by four REs relative to the reference point, the third subset of frequency resources may be offset by two REs relative to the reference point, and the fourth subset of frequency resources may be offset by six REs relative to the reference point.

Some examples of the method, apparatuses, and non-transitory computer-readable medium described herein may further include operations, features, means, or instructions for configuring at least a second UE with a second SRS configuration for transmission of a second SRS, where the second SRS configuration provides resources for the second SRS within at least the first OFDM symbol, the second OFDM symbol, the third OFDM symbol, and the fourth OFDM symbol, and receiving, based on the second SRS configuration, a first portion of the second SRS in a fifth subset of frequency resources within the first OFDM symbol, a second portion of the second SRS in a sixth subset of frequency resources within the second OFDM symbol, a third portion of the second SRS in a seventh subset of frequency resources within the third OFDM symbol, and a fourth portion of the second SRS in an eighth subset of frequency resources within the fourth OFDM symbol, where the fourth subset of frequency resources may be staggered in frequency relative to the eighth subset of frequency resources.

In some examples of the method, apparatuses, and non-transitory computer-readable medium described herein, the base station configures each of a set of UEs for SRS transmissions in the first OFDM symbol, the second OFDM symbol, the third OFDM symbol, and the fourth OFDM symbol based on a number of UEs in the set of UEs exceeding a threshold value.

In some examples of the method, apparatuses, and non-transitory computer-readable medium described herein, the configuring the first UE further may include operations, features, means, or instructions for configuring the first subset of frequency resources as a first set of uniformly spaced REs within the first OFDM symbol, the second subset of frequency resources as a second set of uniformly spaced REs within the second OFDM symbol, the third subset of frequency resources as a third set of uniformly spaced REs within the third OFDM symbol, and the fourth subset of frequency resources as a fourth set of uniformly spaced REs within the fourth OFDM symbol.

In some examples of the method, apparatuses, and non-transitory computer-readable medium described herein, the configuring the first UE further may include operations, features, means, or instructions for indicating a first RE offset for the first OFDM symbol that provides RE locations for the first set of uniformly spaced REs, indicating a second RE offset for the second OFDM symbol that provides RE locations for the second set of uniformly spaced REs, indicating a third RE offset for the third OFDM symbol that provides RE locations for the third set of uniformly spaced REs, and indicating a fourth RE offset for the fourth OFDM symbol that provides RE locations for the fourth set of uniformly spaced REs.

Some examples of the method, apparatuses, and non-transitory computer-readable medium described herein may further include operations, features, means, or instructions for receiving the first set of uniformly spaced REs within the first OFDM symbol, the second set of uniformly spaced REs within the second OFDM symbol, the third set of uniformly spaced REs within the third OFDM symbol, and the fourth set of uniformly spaced REs within the fourth OFDM symbol. In some examples of the method, apparatuses, and non-transitory computer-readable medium described herein, the first RE offset, the second RE offset, the third RE offset, and the fourth RE offset provide a uniform spacing of a combined set of REs that combines the first set of uniformly spaced REs, the second set of uniformly spaced REs, the third set of uniformly spaced REs, and the fourth set of uniformly spaced REs.

In some examples of the method, apparatuses, and non-transitory computer-readable medium described herein, the configuring the first UE further may include operations, features, means, or instructions for configuring a SRS sequence for each of the first portion of the SRS, the second portion of the SRS, the third portion of the SRS, and the fourth portion of the SRS based on an amount of frequency resources in each of the first subset of frequency resources, the second subset of frequency resources, the third subset of frequency resources, and the fourth subset of frequency resources.

In some examples of the method, apparatuses, and non-transitory computer-readable medium described herein, a same SRS sequence may be configured for each of the first portion of the SRS, the second portion of the SRS, the third portion of the SRS, and the fourth portion of the SRS.

In some examples of the method, apparatuses, and non-transitory computer-readable medium described herein, the first OFDM symbol, the second OFDM symbol, the third OFDM symbol, and the fourth OFDM symbol each include a set of RBs, and where each of the first portion of the SRS, the second portion of the SRS, the third portion of the SRS, and the fourth portion of the SRS occupy uniform frequency resources that span two or more RBs within each OFDM symbol.

Some examples of the method, apparatuses, and non-transitory computer-readable medium described herein may further include operations, features, means, or instructions for receiving one or more repetitions of at least a portion of the first SRS from the first UE.

In some examples of the method, apparatuses, and non-transitory computer-readable medium described herein, the one or more repetitions may be received in groups of SRS symbols, and where each group of SRS symbols may be mapped according to the first SRS configuration to provide associated portions of the first SRS that may be staggered in frequency.

DETAILED DESCRIPTION

Figure 1:
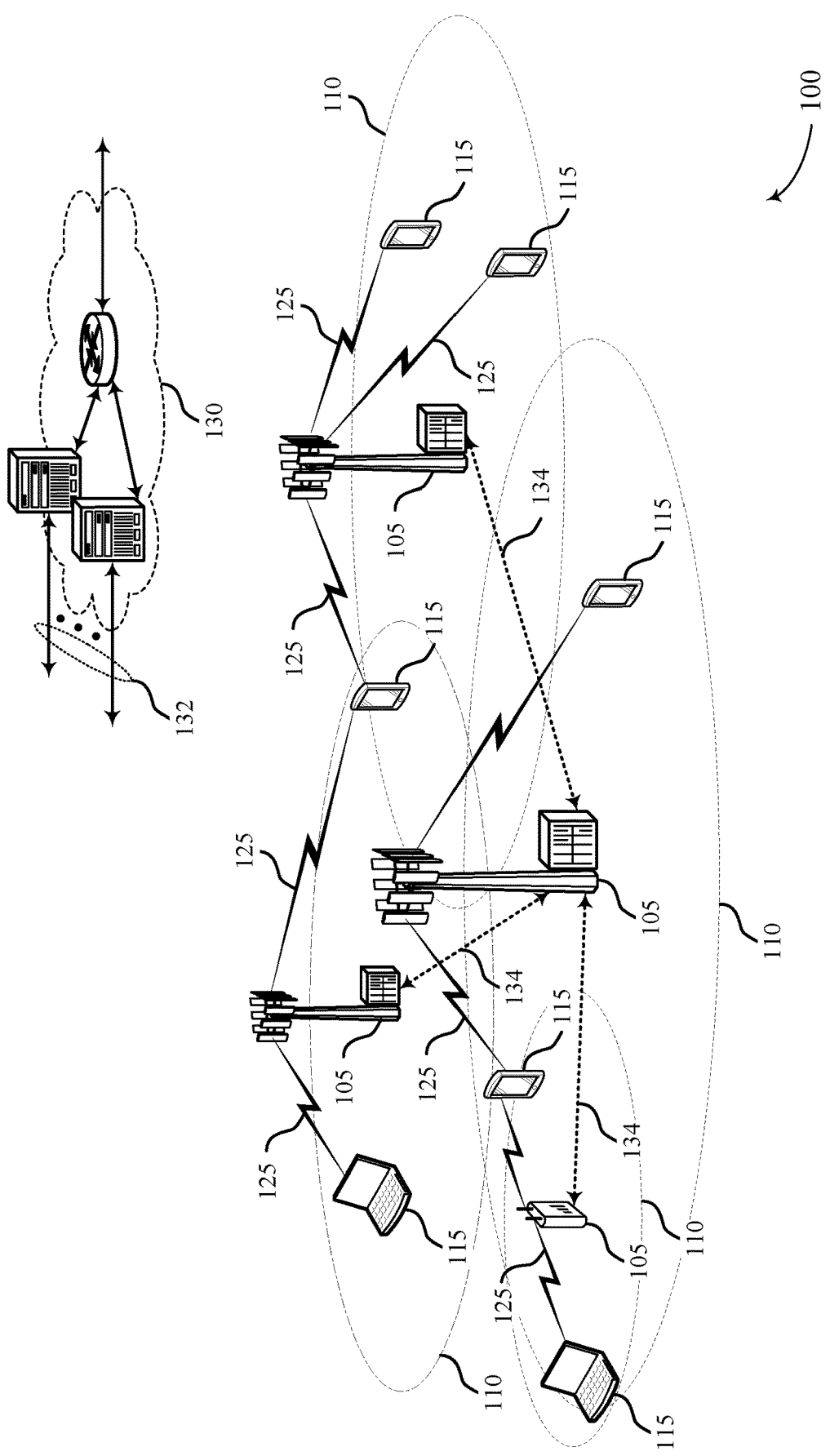
FIG. 1 illustrates an example of a wireless communications system that supports sounding reference signal (SRS) waveform design for wireless communications in accordance with aspects of the present disclosure.

Various aspects of the present disclosure provide sounding reference signal (SRS) waveform designs for wireless communications. In various aspects, the present disclosure provides for staggering SRS transmissions in frequency across multiple orthogonal frequency division multiplexing (OFDM) symbols, which may allow multiple user equipment (UEs) to transmit SRS using a common listen-beforetalk (LBT) gap for an LBT procedure. In other aspects, the present disclosure provides for transmitting an SRS across multiple OFDM symbols using same frequency resources (e.g., a same resource element in consecutive OFDM symbols), and an orthogonal cover code (OCC) may be applied to the SRS transmission of each OFDM symbol, which may allow multiple UEs to transmit concurrent SRS using a common LBT gap.

As described herein, in some deployments, wireless communications systems may use shared radio frequency spectrum for some or all communications between a UE and a base station. Prior to initiating a transmission in the shared radio frequency spectrum band, a transmitting wireless device (e.g., a UE or base station) performs an LBT procedure, and the wireless device may transmit after completing the LBT procedure. In cases wherein the base station obtains a channel for a channel occupancy time (COT), a UE may perform a shortened LBT procedure (e.g., a one-shot LBT if the UE transmission is within a COT, and a Category 4 (CAT4) high priority LBT procedure if the UE transmission is outside of a COT). The base station may avoid scheduling any transmissions for an LBT gap time period associated with the LBT procedure to help ensure that the UE LBT passes. In cases where the UE transmission is outside of a COT, the base station may allocate one or multiple OFDM symbols (e.g., two OFDM symbols at a 30 kHz subcarrier spacing) as an LBT gap, assuming a worst case scenario for LBT duration (i.e., assuming the UE uses the worst case contention window size for that traffic type).

In some prior systems, SRS resources within an uplink symbol may be interlaced with other uplink resources (e.g., a physical uplink shared channel (PUSCH) resource, a physical uplink control channel (PUCCH) resources, etc.), and, in some cases, multiple UEs may be allocated SRS resources within a same OFDM symbol and the multiple UEs may share a same LBT gap. However, in cases where a base station serves a number of UEs that exceeds the number of UEs that may be allocated interlaced SRS resources, the base station may need to allocate additional symbols for SRS transmissions. In traditional systems, such multiple SRS symbols would require multiple LBT gaps, as each UE would need to perform LBT prior to starting a transmission in a symbol. Thus, additional LBT gaps would be needed in such a system, which may reduce system efficiency and capacity and fragment channel usage.

Techniques as discussed herein may allow a base station to allocate additional OFDM symbols for SRS transmissions, where the SRS may be configured according to various staggering patterns. For example, a time domain length of SRS transmissions is extended to span multiple OFDM symbols, and portions of an SRS in the OFDM symbols may be multiplexed in the frequency domain (e.g., through resource element (RE) staggering) or in the code domain (e.g., through an OCC applied to the multiple OFDM symbols). In some cases, a UE may be configured by a base station to transmit SRS with an increased time domain duration of the SRS resource with frequency domain staggering of SRS. Further, in some cases, a comb structure may be used in which SRS is transmitted in one or more REs within a symbol, which may be adapted (e.g., using a comb6 or comb12 structure versus a comb2 or comb4 structure) such that a UE transmits relatively fewer SRS REs in a symbol as compared to traditional systems. Additionally or alternatively, a UE may be configured by a base station to transmit SRS with an increased time domain duration of the SRS resource with a time domain OCC to support larger multiplexing capacity.

Such techniques may allow for relatively large numbers of UEs to transmit SRS using a common LBT gap (e.g., a common LBT gap that may be used by multiple UEs), which may enhance system efficiency and capacity. Further, in some cases, the SRS sequence that is used for each OFDM symbol may be selected from a set of predefined SRS sequences (e.g., a Zadoff-Chu sequence or a computer-generated sequence) for the number of REs within the symbol, which may provide an enhanced peak to average power ratio (PAPR) for the SRS transmissions. Additionally, such techniques may provide for uniform spacing of SRS REs within an OFDM symbol, and fast Fourier transform (FFT) based decoding may be implemented, which may provide reduced processing complexity. A base station may, for example, consider the received SRS tones on different symbols as SRS tones received on the same symbol and process all the SRS tones using the same FFT/IFFT, among other examples, as part of a channel estimation process.

Aspects of the disclosure are initially described in the context of a wireless communications system. Various examples of SRS staggering patterns and OCC techniques are then described. Aspects of the disclosure are further illustrated by and described with reference to apparatus diagrams, system diagrams, and flowcharts that relate to SRS waveform design for wireless communications.

FIG. 1 illustrates an example of a wireless communications system 100 that supports SRS waveform design for wireless communications in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. The techniques described herein may be applicable to positioning in 5G NR and future releases.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some examples, various functions of each access network entity or base station 105 may be distributed across various network devices (e.g., radio heads and access network controllers) or consolidated into a single network device (e.g., a base station 105).

Wireless communications system 100 may operate using one or more frequency bands, sometimes in the range of 300 megahertz (MHz) to 300 gigahertz (GHz). The region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at some orientations with respect to an antenna array experience constructive interference while others experience destructive interference. The adjustment of signals communicated via the antenna elements may include a transmitting device or a receiving device applying one or more amplitude and phase offsets to signals carried via each of the antenna elements associated with the device. The adjustments associated with each of the antenna elements may be defined by a beamforming weight set associated with an orientation (e.g., with respect to the antenna array of the transmitting device or receiving device, or with respect to some other orientation).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or discrete Fourier transform spread OFDM (DFT-S-OFDM)).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

In some cases, UEs 115 may transmit SRSs to one or more base stations 105 where each SRS, or repetition of an SRS, spans two or more symbols. In some cases, a UE 115 may stagger SRS transmissions in frequency across multiple OFDM symbols, where the SRS may be configured according to various staggering patterns, which may enable UEs 115 to increase processing efficiency. In some other cases, a UE 115 may transmit an SRS across multiple OFDM symbols using a same frequency resources (e.g., a same RE in consecutive OFDM symbols) and an OCC may be applied to the SRS of each OFDM symbol, which may similarly result in greater processing efficiency for the UE 115.

In some examples, staggering SRS transmissions in frequency across multiple OFDM symbols may enable multiple UEs 115 to transmit SRS using a common LBT. Further, in some other examples, applying the OCC to the SRS of each OFDM symbol may also enable multiple UEs to transmit concurrent SRS using a common LBT gap.

Figure 2:
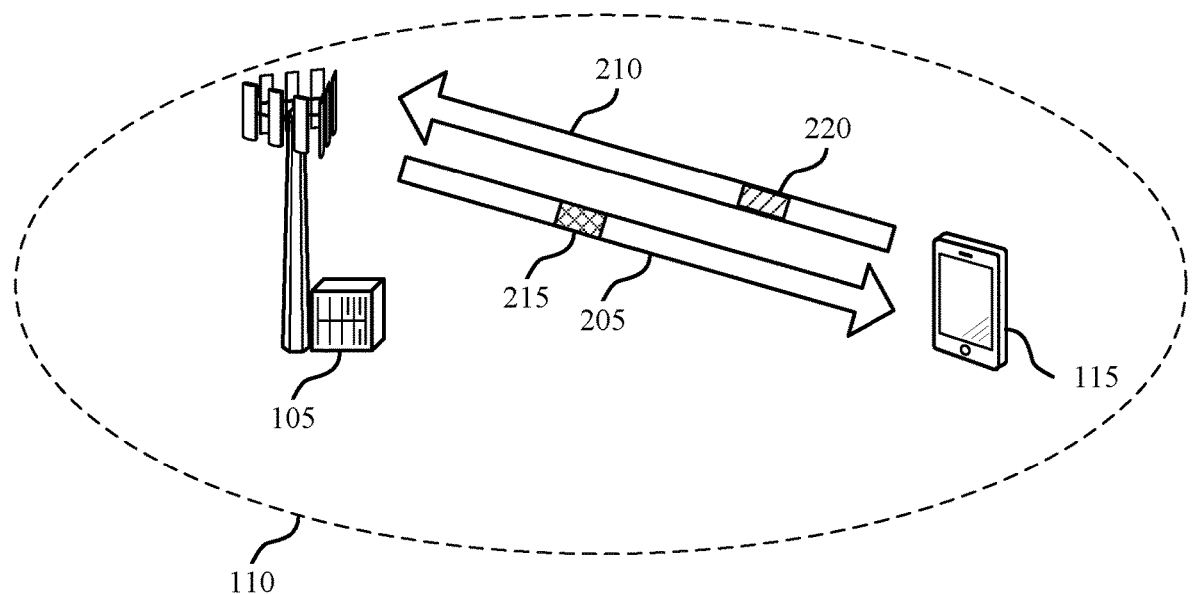
FIG. 2 illustrates an example of a portion of a wireless communications system that supports SRS waveform design for wireless communications in accordance with aspects of the present disclosure.

FIG. 2 illustrates an example of a portion of a wireless communications system 200 that supports SRS waveform design for wireless communications in accordance with various aspects of the present disclosure. In some examples, wireless communications system 200 may implement aspects of wireless communications system 100. In this example, wireless communications system 200 includes a base station 105 and a UE 115, which may be examples of corresponding devices as discussed with respect to FIG. 1. The base station 105 may transmit data and control information to the UE 115 via downlink communications 205, and the UE 115 may transmit data and control information to the base station 105 via uplink communications 210. In this example, the base station 105 may transmit SRS configuration information 215 to the UE 115, which may configure one or more SRS transmissions 220 by the UE 115.

In accordance with techniques discussed herein, the SRS configuration information 215 may indicate that portions of an SRS from the UE 115 are to be staggered in frequency across multiple OFDM symbols. In some cases, the base station 105 may configure SRS staggering when a number of served UEs (including UE 115) exceed a threshold value. In some cases, the threshold value corresponds to a number of UEs that may be served using block interlace SRS transmissions in which each repetition of an SRS is included in a single OFDM symbol. The base station 105 may, in some cases, configure SRS staggering with fewer REs per symbol, using a sparser comb structure for each symbol (e.g., SRS is included in every 6 or 12 REs). In some cases, within each symbol, the SRS REs may be uniformly spaced. In some cases, a number of RBs may be configured for SRS, with each RB spanning 12 consecutive tones, and in such cases the staggered comb structure may divide into 12 evenly (or be a multiple of 12) to provide uniform SRS density per RB.

The SRS configuration information 215 may include, in some cases, an indication of a number of symbols across which the SRS transmissions 220 are to be staggered, and may provide an offset between combs across SRS symbols. In some cases, the SRS configuration information 215 may include an index value that is mapped to a number of OFDM symbols and an offset between combs. As such, the UE 115 may receive the index value and determine the number of OFDM symbols and the offset, or staggering offset, that is to be used on the number of OFDM symbols, which may result in lower computational complexity at the UE 115. Further, as a result of using the offset on the number of OFDM symbols, the UE 115 may more efficiently use resources allocated for SRS transmissions, which may enable for greater system efficiency.

In some aspects, the offset or staggering between combs across SRS symbols may be non-uniform in frequency across the SRS symbols. For example, the SRS configuration information 215 may indicate that SRS transmissions 220 are to be transmitted across four symbols. In such examples, each symbol may be associated with a comb, and each comb may be offset in frequency relative to the combs associated with the other symbols. In particular, a first RE in a first symbol that is occupied by SRS according to a first comb may be staggered or offset by a first number of REs from a first RE in a second symbol that is occupied by SRS, where the REs occupied by SRS in the second symbol may have a second comb. Similarly, a first RE in a third symbol that is occupied by SRS according to a third comb may be staggered or offset from the first RE in the second symbol that is occupied by SRS. Here, the stagger or offset between the REs of the second symbol and the REs of the third symbol may be a second number of REs different from the stagger or offset between the REs of the first symbol and the REs of the second symbol (e.g., the first number of REs). Likewise, a first RE in a fourth symbol that is occupied by SRS according to a fourth comb may be staggered or offset from the first RE in the third symbol that is occupied by SRS by a third number of REs.

In some aspects, an SRS configuration for a set of staggers or offsets associated with a corresponding number of symbols may include a set of integers. For example, an SRS configuration for four symbols may include four integers, where each integer may be associated with the RE offset for SRS REs in a corresponding symbol. Put another way, a frequency offset or staggering between REs of respective symbols may be different across multiple symbols, which may be referred to as a non-uniform staggering pattern or other like terminology. In some implementations, the first number of REs, the second number of REs, and the third number of REs may be non-uniform. For example, the first number of REs, the second number of REs, and the third number of REs may all be different numbers of REs. In other examples, at least one of the first number of REs, the second number of REs, and the third number of REs may be different than the others. Although described in the context of four symbols, a similar procedure may apply for any number of symbols (e.g., for two symbols, three symbols, six symbols, eight symbols, twelve symbols, and so forth). Additionally, similar procedures may apply for any number of comb patterns (e.g., comb4, comb6, comb8, comb12, etc.).

Alternatively, the SRS configuration information 215 may indicate that SRS transmissions 220 are to be transmitted across a number of symbols with uniform staggering. In such cases, the stagger or offset between REs occupied by SRS across the number of symbols may be uniform in frequency. For instance, the stagger or offset between the first REs that are occupied by SRS in a first symbol and a second symbol may be equal to the stagger or offset between the first RE that is occupied by SRS in the second symbol and a first RE that is occupied by SRS in a third symbol.

Several examples of SRS staggering patterns are illustrated in FIGS. 3 through 8 and will be discussed in more detail with reference to FIGS. 3 through 8. The UE 115 may format (e.g., map) the SRS transmissions 220 in accordance with the SRS configuration information 215 and the base station 105 may combine the SRS transmissions 220 by destaggering. In some examples, the combined SRS combs may still be uniformly spaced after destaggering. In some cases, the combined comb has a same density as traditional SRS configurations (e.g., comb2 or comb4). On each OFDM symbol of SRS that is transmitted, it may be desirable to reuse the SRS sequences already supported in legacy use cases, which have been designed for low PAPR and have good cross correlation properties. The legacy SRS sequences may be defined for multiples of some minimum sequence lengths (e.g., multiples of 12). In aspects of the present disclosure with fewer SRS tones per RB compared to legacy SRS waveforms, a minimum number of RBs allocated to SRS may be increased and/or limited combinations of numbers of RBs that may be allocated to SRS may enable the reuse of the SRS sequences already defined in such legacy systems.

Figure 3:
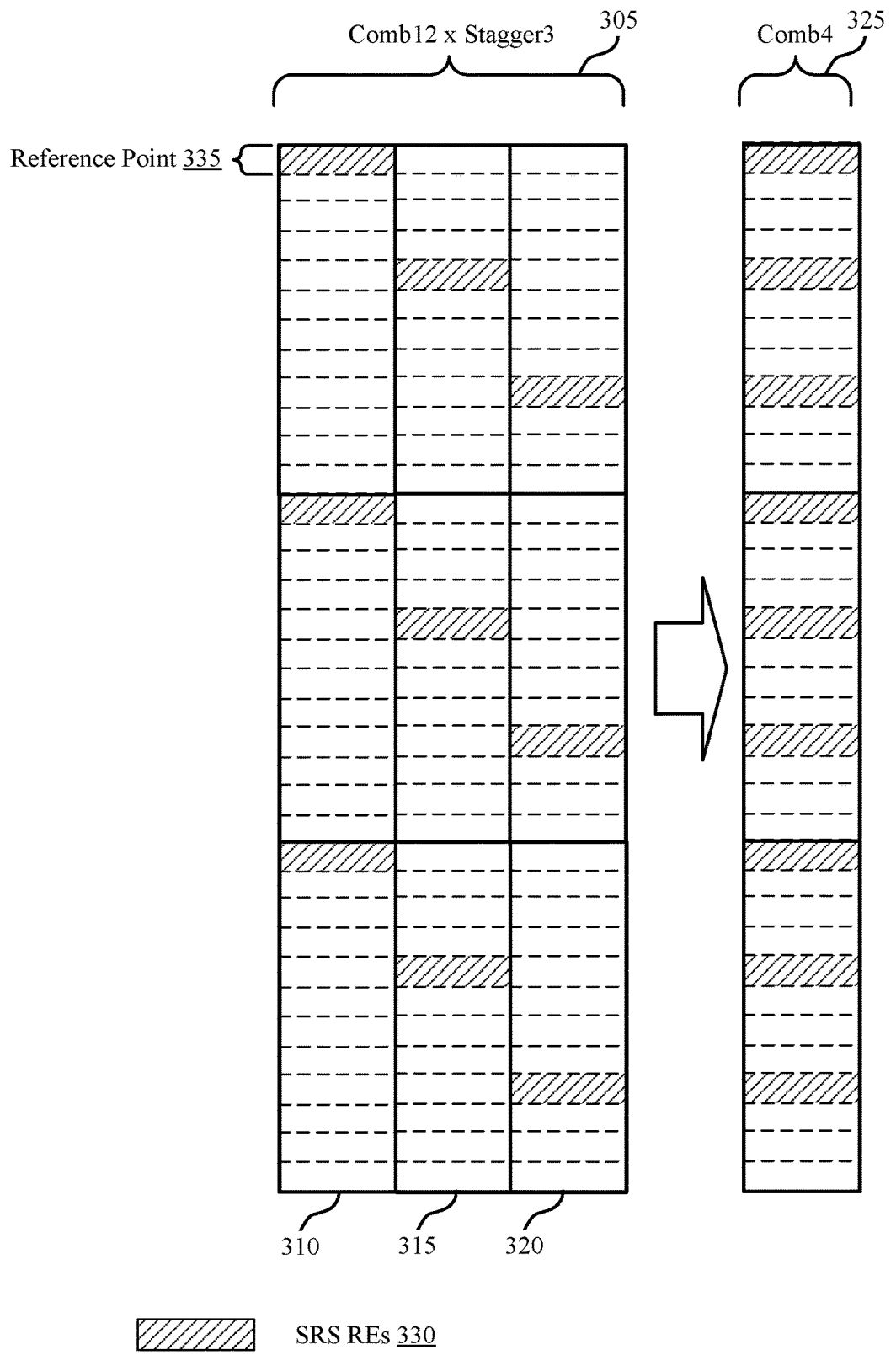
FIGS. 3 through 8 illustrate examples of SRS staggering patterns that support SRS waveform design for wireless communications in accordance with aspects of the present disclosure.
Figure 4:
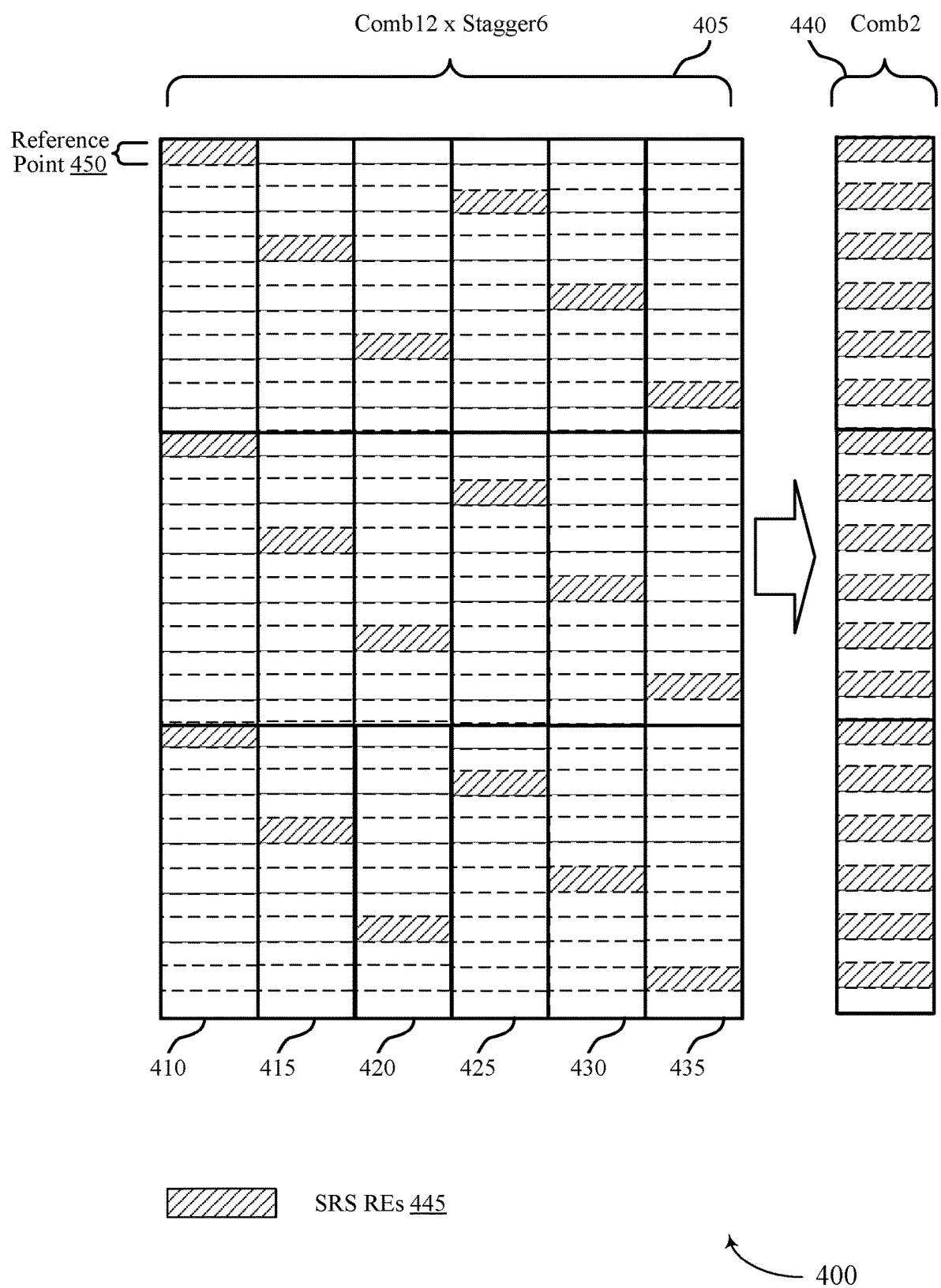
Figure 5:
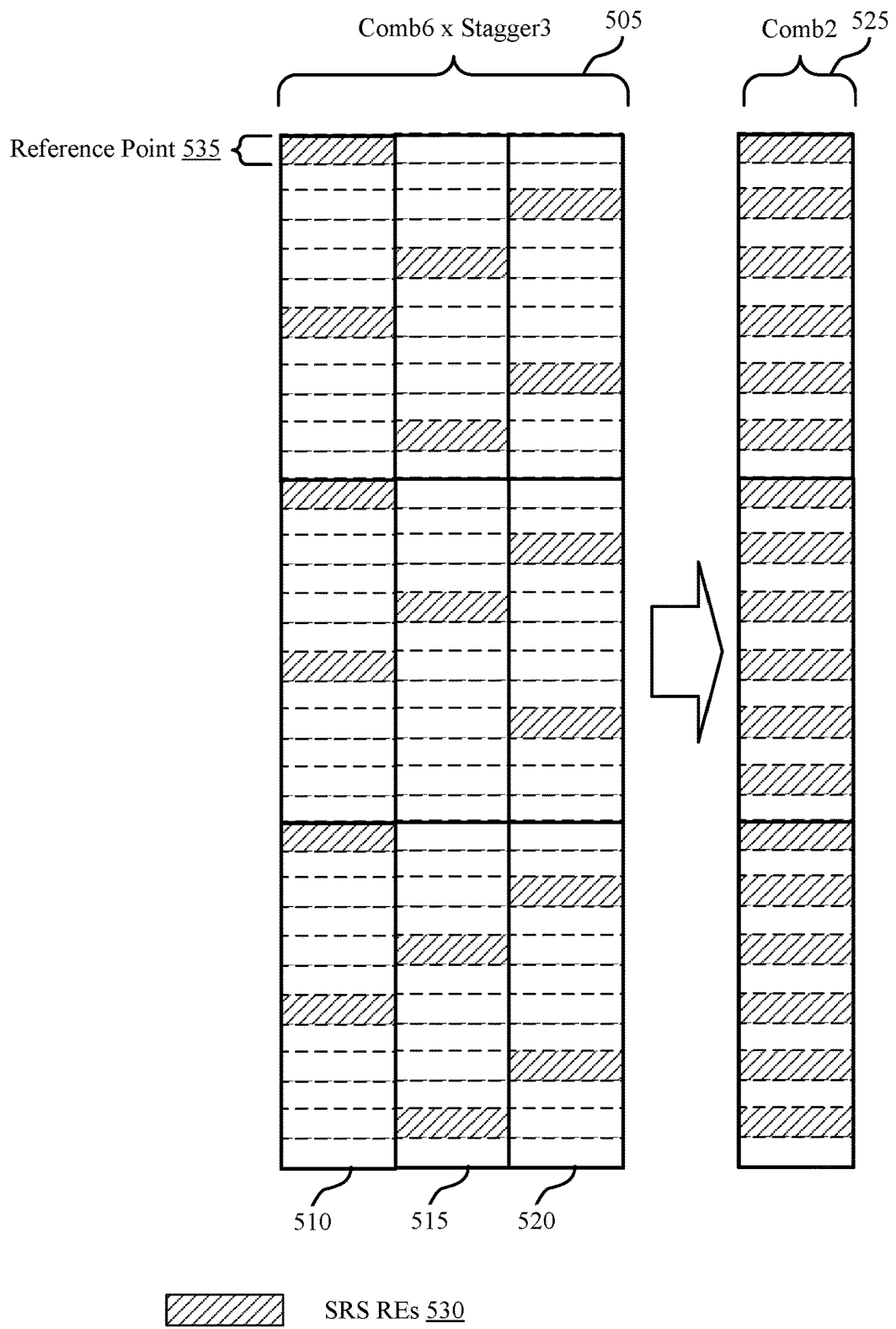
Figure 6:
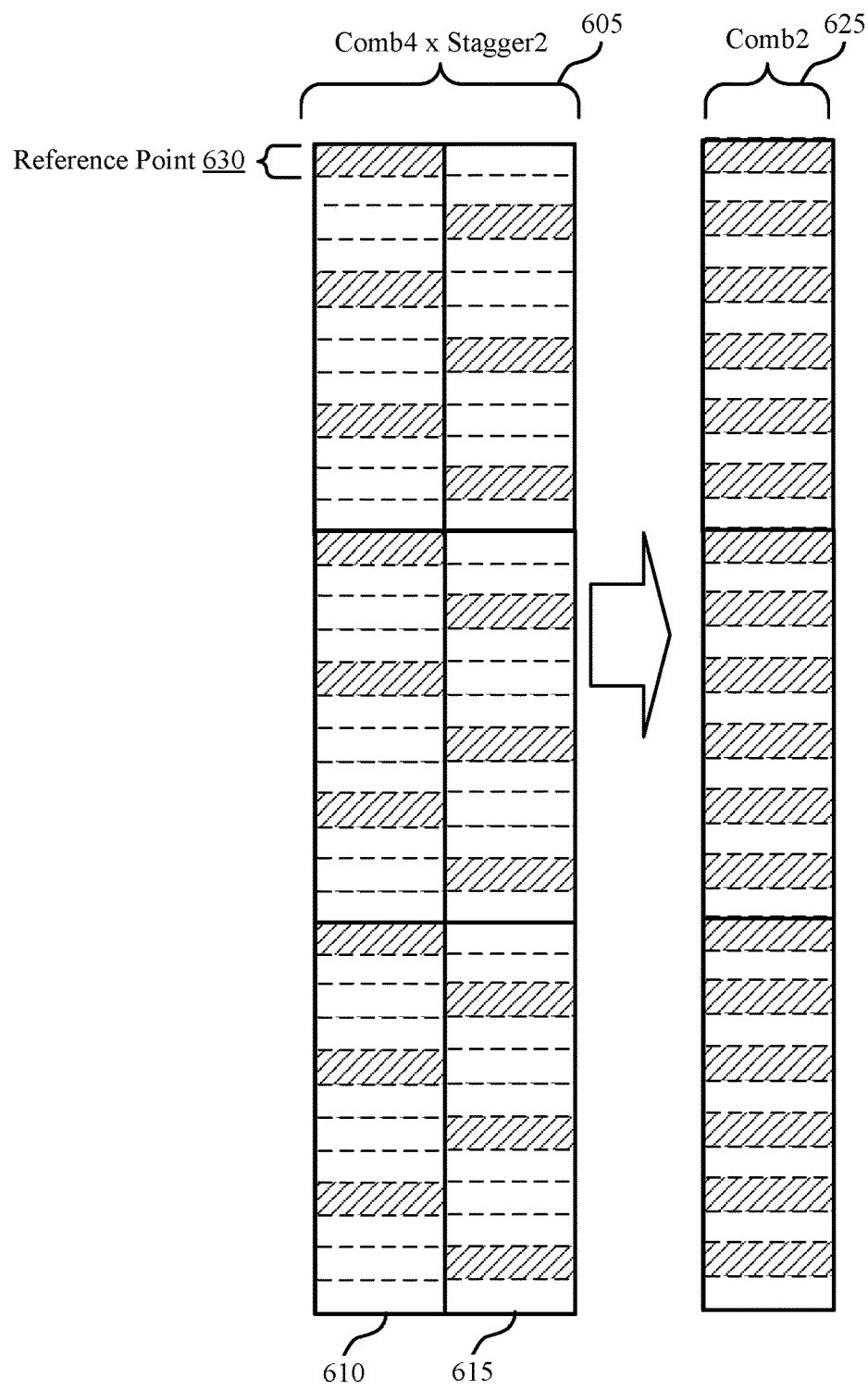

For example, if legacy SRS supports sequence lengths that are multiples of 12 and one RB contains 12 REs, in cases where the SRS configuration information 215 indicates a comb12 (i.e., 1 RE/RB for SRS), the base station 105 may configure (e.g., provide) an SRS allocation to be a multiple of 12 RBs, and for a comb6 (i.e., 2 RE/RB for SRS) the base station 105 may configure (e.g., provide) an SRS allocation to be multiple of 6 RBs. In some cases, a set of supported combinations of per-symbol comb and staggering level (e.g., in a notation of per symbol comb×staggering level) may include a 12×3 (i.e., each SRS symbol is comb12, and stagger 3 symbols with 4 RE offset, to provide a combined comb4 when destaggered, as illustrated in FIG. 3), in which a prior 1/2/4 symbol SRS becomes 3/6/12 symbols respectively. The set of supported combinations may also include a 12×6 (i.e., each SRS symbol is comb12, and stagger 6 symbols with 2 RE offset, to provide a combined comb2 when destaggered, as illustrated in FIG. 4), in which a prior 1/2/4 symbol SRS becomes 6/12/24 symbols respectively (in some cases the 24 symbol case may be dropped). The set of supported combinations may also include a 6×3 (i.e., each SRS symbol is comb6, and stagger 3 symbols with 2 RE offset, to provide a combined comb2 when destaggered, as illustrated in FIG. 5), in which a prior 1/2/4 symbol SRS becomes 3/6/12 symbols respectively. The set of supported combinations may also include 4×2 (i.e., each SRS symbol is comb4, and stagger 2 symbols with 2 RE offset, to provide a combined comb2 when destaggered, as illustrated in FIG. 6), in which a prior 1/2/4 symbol SRS becomes 2/4/8 symbols respectively. In some cases, each supported combination may be mapped to an index value, and the index value provided in the SRS configuration information 215. In some cases, the SRS configuration information 215 may include indications for the comb level and stagger. In some cases, SRS sequences may be associated with each supported combination, and selected based on the indicated SRS combination. In some cases, the SRS configuration information 215 may be provided by RRC signaling.

Figure 7:
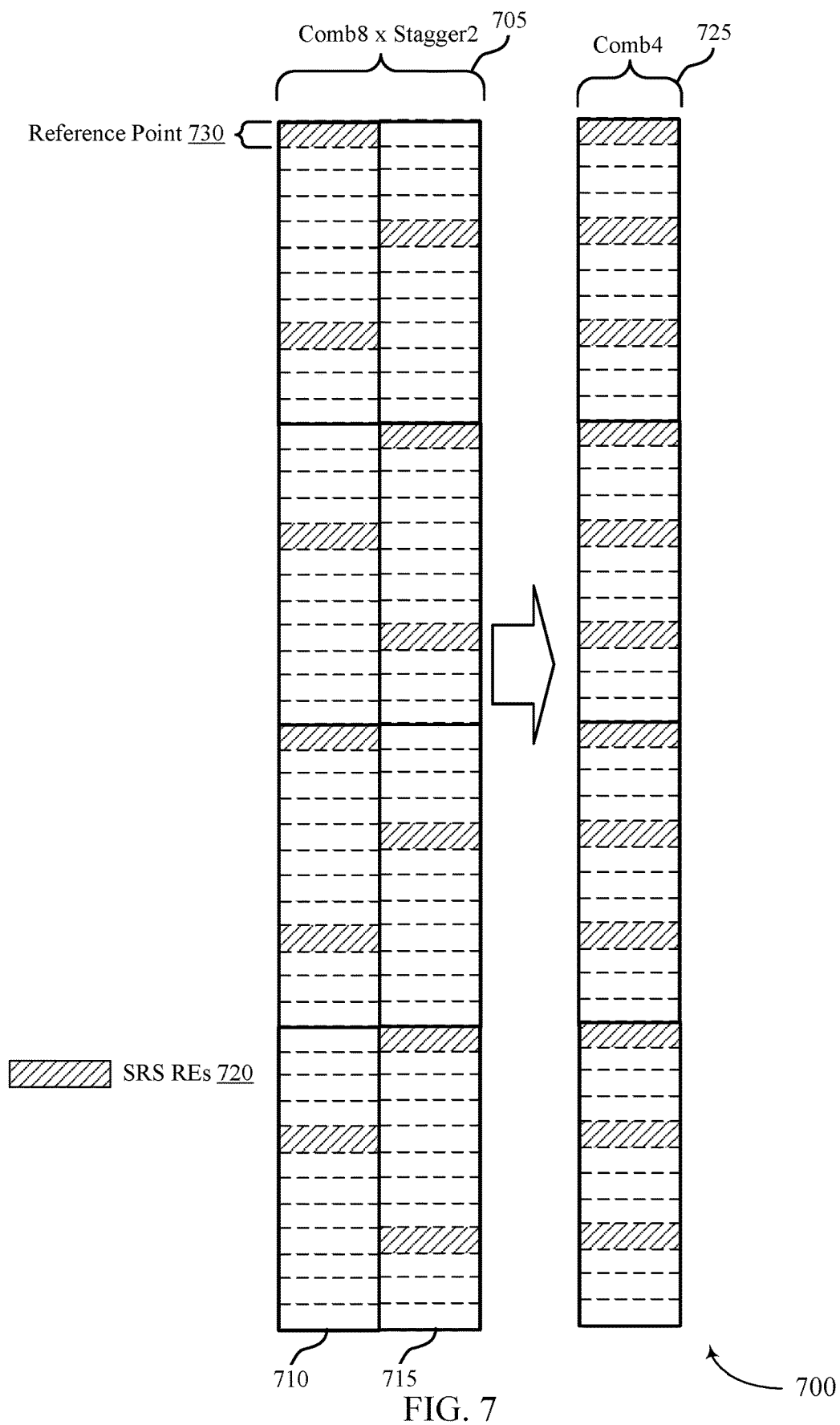

In some cases, additional supported combinations may be provided in which different RBs may have different numbers of SRS REs such that the SRS pattern in frequency repeats every two or more RBs. For example, a comb of eight results in an uneven distribution of SRS REs across two RBs, with adjacent RBs having different numbers of SRS RBs. However, the same pattern repeats every two RBs. In some cases, established SRS sequences supporting lengths that are a multiple of 12 may be used for the SRS transmissions, and the allocation may be in multiples of 8 RBs to conform with such established sequences, as this results in three SRS REs every two RBs, and with 8 RBs 12 SRS REs are present. In some cases, such techniques may be used to provide additional supported combinations. In one example, an additional supported combination may be an 8×4 (i.e., each SRS symbol is comb8, and stagger 2 symbols with 4 RE offset, to provide a combined comb4 when destaggered, as illustrated in FIG. 7), in which a prior 1/2/4 symbol SRS becomes 2/4/8 symbols respectively. In some cases, the supported combinations may also include an 8×2 (i.e., each SRS symbol is comb8, and stagger 4 symbols with 2 RE offset, to provide a combined comb2 when destaggered, at illustrated in FIG. 8), in which a prior 1/2/4 symbol SRS becomes 4/8/16 symbols respectively (in some cases the 16 symbol case may be dropped). In some cases, to maintain the same number of SRSs per symbol, the SRS allocation may be a multiple of 2RBs.

Such SRS staggering techniques may provide a number of benefits. For example, staggered SRS transmissions in each symbol may use an established SRS sequence to provide a relatively low PAPR waveform, and new sequences or sequence lengths may not be needed in addition to existing SRS sequences. In some examples, such techniques may also allow for more frequency division multiplexing of different UEs' SRS, so the LBT gap for a relatively large number of UEs is aligned, and additional LBT gaps between time division multiplexed SRS transmissions may be reduced or eliminated. Such techniques may also be used with interlaced SRS waveforms and Zadoff-Chu sequences or computer generated sequences (length <36) may be used (with or without repetitions). Further, techniques provided herein may provide that SRS tones are uniformly spaced per symbol before staggering and uniformly spaced after destaggering, so FFT-based channel estimation can be used (before or after destaggering).

Figure 9:
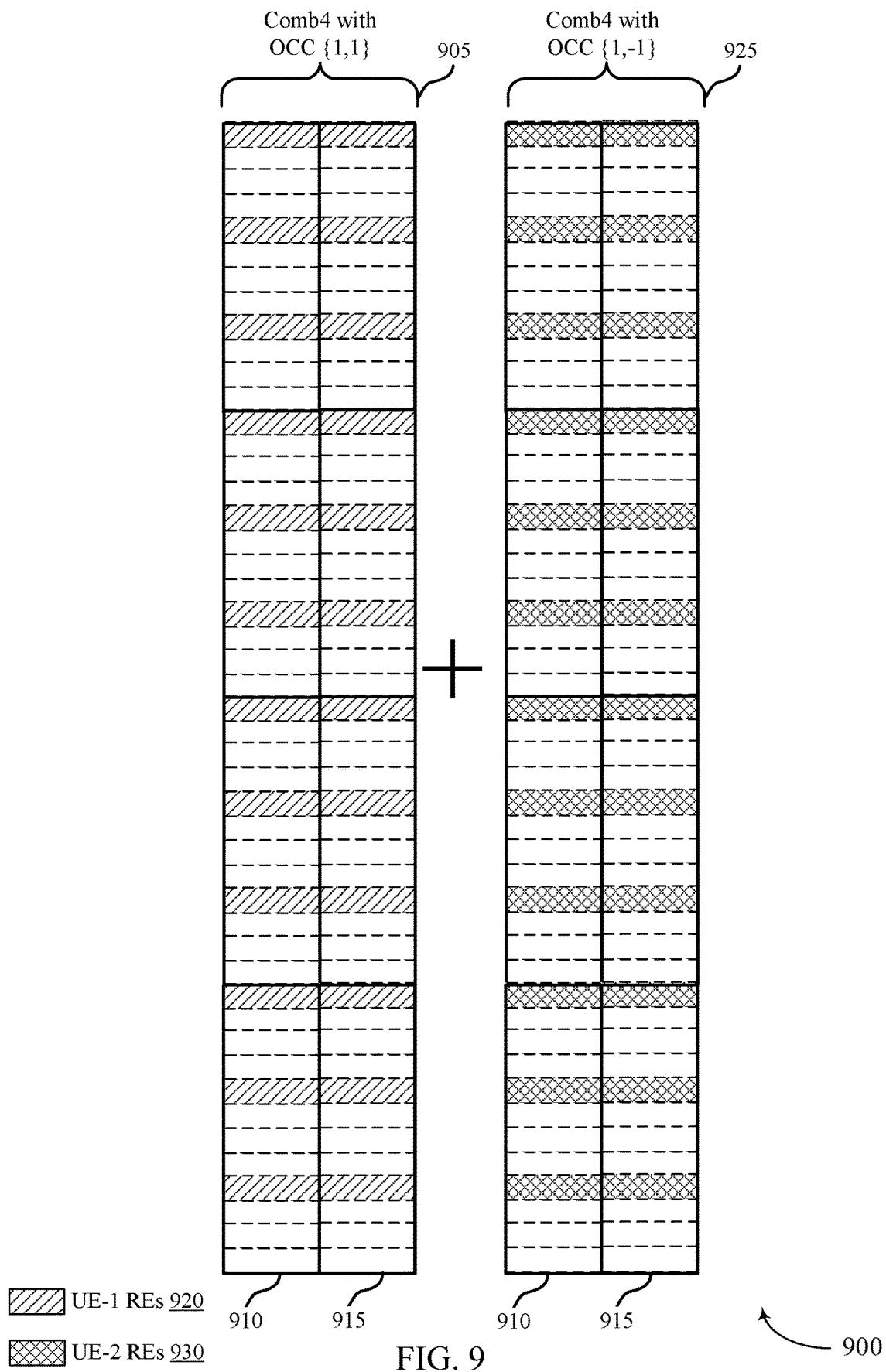
FIG. 9 illustrates an example of an orthogonal cover code (OCC) technique for sounding reference signal waveform transmissions in accordance with aspects of the present disclosure.

Further, in some cases, a time domain OCC may be used in SRS transmissions that span two or more OFDM symbols. In such cases, for each OFDM symbol in an SRS resource, the SRS may be expanded to K symbols and a K-symbol time domain OCC may be applied. For example, K may be two (K=2) with an OCC mask {1,1}, {1,−1} (e.g., as illustrated in FIG. 9). In other cases, K may be three (K=3) with OCC mask {1, 1, 1}, {1, $e^{j2\pi/3}$, $e^{j4\pi/3}$}, {1, $e^{j4\pi/3}$, $e^{j2\pi/3}$}. In further examples, K may be four (K=4) with OCC mask {1,1,1,1}, {1,j,−1,−j},{1,−1,1,−1}, {1,−j,−1, j}. For a given OCC level of K, the 1/2/4 length SRS resource becomes 1K/2K/4K respectively. As such, the OCC mask may effectively lengthen the SRS resource such that a greater number of UEs may transmit SRS within the SRS resource (e.g., within the same number of symbols previously used by an SRS transmission from a single UE). Accordingly, with an OCC mask of K, K UEs can be multiplexed. For instance, with an OCC mask of K=2, the 1/2/4 length SRS resource may become 2/4/8, which may enable two UEs to multiplex SRS transmission within the SRS resource. In some cases, the SRS configuration information 215 may include an indication of K and the OCC mask index. The OCC UEs may be configured with the same K, different OCC mask, and the same comb structure/offset and sequence. In such cases, the comb level of the SRS does not change, and the SRS sequence design does not need to change.

In some cases, staggered SRS symbols can also be repeated, and frequency hopping implemented for repeated SRS transmissions. Likewise, time-domain OCC may be used in conjunction with SRS repetitions and frequency hopping. When frequency hopping or repetition is used for SRS with staggered SRS symbols or SRS using time domain OCC, the repetitions and hopping is applied in groups of SRS where each group of SRS includes all SRS transmissions belonging to one set of staggered SRS and/or covering all symbols spanning one time-domain OCC. For example, a first group of SRS symbols formatted according to a first SRS configuration (e.g., a first SRS staggering pattern) may be frequency hopped with a second group of SRS symbols formatted according to a second SRS configuration (e.g., a second SRS staggering pattern). In some examples, the frequency hopping may offset the SRS REs in the first group of SRS symbols by a number of REs (e.g., one RE).

Such repetition of SRS may increase the reliability of SRS transmissions and improve overall system robustness. Further, transmitting repetitions of SRS in groups of SRS symbols may enable the UE 115 to transmit SRS according to a number of different SRS configurations (e.g., different staggering patterns), which may allow for greater flexibility at the UE 115. Transmitting repetitions of SRS in groups of SRS symbols may also increase the reliability of SRS transmissions by mitigating the influence of interference (e.g., as a result of transmitting SRS over variable time durations). Moreover, the UE 115 may implement frequency hopping in conjunction with SRS repetition to reduce the influence of interference, which similarly enhance the reliability of SRS transmissions. For instance, some frequency bands may be experience higher levels of interference than others, and frequency hopping may increase the likelihood that the UE 115 transmits SRS (or repetitions of SRS) on frequency bands associated with low levels of interference.

In some cases, UE 115 may need to transmit different SRS waveforms for different purposes. For example, for uplink scheduling or uplink beam sweeping, interlaced waveforms may be sufficient to support a relatively large number of UEs. In other cases, for downlink channel estimation with uplink channel reciprocity or uplink positioning, the UE 115 may need to transmit a legacy SRS waveform. In some cases, different waveforms (legacy, staggered, OCC based, or interlaced) of SRS may coexist at the SRS-resource level or the SRS-resourceSet level (i.e., apply the restriction that all resources in a resource set are of the same waveform). In some cases, different SRS resources may be configured with different waveforms for a same UE. In some cases, a UE may be triggered or configured to transmit one of the SRS transmissions with different waveforms depending on system utilization at a given time.

FIG. 3 illustrates an example of an SRS staggering pattern 300 that supports SRS waveform design for wireless communications in accordance with various aspects of the present disclosure. In some examples, SRS staggering patterns 300 may implement aspects of wireless communications system 100 or wireless communications system 200. In this example, a comb12×stagger 3 pattern 305 is illustrated, in which a first symbol 310, a second symbol 315, and a third symbol 320 each contain staggered SRS REs 330 located every 12th RE. The combined pattern 325 (e.g., after destaggering) results in a comb4 pattern. In some examples, the SRS REs 330 in each symbol may be staggered or offset relative to a reference point 335. In some examples, the reference point 335 may be the first RE (e.g., the highest frequency RE) including an SRS RE 330.

FIG. 4 illustrates an example of an SRS staggering pattern 400 that supports SRS waveform design for wireless communications in accordance with various aspects of the present disclosure. In some examples, SRS staggering pattern 400 may implement aspects of wireless communications system 100 or wireless communications system 200. In this example, a comb12×stagger 6 pattern 405 is illustrated, in which a first symbol 410, a second symbol 415, a third symbol 420, a fourth symbol 425, a fifth symbol 430, and a sixth symbol 435 each contain staggered SRS REs 445 located every 12th RE. The combined pattern 440 (e.g., after destaggering) results in a comb2 pattern. In some examples, the SRS REs 445 in each symbol may be staggered or offset relative to a reference point 450. In some examples, the reference point 450 may be the first RE (e.g., the highest frequency RE) including an SRS RE 445.

FIG. 5 illustrates an example of an SRS staggering pattern 500 that supports SRS waveform design for wireless communications in accordance with various aspects of the present disclosure. In some examples, SRS staggering pattern 500 may implement aspects of wireless communications system 100 or wireless communications system 200. In this example, a comb6×stagger 3 pattern 505 is illustrated, in which a first symbol 510, a second symbol 515, and a third symbol 520 each contain staggered SRS REs 530 located every 6th RE. The combined pattern 525 (e.g., after destaggering) results in a comb2 pattern. In some examples, the SRS REs 530 in each symbol may be staggered or offset relative to a reference point 535. In some examples, the reference point 535 may be the first RE (e.g., the highest frequency RE) including an SRS RE 530.

In some aspects, the SRS staggering pattern 500 may include a set of SRS REs 530 in the first symbol 510 (e.g., a first subset of frequency resources), a set of SRS REs 530 in the second symbol 515 (e.g., a second subset of frequency resources), and a set of SRS REs 530 in the third symbol 520 (e.g., a third subset of frequency resources. The set of SRS REs 530 in the first symbol 510 may be associated with a first RE offset relative to the reference point 535, the set of SRS REs 530 in the second symbol 515 may be associated with a second RE offset relative to the reference point 535, and the set of SRS REs 530 in the third symbol 520 may be associated with a third RE offset relative to the reference point 535.

In some examples, the first RE offset, the second RE offset, and the third RE offset may be non-uniform relative to each other, as discussed above. In the example of SRS staggering pattern 500, the first RE offset may be zero REs relative to the reference point 535, the second RE offset may be four REs relative to the reference point 535, and the third RE offset may be two REs relative to the reference point 535. As such, the set of SRS REs 530 in the second symbol 515 may be offset from the set of SRS REs 530 in the first symbol 510 by four REs and the set of SRS REs 530 in the third symbol 520 may be offset from the set of SRS REs 530 in the second symbol 515 by two REs. Accordingly, the set of SRS REs 530 in the first symbol 510 (e.g., the first subset of frequency resources), the set of SRS REs 530 in the second symbol 515 (e.g., the second subset of frequency resources), and the set of SRS REs 530 in the third symbol 520 (e.g., the third subset of frequency resources) may be non-uniformly staggered in frequency relative to each other. Such non-uniform staggering may enable multiple UEs to transmit SRS simultaneously without collision, while also maintaining a uniform combined comb structure.

FIG. 6 illustrates an example of an SRS staggering pattern 600 that supports SRS waveform design for wireless communications in accordance with various aspects of the present disclosure. In some examples, SRS staggering pattern 600 may implement aspects of wireless communications system 100 or wireless communications system 200. In this example, a comb4×stagger 2 pattern 605 is illustrated, in which a first symbol 610 and second symbol 615 each contain staggered SRS REs 620 located every 4th RE. The combined pattern 625 (e.g., after destaggering) results in a comb2 pattern. In some examples, the SRS REs 620 in each symbol may be staggered or offset relative to a reference point 630. In some examples, the reference point 630 may be the first RE (e.g., the highest frequency RE) including an SRS RE 620.

FIG. 7 illustrates an example of an SRS staggering pattern 700 that supports SRS waveform design for wireless communications in accordance with various aspects of the present disclosure. In some examples, SRS staggering pattern 700 may implement aspects of wireless communications system 100 or wireless communications system 200. In this example, a comb8×stagger 2 pattern 705 is illustrated, in which a first symbol 710 and second symbol 715 each contain staggered SRS REs 720 that are in a uniform pattern that spans multiple RBs, with SRS REs 720 located every 8th RE. The combined pattern 725 (e.g., after destaggering) results in a comb4 pattern. In some examples, the SRS REs 720 in each symbol may be staggered or offset relative to a reference point 730. In some examples, the reference point 730 may be the first RE (e.g., the highest frequency RE) including an SRS RE 720.

Figure 8:
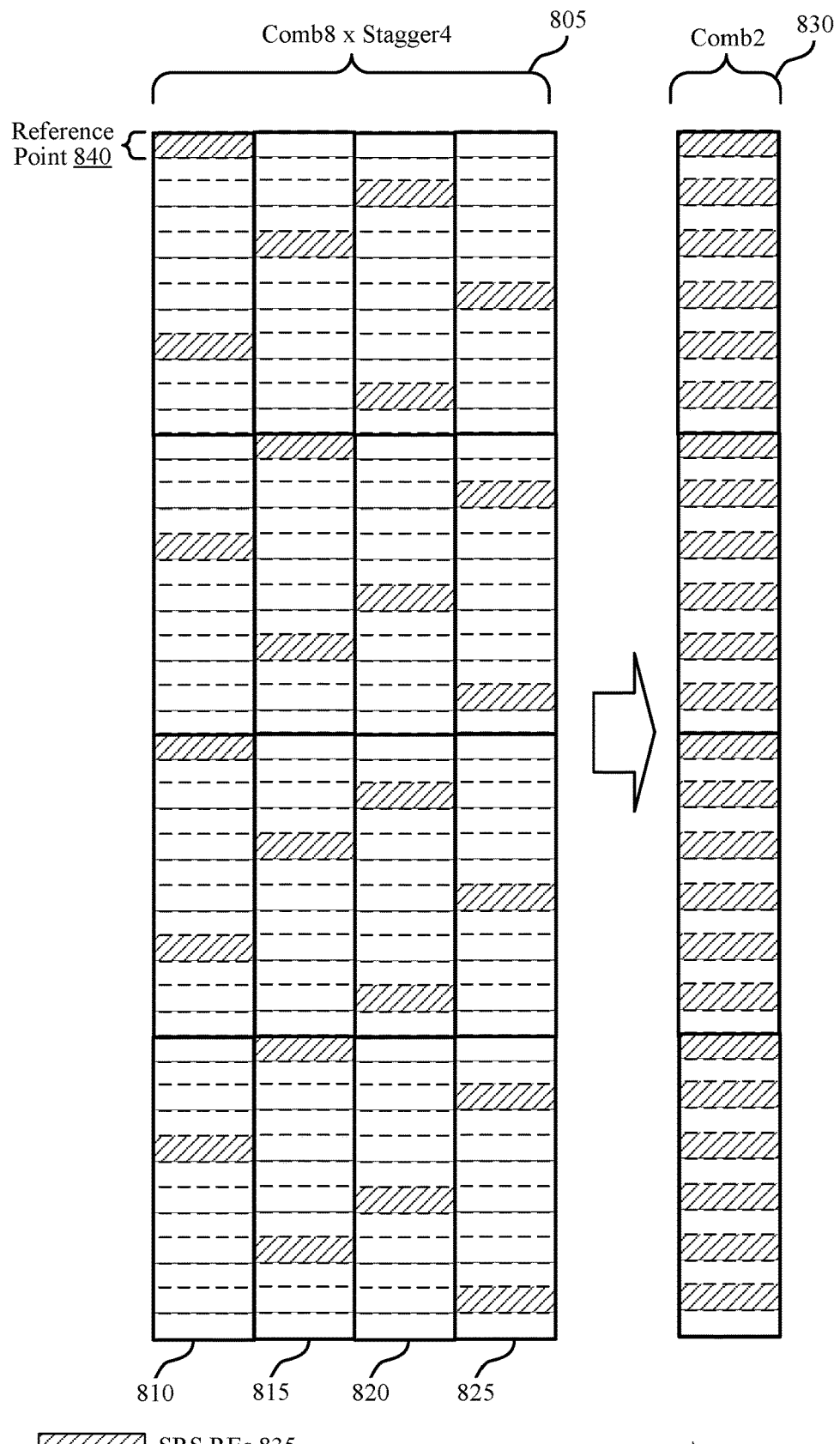

FIG. 8 illustrates an example of an SRS staggering pattern 800 that supports SRS waveform design for wireless communications in accordance with various aspects of the present disclosure. In some examples, SRS staggering pattern 800 may implement aspects of wireless communications system 100 or wireless communications system 200. In this example, a comb8×stagger 4 pattern 805 is illustrated, in which a first symbol 810, a second symbol 815, a third symbol 820, and a fourth symbol 825 each contain staggered SRS REs 835 that are in a uniform pattern that spans multiple RBs, with SRS REs 835 located every 8th RE. The combined pattern 830 (e.g., after destaggering) results in a comb2 pattern. In some examples, the SRS REs 835 in each symbol may be staggered or offset relative to a reference point 840. In some example, the reference point 840 may be the first RE (e.g., the highest frequency RE) including an SRS RE 835.

In some aspects, the SRS staggering pattern 800 may include a set of SRS REs 835 in the first symbol 810 (e.g., a first subset of frequency resources), a set of SRS REs 835 in the second symbol 815 (e.g., a second subset of frequency resources), a set of SRS REs 835 in the third symbol 820 (e.g., a third subset of frequency resources), and a set of SRS REs 835 in the fourth symbol 825 (e.g., a fourth subset of frequency resources). The set of SRS REs 835 in the first symbol 810 may be associated with a first RE offset relative to the reference point 840, the set of SRS REs 835 in the second symbol 815 may be associated with a second RE offset relative to the reference point 840, the set of SRS REs 835 in the third symbol 820 may be associated with a third RE offset relative to the reference point 840, and the set of SRS REs 835 in the fourth symbol 825 may be associated with a fourth RE offset relative to the reference point 840.

In some examples, the first RE offset, the second RE offset, the third RE offset, and the fourth RE offset may be non-uniform relative to each other. In the example of SRS staggering pattern 800, the first RE offset may be zero REs relative to the reference point 840, the second RE offset may be four REs relative to the reference point 840, the third RE offset may be two REs relative to the reference point 840, and the fourth RE offset may be six REs relative to the reference point 840. In some aspects, this non-uniform staggering pattern may be referred to as a {0, 4, 2, 6} staggering pattern. As such, the set of SRS REs 835 in the second symbol 815 may be offset from the set of SRS REs 835 in the first symbol 810 by four REs, the set of SRS REs 835 in the third symbol 820 may be offset from the set of SRS REs 835 in the second symbol 815 by two REs, and the set of SRS REs 835 in the fourth symbol 825 may be offset from the set of SRS REs 835 in the third symbol 820 by four REs. Accordingly, the set of SRS REs 835 in the first symbol 810 (e.g., the first subset of frequency resources), the set of SRS REs 835 in the second symbol 815 (e.g., the second subset of frequency resources), the set of SRS REs 835 in the third symbol 820 (e.g., the third subset of frequency resources), and the set of SRS REs 835 in the fourth symbol 825 (e.g., the fourth subset of frequency resources) may be non-uniformly staggered in frequency relative to each other. Such non-uniform staggering may enable multiple UEs to transmit SRS simultaneously (without collision) while maintaining a uniform combined comb structure. Put another way, the non-uniform staggering for SRS transmissions may provide a uniform SRS comb structure across multiple resources in addition to transmit diversity for a greater number of UEs (e.g., as compared to when no staggering or when a uniform staggering pattern is used).

FIG. 9 illustrates an example of an OCC technique 900 for SRS waveform transmissions in accordance with various aspects of the present disclosure. In some examples, the OCC technique 900 may implement aspects of wireless communications system 100 or wireless communications system 200. In some examples, time domain OCC may be used in SRS transmissions that span two or more OFDM symbols. In one example, a first SRS pattern 905 for a first UE may be a comb4 pattern that has SRS REs 920 every 4th RE and SRS REs 920 included in each of a first symbol 910 and a second symbol 915. A second UE may have a second SRS pattern 925 in which the second UE may use the same comb4 pattern that has SRS REs 930 every 4th RE and SRS REs 930 included in each of the first symbol 910 and the second symbol 915 at a same RE offset as the first UE. In such cases, for each OFDM symbol in an SRS resource, the SRS may be expanded to K symbols and the K-symbol time domain OCC may be applied. Accordingly, the first UE may transmit SRS REs 920 in the same resource location (e.g., within the same symbols and REs) as the second UE may transmit SRS REs 930, however, by using the OCC mask, the SRS transmissions from the first UE and the second UE may avoid interfering with each other.

In the example of FIG. 9, K=2 with an OCC mask {1,1}, {1,-1}. As such, a base station may receive the SRS transmissions from the first UE and the second UE even though the first UE and the second UE employed similar SRS configurations (e.g., the same comb patterns and the same RE offset). In other words, the base station, as a result of the OCC mask, may effectively decode the SRS REs 920 and the SRS REs 930 (e.g., as if they were transmitted in separate OFDM symbols). In other examples, K may be three (K=3) with OCC mask $\{1, 1, 1\}$, $\{1, e^{j2\pi/3}, e^{j4\pi/3}\}$, $\{1, e^{j4\pi/3}, e^{j2\pi/3}\}$. In further examples, K may be four (K=4) with OCC mask $\{1,1,1,1\}$, $\{1,j,-1,-j\}$, $\{1,-1,1,-1\}$, $\{1,-j,-1, j\}$. In some cases, a pattern of a frequency domain varying OCC may be obtained by multiplying a fixed time domain OCC pattern with a phase ramp. For example, the phase ramp may be provided according to a sequence of the form $e^{j*f*tita}$, where f is frequency and tita is a constant provided in a specification or signaled from the base station.

Figure 10:
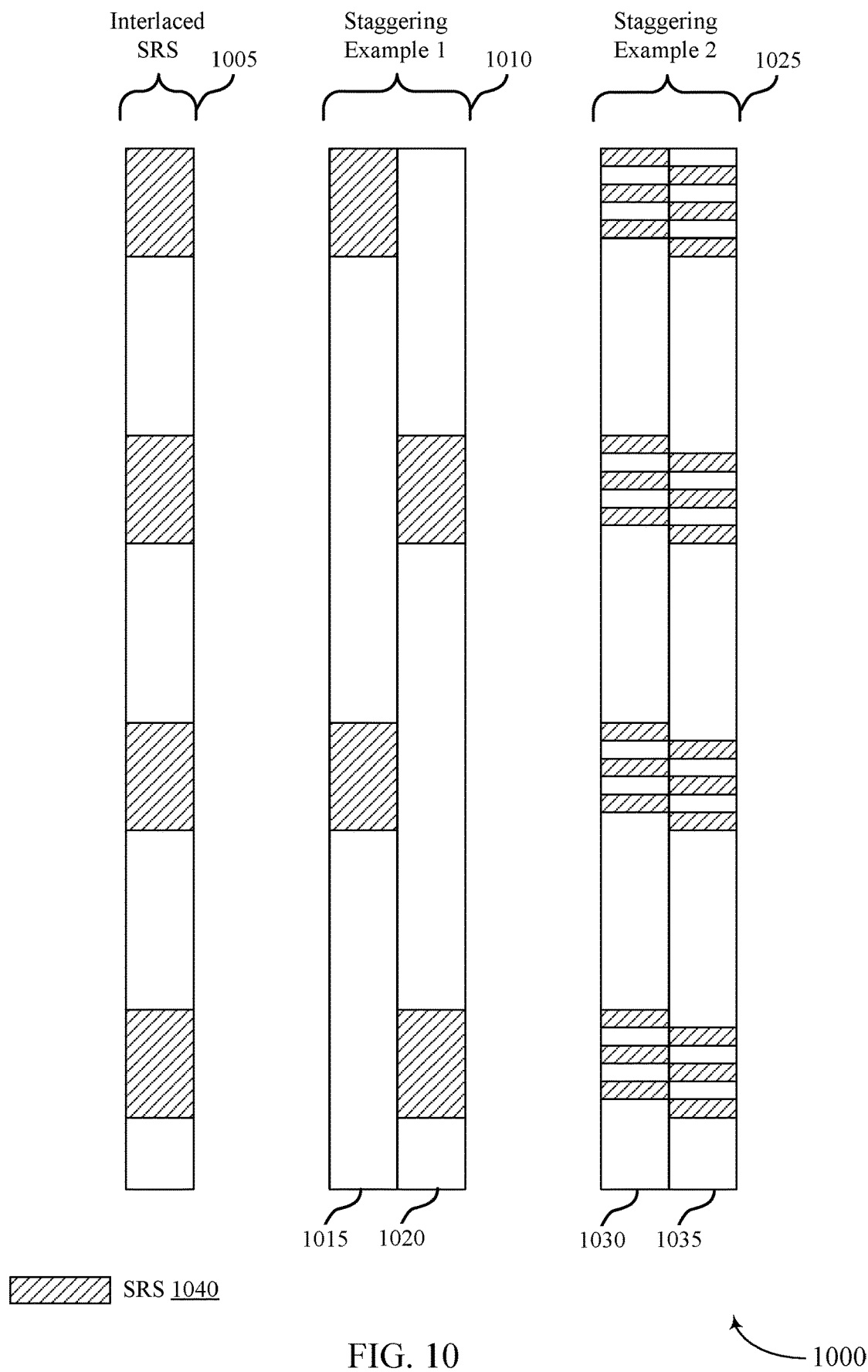
FIG. 10 illustrates examples of staggered SRS interlaces that support SRS waveform design for wireless communications in accordance with aspects of the present disclosure.

FIG. 10 illustrates examples of staggered SRS interlaces 1000 that support SRS waveform design for wireless communications in accordance with various aspects of the present disclosure. In some examples, staggered SRS interlaces 1000 may implement aspects of wireless communications system 100 or wireless communications system 200. In this example, an interlaced SRS transmission 1005 is illustrated that includes SRS resources 1040. In some cases, staggering may be provided on an SRS interlace, such as illustrated in a first staggering example 1010, in which a first symbol 1015 and a second symbol 1020 include the SRS resources 1040 that may be staggered between the first symbol 1015 and the second symbol 1020.

In some cases, such as illustrated in a second staggering example 1025, the SRS resources 1040 may be staggered within an interlace in a first symbol 1030 and a second symbol 1035. In some examples, the interlace may offset the SRS resources 1040 in the first symbol 1030 from the SRS resources 1040 in the second symbol 1035 in frequency. For example, the SRS resources 1040 in the first symbol 1030 may occupy different frequency locations than the SRS resources 1040 in the second symbol 1035 based on the interlace (e.g., the SRS resources 1040 in the first symbol 1030 and the second symbol 1035 may avoid overlapping in the frequency domain). Additionally, the second staggering example 1025 may illustrate an interlace that alternates the SRS resources 1040 in the first symbol 1030 with the SRS resources 1040 in the second symbol 1035 in the frequency domain. For instance, the first symbol 1030 may include an SRS resource 1040 at a first frequency location, the second symbol 1035 may include an SRS resource 1040 at a second frequency location adjacent to the first frequency location, the first symbol 1030 may include an SRS resource 1040 at a third frequency location adjacent to the second frequency location, and so on. In other cases, OCC techniques may be used for SRS resources 1040 that may be transmitted by multiple UEs.

Figure 11:
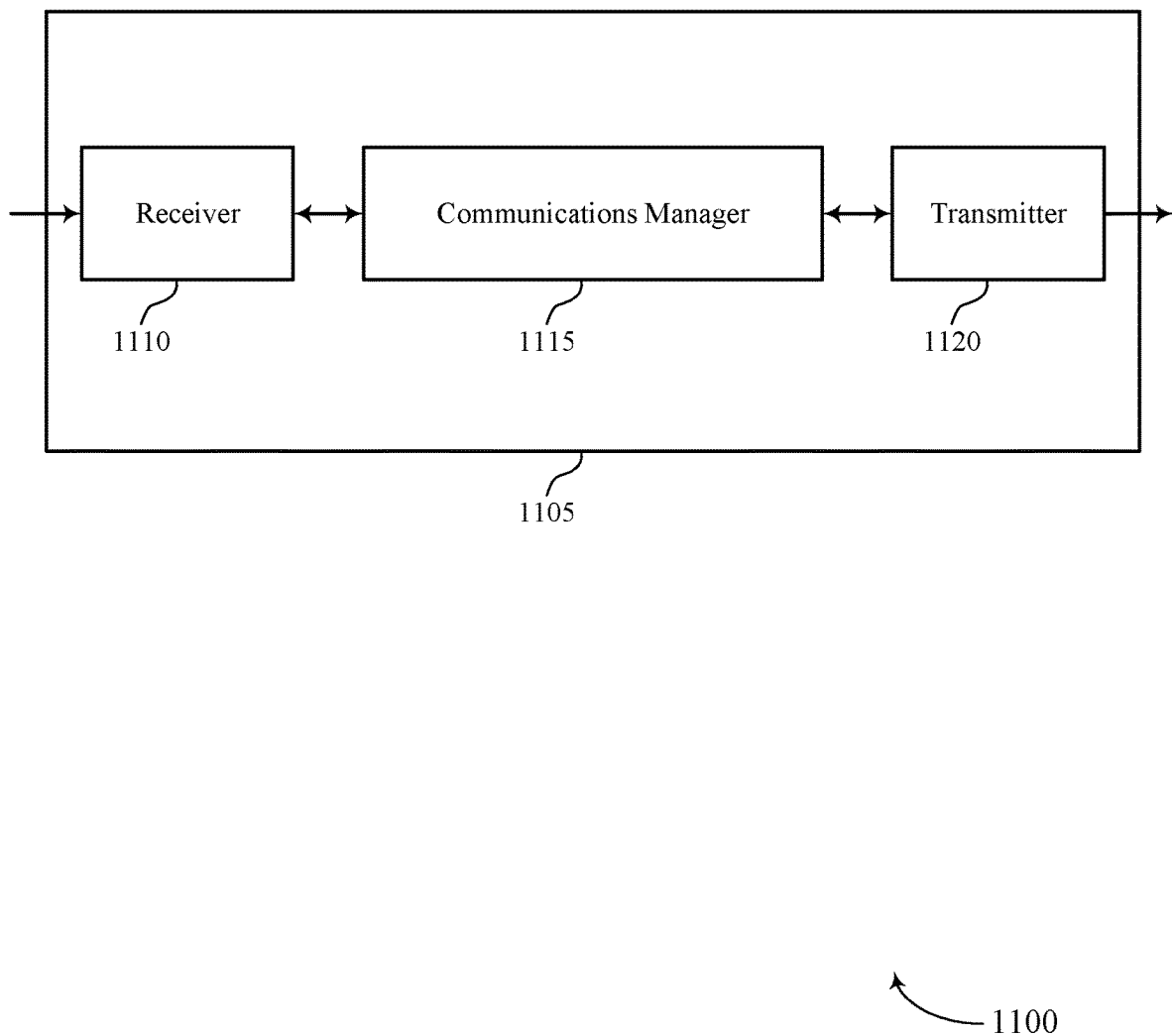
FIGS. 11 and 12 show block diagrams of devices that support SRS waveform design for wireless communications in accordance with aspects of the present disclosure.

FIG. 11 shows a block diagram 1100 of a device 1105 that supports SRS waveform designs for wireless communications in accordance with various aspects of the present disclosure. The device 1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to SRS waveform design for wireless communications, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify an SRS configuration for transmission of an SRS to a base station, the SRS configuration providing SRS resources across multiple OFDM symbols. In one illustrative example, the SRS configuration may provide SRS resources within at least a first OFDM symbol, a second OFDM symbol, a third OFDM symbol, and a fourth OFDM symbol. The communications manager may map, based on the SRS configuration, a first portion of the SRS to occupy a first subset of frequency resources of the first OFDM symbol, a second portion of the sounding reference signal to occupy a second subset of frequency resources of the second OFDM symbol, a third portion of the sounding reference signal to occupy a third subset of frequency resources of the third OFDM symbol, and a fourth portion of the SRS to occupy a fourth subset of frequency resources of the fourth OFDM symbol, where the first subset of frequency resources, the second subset of frequency resources, the third subset of frequency resources, and the fourth subset of frequency resources are non-uniformly staggered in frequency relative to each other, and transmit the SRS to the base station based on the mapping. Although described in the context of four symbols, this is for illustration and not for limitation, a similar procedure may apply for any number of symbols (e.g., for two symbols, three symbols, six symbols, eight symbols, twelve symbols, and so forth).

The communications manager 1115 may also identify an SRS configuration for transmission of an SRS to a base station, the SRS configuration providing SRS resources that occupy a same set of frequency resources within each of at least a first OFDM symbol and a second OFDM symbol, format (e.g., map), based on the SRS configuration, the SRS to occupy the same set of frequency resources within each of the first OFDM symbol and the second OFDM symbol, apply a time domain OCC to the SRS in each of the first OFDM symbol and the second OFDM symbol, and transmit the SRS to the base station. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

The communications manager 1115 may be implemented to realize one or more potential advantages. In one implementation, the device 1105 may employ one or more staggering techniques to enable the use of established SRS sequences and to avoid unnecessarily determining and using new sequences or new sequence lengths in addition to the existing SRS sequences. In some examples, the staggering techniques may provide uniformly spaced SRS tones per OFDM symbol before and after destaggering, which may enable FFT-based channel estimation procedures and result in greater processing efficiency and capacity at the device 1105. Based on achieving greater processing efficiency, the device 1105 may power down or employ longer sleep periods for one or more processing units associated with channel estimation, which may result in increased power savings and longer battery life.

Figure 12:
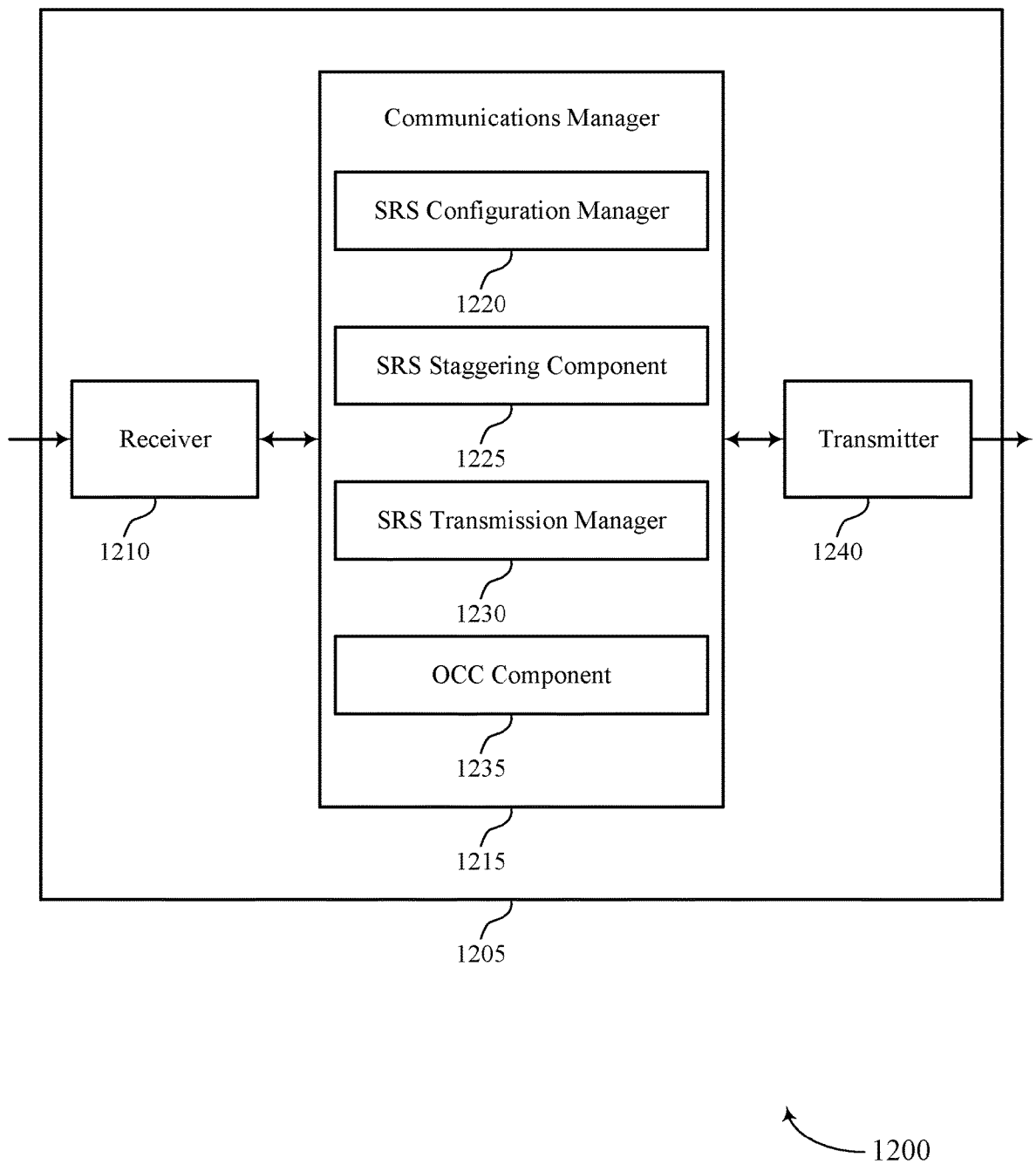

FIG. 12 shows a block diagram 1200 of a device 1205 that supports SRS waveform design for wireless communications in accordance with various aspects of the present disclosure. The device 1205 may be an example of aspects of a device 1105, or a UE 115 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to SRS waveform design for wireless communications, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an SRS configuration manager 1220, an SRS staggering component 1225, an SRS transmission manager 1230, and an OCC component 1235. The communications manager 1215 may be an example of aspects of the communications manager 1410 described herein.

The SRS configuration manager 1220 may identify an SRS configuration for transmission of an SRS to a base station, the SRS configuration providing SRS resources across multiple OFDM symbols. In one example, the SRS configuration may provide SRS resources within at least a first OFDM symbol, a second OFDM symbol, a third OFDM symbol, and a fourth OFDM symbol. Although described in the context of four symbols, this is for illustration not for limitation, a similar procedure may apply for any number of symbols (e.g., for two symbols, three symbols, six symbols, eight symbols, twelve symbols, and so forth).

The SRS staggering component 1225 may map the SRS transmissions in accordance with the SRS configuration. In one example, the SRS staggering component 1225 may map, based on the SRS configuration, a first portion of the SRS to occupy a first subset of frequency resources of the first OFDM symbol, a second portion of the sounding reference signal to occupy a second subset of frequency resources of the second OFDM symbol, a third portion of the sounding reference signal to occupy a third subset of frequency resources of the third OFDM symbol, and a fourth portion of the SRS to occupy a fourth subset of frequency resources of the fourth OFDM symbol. The first subset of frequency resources, the second subset of frequency resources, the third subset of frequency resources, and the fourth subset of frequency resources may be non-uniformly staggered in frequency relative to each other.

The SRS transmission manager 1230 may transmit the SRS to the base station based on the mapping.

The SRS configuration manager 1220 may also identify an SRS configuration for transmission of an SRS to a base station, the SRS configuration providing SRS resources that occupy a same set of frequency resources within each of at least a first OFDM symbol and a second OFDM symbol. In some examples, the SRS may occupy three or more symbols.

The OCC component 1235 may format (e.g., map), based on the SRS configuration, the SRS to occupy the same set of frequency resources within each of the first OFDM symbol and the second OFDM symbol and apply a time domain OCC to the SRS in each of the first OFDM symbol and the second OFDM symbol. Although described in the context of two symbols, this is for illustration not for limitation, a similar procedure may apply to three or more symbols.

The SRS transmission manager 1230 may also transmit the SRS to the base station. In some examples, the SRS transmission manager 1230 may transmit the SRS to the base station based on the formatting or the mapping.

The transmitter 1240 may transmit signals generated by other components of the device 1205. In some examples, the transmitter 1240 may be collocated with a receiver 1210 in a transceiver component. For example, the transmitter 1240 may be an example of aspects of the transceiver 1420 described with reference to FIG. 14. The transmitter 1240 may utilize a single antenna or a set of antennas.

Figure 13:
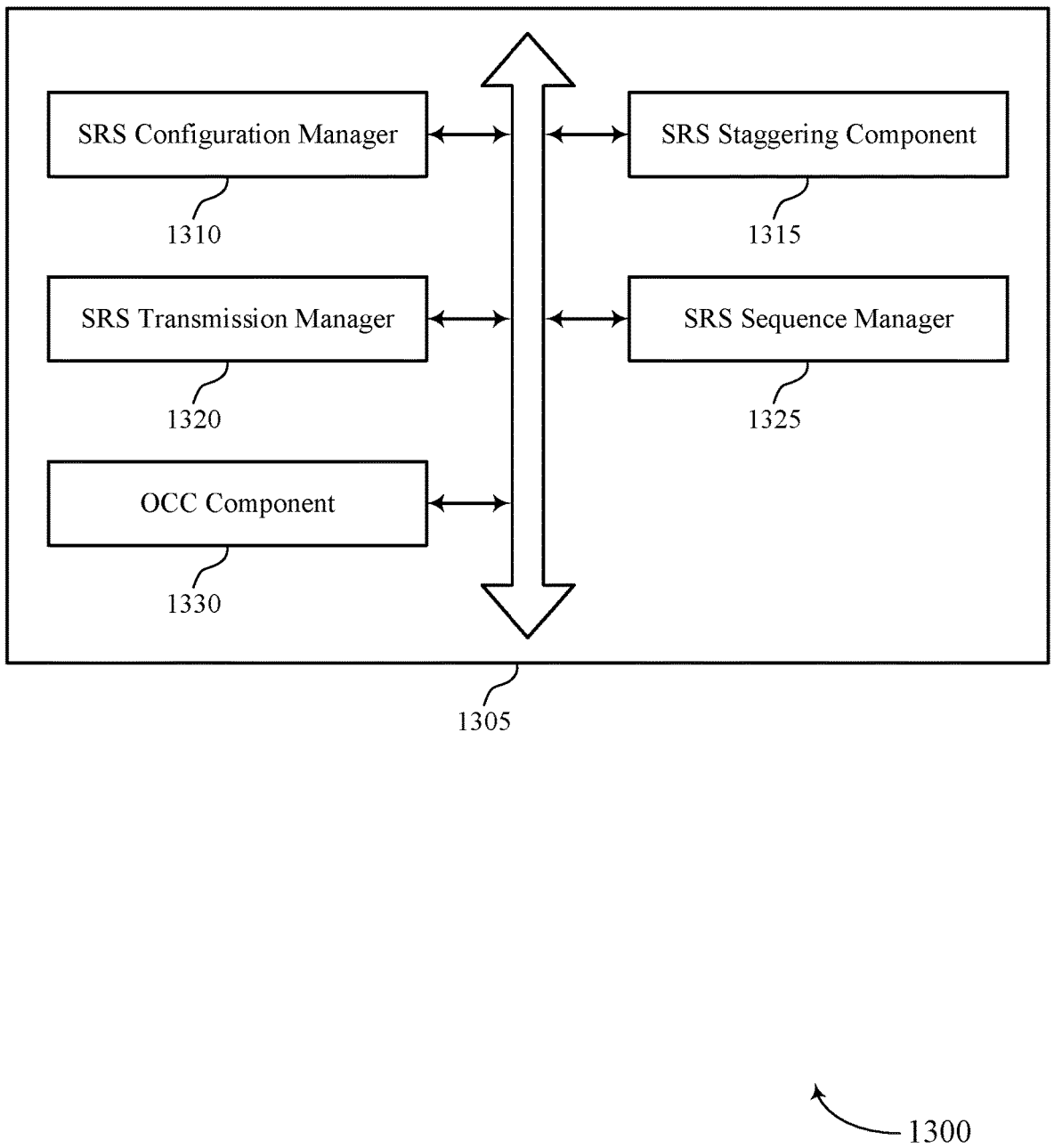
FIG. 13 shows a block diagram of a communications manager that supports SRS waveform design for wireless communications in accordance with aspects of the present disclosure.

FIG. 13 shows a block diagram 1300 of a communications manager 1305 that supports SRS waveform design for wireless communications in accordance with various aspects of the present disclosure. The communications manager 1305 may be an example of aspects of a communications manager 1115, a communications manager 1215, or a communications manager 1410 described herein. The communications manager 1305 may include an SRS configuration manager 1310, an SRS staggering component 1315, an SRS transmission manager 1320, an SRS sequence manager 1325, and an OCC component 1330. Each of these components may communicate, directly or indirectly, with one another (e.g., via one or more buses).

The SRS configuration manager 1310 may identify an SRS configuration for transmission of an SRS to a base station, the SRS configuration providing SRS resources across multiple OFDM symbols. In one example, the SRS configuration may provide SRS resources within at least a first OFDM symbol, a second OFDM symbol, a third OFDM symbol, and a fourth OFDM symbol. In some examples, the SRS configuration manager 1310 may identify an SRS configuration for transmission of an SRS to a base station, the SRS configuration providing SRS resources that occupy a same set of frequency resources within each of at least a first OFDM symbol, a second OFDM symbol, a third OFDM symbol, and a fourth OFDM symbol. In some cases, the first subset of frequency resources, the second subset of the frequency resources, the third subset of the frequency resources, and the fourth subset of frequency resources have an overlapping bandwidth span.

In some cases, the first subset of frequency resources, the second subset of frequency resources, the third subset of frequency resources, and the fourth subset of frequency resources lie in the same set of physical RBs. In some cases, the first subset of frequency resources is offset by a first number of resource elements relative to a reference point, the second subset of frequency resources is offset by a second number of resource elements relative to the reference point, the third subset of frequency resources is offset by a third number of resource elements relative to the reference point, and the fourth subset of frequency resources is offset by a fourth number of resource elements relative to the reference point. In some examples, the first number of resource elements, the second number of resource elements, the third number of resource elements, and the four number of resource elements are different, and in some aspects are 0, 4, 2, and 6, respectively.

In some cases, the SRS configuration indicates a number of OFDM symbols across which the SRS is to be sent using different staggering offsets and an index that indicates a number of staggering offsets to be used on the number of OFDM symbols. In some cases, the SRS configuration indicates a number of OFDM symbols across which the SRS is to be sent using the time domain OCC, and a mask index that indicates the time domain OCC that is to be applied to the SRS.

The SRS staggering component 1315 may map, based on the SRS configuration, a first portion of the SRS to occupy a first subset of frequency resources of the first OFDM symbol, a second portion of the SRS to occupy a second subset of frequency resources of the second OFDM symbol, a third portion of the SRS to occupy a third subset of frequency resources of the third OFDM symbol, and a fourth portion of the SRS to occupy a fourth subset of frequency resources of the fourth OFDM symbol, where the first subset of frequency resources, the second subset of frequency resources, the third subset of frequency resources, and the fourth subset of frequency resources are non-uniformly staggered in frequency relative to each other.

In some examples, the SRS staggering component 1315 may identify the first subset of frequency resources as a first set of uniformly spaced REs within the first OFDM symbol, the second subset of frequency resources as a second set of uniformly spaced REs within the second OFDM symbol, the third subset of frequency resources as a third set of uniformly spaced REs within the third OFDM symbol, and the fourth subset of frequency resources as a fourth set of uniformly spaced REs within the fourth OFDM symbol.

In some examples, the SRS staggering component 1315 may identify a first starting RE within the first OFDM symbol based on a first RE offset for the first OFDM symbol. In some examples, the SRS staggering component 1315 may identify a second starting RE within the second OFDM symbol based on a second RE offset for the second OFDM symbol. In some examples, the SRS staggering component 1315 may identify a third starting RE within the third OFDM symbol based on a third RE offset for the third OFDM symbol. In some examples, the SRS staggering component 1315 may identify a fourth starting RE within the fourth OFDM symbol based on a fourth RE offset for the fourth OFDM symbol.

In some cases, the first RE offset, the second RE offset, the third RE offset, and the fourth RE offset provide a uniform spacing of a combined set of REs that combines the first set of uniformly spaced REs, the second set of uniformly spaced REs, the third set of uniformly spaced REs, and the fourth set of uniformly spaced REs. In some cases, the first OFDM symbol, the second OFDM symbol, the third OFDM symbol, and the fourth OFDM symbol each include a set of RBs, and where each of the first portion of the SRS, the second portion of the SRS, the third portion of the SRS, and the fourth portion of the SRS occupy frequency resources according to a pattern that repeats every two or more RBs within each OFDM symbol. In some cases, the first subset of frequency resources, the second subset of frequency resources, the third subset of frequency resources, and the fourth subset of frequency resources are staggered from a single antenna port. Although described in the context of four symbols, this is for illustration not for limitation, a similar procedure may apply for any number of symbols (e.g., for two symbols, three symbols, six symbols, eight symbols, twelve symbols, and so forth).

The SRS transmission manager 1320 may transmit the SRS to the base station. In some examples, the SRS transmission manager 1320 may transmit one or more repetitions of at least a portion of the SRS to the base station (e.g., the SRS transmission manager 1320 may repetitively transmit a subset of the OFDM symbols including the SRS or repetitively transmit all OFDM symbols including the SRS). In some cases, the one or more repetitions are transmitted in groups of SRS symbols, where each group of SRS symbols is mapped according to the SRS configuration to provide associated portions of the SRS that are staggered in frequency. In some cases, the one or more repetitions of at least the portion of the SRS are transmitted to the base station according to a frequency hopping pattern. In some cases, the frequency hopping is performed in groups of SRS symbols, and where each group of SRS symbols is formatted according to the SRS configuration to provide associated portions of the SRS that are staggered in frequency.

In some cases, the one or more repetitions are performed in groups of SRS symbols, and where each group includes the set of SRS symbols sent using the time domain OCC.

The OCC component 1330 may format (e.g., map), based on the SRS configuration, the SRS to occupy the same set of frequency resources within each of at least the first OFDM symbol and the second OFDM symbol. In some specific examples, the OCC component 1330 may format or map the SRS to occupy the same set of frequency resources within four or more OFDM symbols. In some examples, the OCC component 1330 may apply a time domain OCC to the SRS in each of at least the first OFDM symbol and the second OFDM symbol. In some examples, the OCC component 1330 may apply an OCC mask to a portion of the SRS contained in each of at least the first OFDM symbol and the second OFDM symbol. In some cases, the time domain OCC is a frequency domain varying OCC that changes across frequency. In some cases, a pattern of the frequency domain varying OCC is obtained by multiplying a fixed time domain OCC pattern with a phase ramp.

The SRS sequence manager 1325 may determine an SRS sequence for each of the first portion of the SRS, the second portion of the SRS, the third portion of the SRS, and the fourth portion of the SRS based on an amount of frequency resources in each of the first subset of frequency resources, the second subset of frequency resources, the third subset of frequency resources, and the fourth subset of frequency resources. In some cases, a same SRS sequence is determined for each of the first portion of the SRS, the second portion of the SRS, the third portion of the SRS, and the fourth portion of the SRS.

Figure 14:
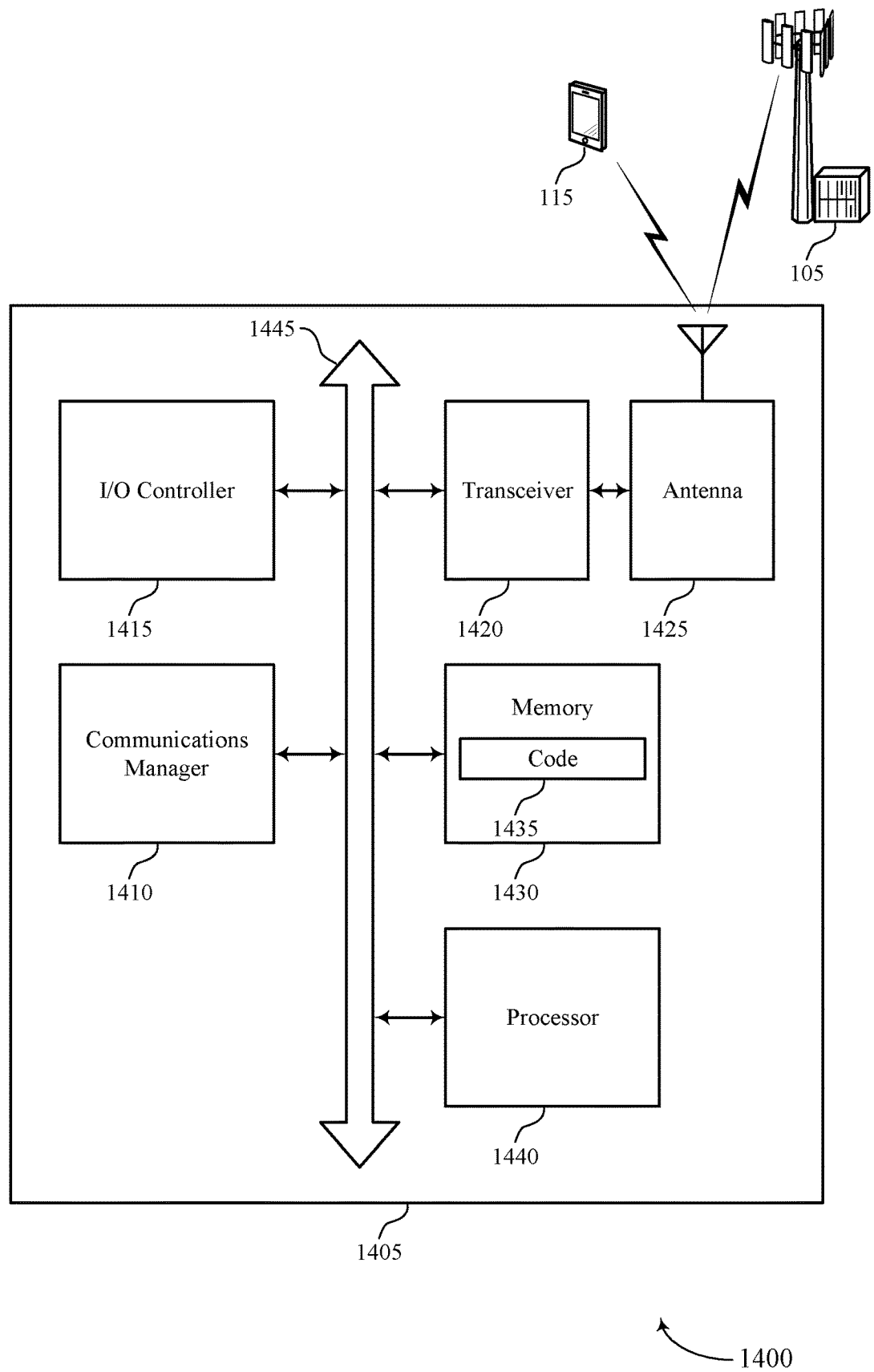
FIG. 14 shows a diagram of a system including a device that supports SRS waveform design for wireless communications in accordance with aspects of the present disclosure.

FIG. 14 shows a diagram of a system 1400 including a device 1405 that supports SRS waveform design for wireless communications in accordance with various aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

The communications manager 1410 may identify an SRS configuration for transmission of an SRS to a base station, the SRS configuration providing SRS resources across multiple OFDM symbols. In one example, the SRS configuration may provide SRS resources within at least a first OFDM symbol, a second OFDM symbol, a third OFDM symbol, and a fourth OFDM symbol. The communications manager 1410 may map, based on the SRS configuration, a first portion of the SRS to occupy a first subset of frequency resources of the first OFDM symbol, a second portion of the SRS to occupy a second subset of frequency resources of the second OFDM symbol, a third portion of the SRS to occupy a third subset of frequency resources of the third OFDM symbol, and a fourth portion of the SRS to occupy a fourth subset of frequency resources of the fourth OFDM symbol, where the first subset of frequency resources, the second subset of frequency resources, the third subset of frequency resources, and the fourth set of frequency resources are non-uniformly staggered in frequency relative to each other, and transmit the SRS to the base station based on the mapping. Although described in the context of four symbols, this is for illustration not for limitation, a similar procedure may apply for any number of symbols (e.g., for two symbols, three symbols, six symbols, eight symbols, twelve symbols, and so forth).

The communications manager 1410 may also identify an SRS configuration for transmission of an SRS to a base station, the SRS configuration providing SRS resources that occupy a same set of frequency resources within each of at least a first OFDM symbol and a second OFDM symbol, format (e.g., map), based on the SRS configuration, the SRS to occupy the same set of frequency resources within each of at least the first OFDM symbol and the second OFDM symbol, apply a time domain OCC to the SRS in each of at least the first OFDM symbol and the second OFDM symbol, and transmit the SRS to the base station.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include random-access memory (RAM) and read-only memory (ROM). The memory 1430 may store computer-readable, computer-executable code 1435 including instructions that, when executed, cause the processor to perform various functions described herein. In some cases, the memory 1430 may contain, among other things, a basic I/O system (BIOS) which may control basic hardware or software operation such as the interaction with peripheral components or devices.

The processor 1440 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting SRS waveform design for wireless communications).

The code 1435 may include instructions to implement aspects of the present disclosure, including instructions to support wireless communications. In some cases, the code 1435 may include instructions to implement functions described in FIGS. 19 through 21. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
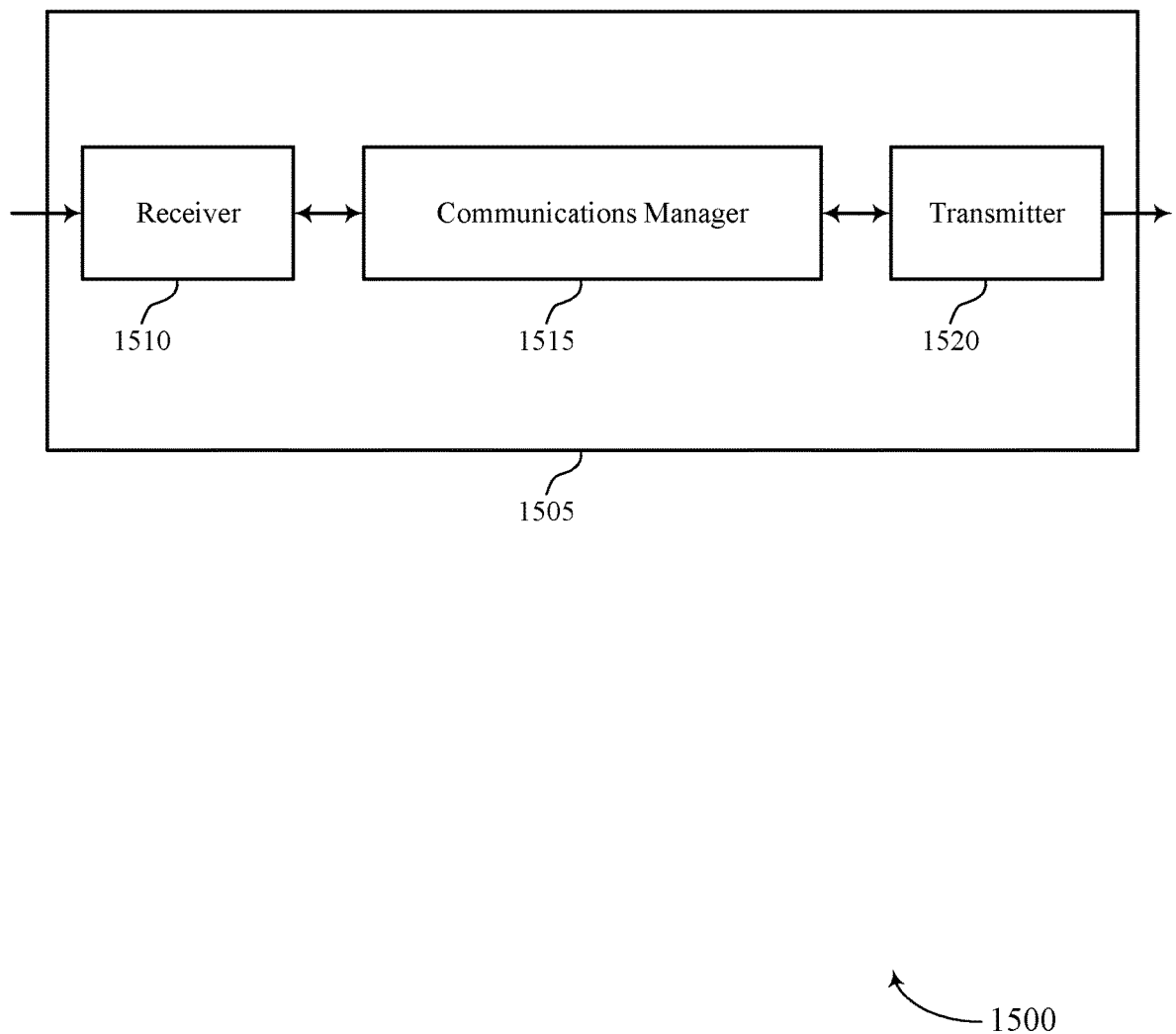
FIGS. 15 and 16 show block diagrams of devices that support SRS waveform design for wireless communications in accordance with aspects of the present disclosure.

FIG. 15 shows a block diagram 1500 of a device 1505 that supports SRS waveform design for wireless communications in accordance with various aspects of the present disclosure. The device 1505 may be an example of aspects of a base station 105 as described herein. The device 1505 may include a receiver 1510, a communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to SRS waveform design for wireless communications, etc.). Information may be passed on to other components of the device 1505. The receiver 1510 may be an example of aspects of the transceiver 1820 described with reference to FIG. 18. The receiver 1510 may utilize a single antenna or a set of antennas.

The communications manager 1515 may configure at least a first UE with a first SRS configuration for transmission of a first SRS, where the first SRS configuration provides resources for the first SRS across multiple OFDM symbols. In one illustrative example, the SRS configuration may provide SRS resources within at least a first OFDM symbol, a second OFDM symbol, a third OFDM symbol, and a fourth OFDM symbol and receive, based on the first SRS configuration, a first portion of the first SRS in a first subset of frequency resources within the first OFDM symbol, a second portion of the first SRS in a second subset of frequency resources within the second OFDM symbol, a third portion of the first SRS in a third subset of frequency resources within the third OFDM symbol, and a fourth portion of the first SRS in a fourth subset of frequency resources within the fourth OFDM symbol, where the first subset of frequency resources, the second subset of frequency resources, the third subset of frequency resources, and the fourth subset of frequency resources are non-uniformly staggered in frequency relative to each other.

Although described in the context of four symbols, this is for illustration not for limitation, a similar procedure may apply for any number of symbols (e.g., for two symbols, three symbols, six symbols, eight symbols, twelve symbols, and so forth).

The communications manager 1515 may also identify an SRS configuration for reception of a first SRS from a first UE and a second SRS from a second UE, the SRS configuration providing SRS resources that occupy a same set of frequency resources within each of at least a first OFDM symbol and a second OFDM symbol, receive, based on the SRS configuration, a combined transmission that includes the first SRS and the second SRS in a same set of frequency resources within each of at least the first OFDM symbol and the second OFDM symbol, and apply a time domain OCC to the combined transmission to determine the first SRS and the second SRS. The communications manager 1515 may be an example of aspects of the communications manager 1810 described herein.

The communications manager 1515, or its sub-components, may be implemented in hardware, code (e.g., software or firmware) executed by a processor, or any combination thereof. If implemented in code executed by a processor, the functions of the communications manager 1515, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1515, or its sub-components, may be physically located at various positions, including being distributed such that portions of functions are implemented at different physical locations by one or more physical components. In some examples, the communications manager 1515, or its sub-components, may be a separate and distinct component in accordance with various aspects of the present disclosure. In some examples, the communications manager 1515, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver component. For example, the transmitter 1520 may be an example of aspects of the transceiver 1820 described with reference to FIG. 18. The transmitter 1520 may utilize a single antenna or a set of antennas.

Figure 16:
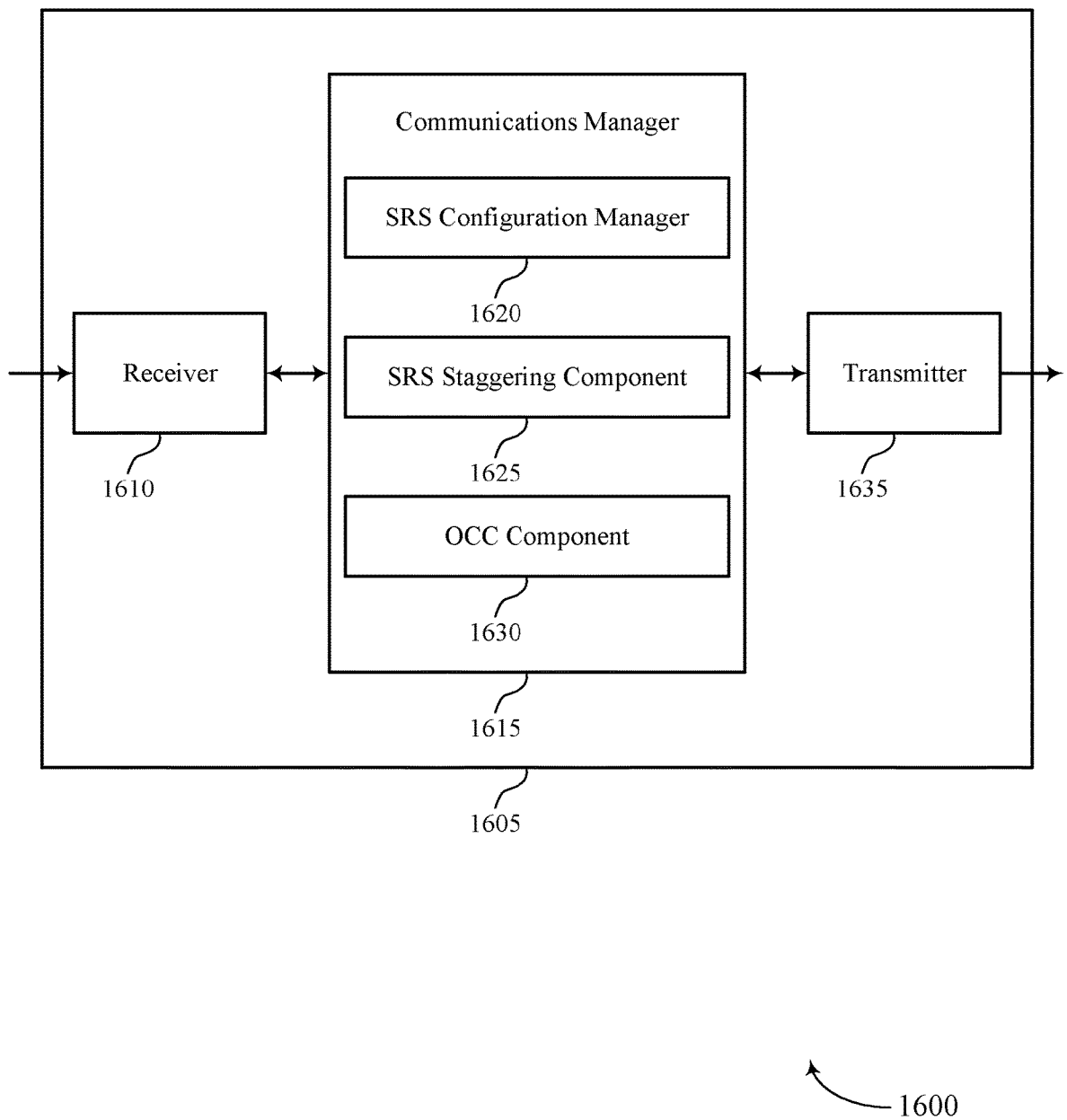

FIG. 16 shows a block diagram 1600 of a device 1605 that supports SRS waveform design for wireless communications in accordance with various aspects of the present disclosure. The device 1605 may be an example of aspects of a device 1505, or a base station 105 as described herein. The device 1605 may include a receiver 1610, a communications manager 1615, and a transmitter 1635. The device 1605 may also include a processor. Each of these components may be in communication with one another (e.g., via one or more buses).

The receiver 1610 may receive information such as packets, user data, or control information associated with various information channels (e.g., control channels, data channels, and information related to SRS waveform design for wireless communications, etc.). Information may be passed on to other components of the device 1605. The receiver 1610 may be an example of aspects of the transceiver 1820 described with reference to FIG. 18. The receiver 1610 may utilize a single antenna or a set of antennas.

The communications manager 1615 may be an example of aspects of the communications manager 1515 as described herein. The communications manager 1615 may include an SRS configuration manager 1620, an SRS staggering component 1625, and an OCC component 1630. The communications manager 1615 may be an example of aspects of the communications manager 1810 described herein.

The SRS configuration manager 1620 may configure at least a first UE with a first SRS configuration for transmission of a first SRS. In one example, the first SRS configuration provides resources for the first SRS within at least a first OFDM symbol, a second OFDM symbol, a third OFDM symbol, and a fourth OFDM symbol.

The SRS staggering component 1625 may receive, based on the first SRS configuration, a first portion of the first SRS in a first subset of frequency resources within the first OFDM symbol, a second portion of the first SRS in a second subset of frequency resources within the second OFDM symbol, a third portion of the first SRS in a third subset of frequency resources within the third OFDM symbol, and a fourth portion of the first SRS in a fourth subset of frequency resources within the fourth OFDM symbol, where the first subset of frequency resources, the second subset of frequency resources, the third subset of frequency resources, and the fourth subset of frequency resources are non-uniformly staggered in frequency relative to each other.

The SRS configuration manager 1620 may also identify an SRS configuration for reception of a first SRS from a first UE and a second SRS from a second UE, the SRS configuration providing SRS resources that occupy a same set of frequency resources within each of at least a first OFDM symbol and a second OFDM symbol.

The OCC component 1630 may receive, based on the SRS configuration, a combined transmission that includes the first SRS and the second SRS in a same set of frequency resources within each of at least the first OFDM symbol and the second OFDM symbol and apply a time domain OCC to the combined transmission to determine the first SRS and the second SRS. In some examples, the OCC component 1630 may receive the first SRS and the second SRS in the same set of frequency resources within each of four or more OFDM symbols.

The transmitter 1635 may also transmit signals generated by other components of the device 1605. In some examples, the transmitter 1635 may be collocated with a receiver 1610 in a transceiver component. For example, the transmitter 1635 may be an example of aspects of the transceiver 1820 described with reference to FIG. 18. The transmitter 1635 may utilize a single antenna or a set of antennas.

Figure 17:
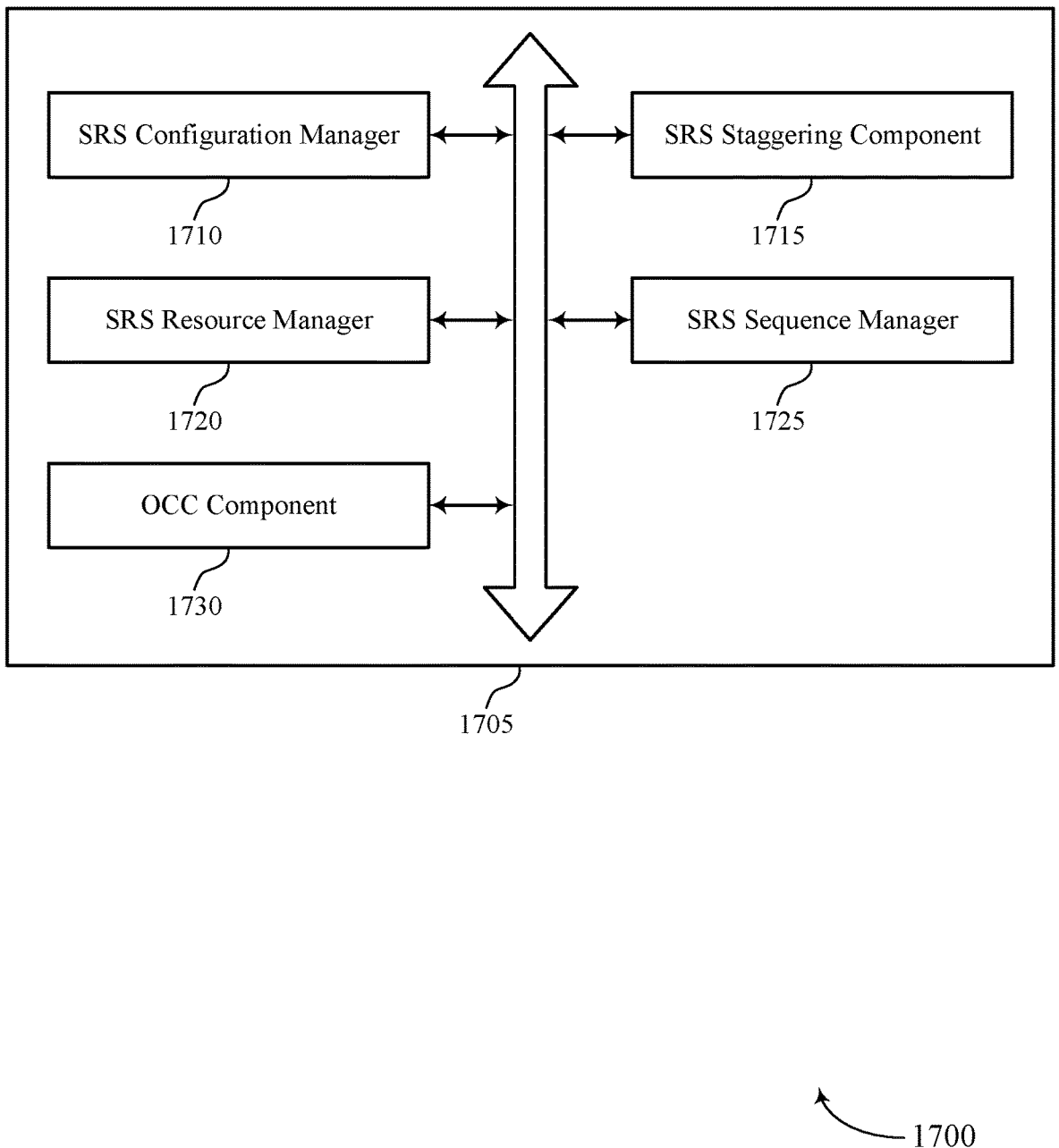
FIG. 17 shows a block diagram of a communications manager that supports SRS waveform design for wireless communications in accordance with aspects of the present disclosure.

FIG. 17 shows a block diagram 1700 of a communications manager 1705 that supports SRS waveform design for wireless communications in accordance with various aspects of the present disclosure. The communications manager 1705 may be an example of aspects of a communications manager 1515, a communications manager 1615, or a communications manager 1810 described herein. The communications manager 1705 may include an SRS configuration manager 1710, an SRS staggering component 1715, an SRS resource manager 1720, an SRS sequence manager 1725, and an OCC component 1730. Each of these components may communicate, directly or indirectly, with one another (e.g., via one or more buses).

The SRS configuration manager 1710 may configure at least a first UE with a first SRS configuration for transmission of a first SRS, where the first SRS configuration provides resources for the first SRS across multiple OFDM symbols. In one example, the first SRS configuration may provide resources for the first SRS within at least a first OFDM symbol, a second OFDM symbol, a third OFDM symbol, and a fourth OFDM symbol. In some examples, the SRS configuration manager 1710 may identify an SRS configuration for reception of a first SRS from a first UE and a second SRS from a second UE, the SRS configuration providing SRS resources that occupy a same set of frequency resources within each of at least a first OFDM symbol and a second OFDM symbol.

In some examples, the SRS configuration manager 1710 may configure at least a second UE with a second SRS configuration for transmission of a second SRS, where the second SRS configuration provides resources for the second SRS across multiple OFDM symbols. In one example, the second SRS configuration may provide resources for the second SRS within at least the first OFDM symbol, the second OFDM symbol, the third OFDM symbol, and the fourth OFDM symbol. In some cases, the base station configures each of a set of UEs for SRS transmissions in the first OFDM symbol, the second OFDM symbol, the third OFDM symbol, and the fourth OFDM symbol based on a number of UEs in the set of UEs exceeding a threshold value. In some cases, the SRS configuration indicates a number of OFDM symbols across which each of the first SRS and the second SRS are to span, and a mask index that indicates the time domain OCC that is to be applied to the SRS of each of the first UE and the second UE.

The SRS staggering component 1715 may receive, based on the first SRS configuration, a first portion of the first SRS in a first subset of frequency resources within the first OFDM symbol, a second portion of the first SRS in a second subset of frequency resources within the second OFDM symbol, a third portion of the first SRS in a third subset of frequency resources within the third OFDM symbol, and a fourth portion of the first SRS in a fourth subset of frequency resources within the fourth OFDM symbol, where the first subset of frequency resources, the second subset of frequency resources, the third subset of frequency resources, and the fourth subset of frequency resources are non-uniformly staggered in frequency relative to each other. In some examples, the SRS staggering component 1715 may receive, based on the second SRS configuration, a first portion of the second SRS in a fifth subset of frequency resources within the first OFDM symbol, a second portion of the second SRS in a sixth subset of frequency resources within the second OFDM symbol, a third portion of the second SRS in a seventh subset of frequency resources within the third OFDM symbol, and a fourth portion of the second SRS in an eighth subset of frequency resources within the fourth OFDM symbol, where the fourth subset of frequency resources is staggered in frequency relative to the eighth subset of frequency resources.

The OCC component 1730 may receive, based on the SRS configuration, a combined transmission that includes the first SRS and the second SRS in a same set of frequency resources within each of at least the first OFDM symbol and the second OFDM symbol. In some examples, the OCC component 1730 may receive the first SRS and the second SRS in the same set of frequency resources within four or more OFDM symbols. In some examples, the OCC component 1730 may apply a time domain OCC to the combined transmission to determine the first SRS and the second SRS.

In some examples, the OCC component 1730 may apply, to the combined transmission in each of at least the first OFDM symbol and the second OFDM symbol, a first OCC mask associated with the first UE to determine the first SRS. In some examples, the OCC component 1730 may apply, to the combined transmission in each of the first OFDM symbol and the second OFDM symbol, a second OCC mask associated with the second UE to determine the second SRS.

The SRS resource manager 1720 may configure the first subset of frequency resources as a first set of uniformly spaced REs within the first OFDM symbol, the second subset of frequency resources as a second set of uniformly spaced REs within the second OFDM symbol, the third subset of frequency resources as a third set of uniformly spaced REs within the third OFDM symbol, and the fourth subset of frequency resources as a fourth set of uniformly spaced REs within the fourth OFDM symbol.

In some examples, the SRS resource manager 1720 may indicate a first RE offset for the first OFDM symbol that provides RE locations for the first set of uniformly spaced REs. In some examples, the SRS resource manager 1720 may indicate a second RE offset for the second OFDM symbol that provides RE locations for the second set of uniformly spaced REs. In some examples, the SRS resource manager 1720 may indicate a third RE offset for the third OFDM symbol that provides RE locations for the third set of uniformly spaced REs. In some examples, the SRS resource manager 1720 may indicate a fourth RE offset for the fourth OFDM symbol that provides RE locations for the fourth set of uniformly spaced REs. In some examples, the SRS resource manager 1720 may receive the first set of uniformly spaced REs within the first OFDM symbol, the second set of uniformly spaced REs within the second OFDM symbol, the third set of uniformly spaced REs within the third OFDM symbol, and the fourth set of uniformly spaced REs within the fourth OFDM symbol. In some cases, the first RE offset, the second RE offset, the third RE offset, and the fourth RE offset provide a uniform spacing of a combined set of REs that combines the first set of uniformly spaced REs, the second set of uniformly spaced resource elements, the third set of uniformly spaced resource elements, and the fourth set of uniformly spaced REs.

In some cases, the first OFDM symbol, the second OFDM symbol, the third OFDM symbol, and the fourth OFDM symbol each include a set of RBs, and where each of the first portion of the SRS, the second portion of the SRS, the third portion of the SRS, and the fourth portion of the SRS occupy uniform frequency resources that span two or more RBs within each OFDM symbol.

The SRS sequence manager 1725 may configure an SRS sequence for each of the first portion of the SRS, the second portion of the SRS, the third portion of the SRS, and the fourth portion of the SRS based on an amount of frequency resources in each of the first subset of frequency resources, the second subset of frequency resources, the third subset of frequency resources, and the fourth subset of frequency resources. In some cases, a same SRS sequence is configured for each of the first portion of the SRS, the second portion of the SRS, the third portion of the SRS, and the fourth portion of the SRS.

Figure 18:
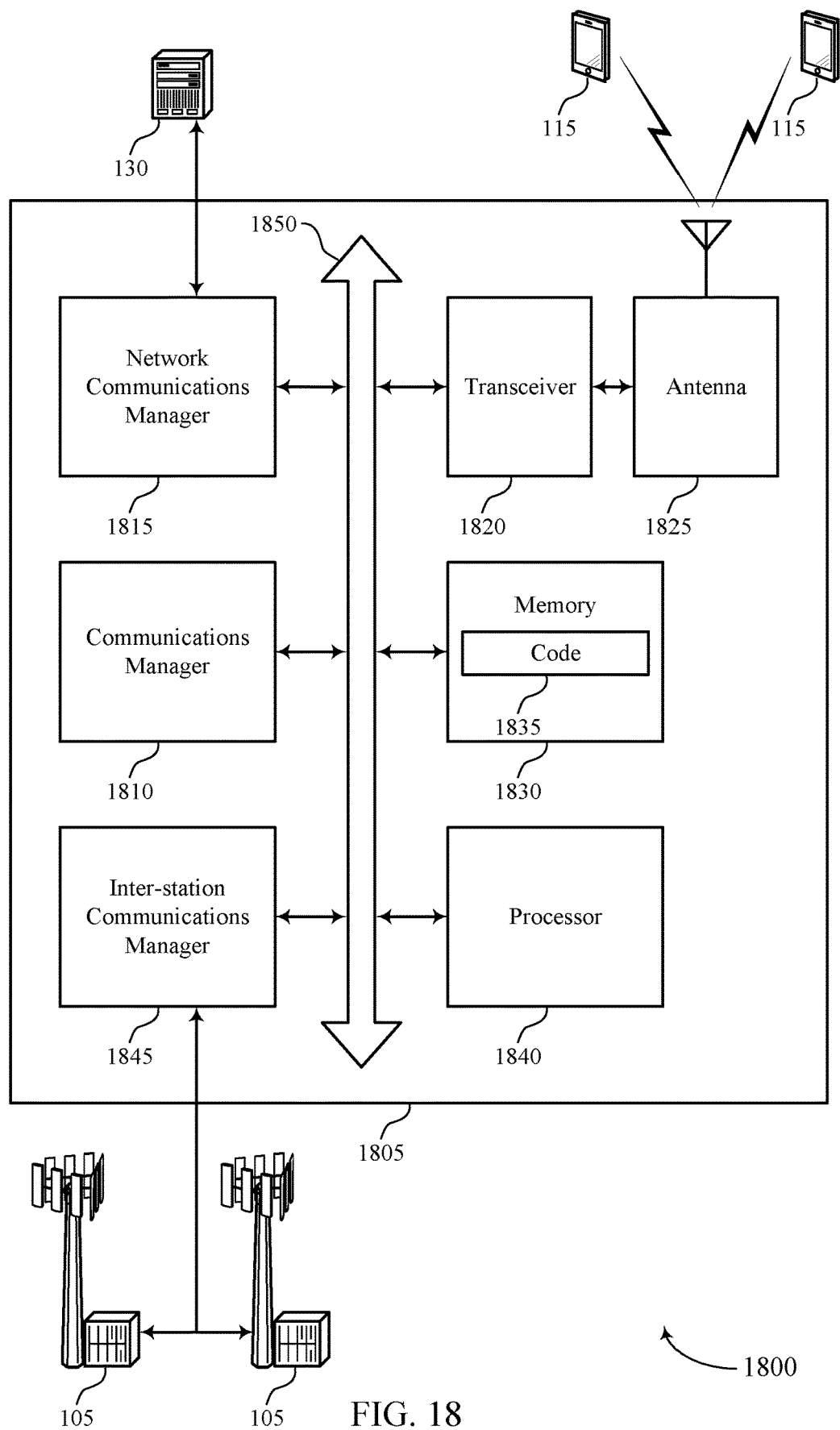
FIG. 18 shows a diagram of a system including a device that supports SRS waveform design for wireless communications in accordance with aspects of the present disclosure.

FIG. 18 shows a diagram of a system 1800 including a device 1805 that supports SRS waveform design for wireless communications in accordance with various aspects of the present disclosure. The device 1805 may be an example of or include the components of device 1505, device 1605, or a base station 105 as described herein. The device 1805 may include components for bi-directional voice and data communications including components for transmitting and receiving communications, including a communications manager 1810, a network communications manager 1815, a transceiver 1820, an antenna 1825, memory 1830, a processor 1840, and an inter-station communications manager 1845. These components may be in electronic communication via one or more buses (e.g., bus 1850).

The communications manager 1810 may configure at least a first UE with a first SRS configuration for transmission of a first SRS, where the first SRS configuration provides resources for the first SRS across multiple OFDM symbols. In one example, the first SRS configuration may provide resources for the first SRS within at least a first OFDM symbol, a second OFDM symbol, a third OFDM symbol, and a fourth OFDM symbol and receive, based on the first SRS configuration, a first portion of the first SRS in a first subset of frequency resources within the first OFDM symbol, a second portion of the first SRS in a second subset of frequency resources within the second OFDM symbol, a third portion of the first SRS in a third subset of frequency resources within the third OFDM symbol, and a fourth portion of the first SRS in a fourth subset of frequency resources within the fourth OFDM symbol, where the first subset of frequency resources, the second subset of frequency resources, the third subset of frequency resources, and the fourth subset of frequency resources are non-uniformly staggered in frequency relative to each other. Although described in the context of four symbols, this is for illustration not for limitation, a similar procedure may apply for any number of symbols (e.g., for two symbols, three symbols, six symbols, eight symbols, twelve symbols, and so forth).

The communications manager 1810 may also identify an SRS configuration for reception of a first SRS from a first UE and a second SRS from a second UE, the SRS configuration providing SRS resources that occupy a same set of frequency resources within each of at least a first OFDM symbol and a second OFDM symbol, receive, based on the SRS configuration, a combined transmission that includes the first SRS and the second SRS in a same set of frequency resources within each of the first OFDM symbol and the second OFDM symbol, and apply a time domain OCC to the combined transmission to determine the first SRS and the second SRS.

The network communications manager 1815 may manage communications with the core network (e.g., via one or more wired backhaul links). For example, the network communications manager 1815 may manage the transfer of data communications for client devices, such as one or more UEs 115.

The transceiver 1820 may communicate bi-directionally, via one or more antennas, wired, or wireless links as described herein. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device may include a single antenna 1825. However, in some cases the device may have more than one antenna 1825, which may be capable of concurrently transmitting or receiving multiple wireless transmissions.

The memory 1830 may include RAM, ROM, or a combination thereof. The memory 1830 may store computer-readable code 1835 including instructions that, when executed by a processor (e.g., the processor 1840) cause the device to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some cases, a memory controller may be integrated into processor 1840. The processor 1840 may be configured to execute computer-readable instructions stored in a memory (e.g., the memory 1830) to cause the device 1805 to perform various functions (e.g., functions or tasks supporting SRS waveform design for wireless communications).

The inter-station communications manager 1845 may manage communications with other base station 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communication network technology to provide communication between base stations 105.

The code 1835 may include instructions to implement aspects of the present disclosure, including instructions to support wireless communications. In some cases, the code 1835 may include instructions to implement functions of FIGS. 22 and 23. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

Figure 19:
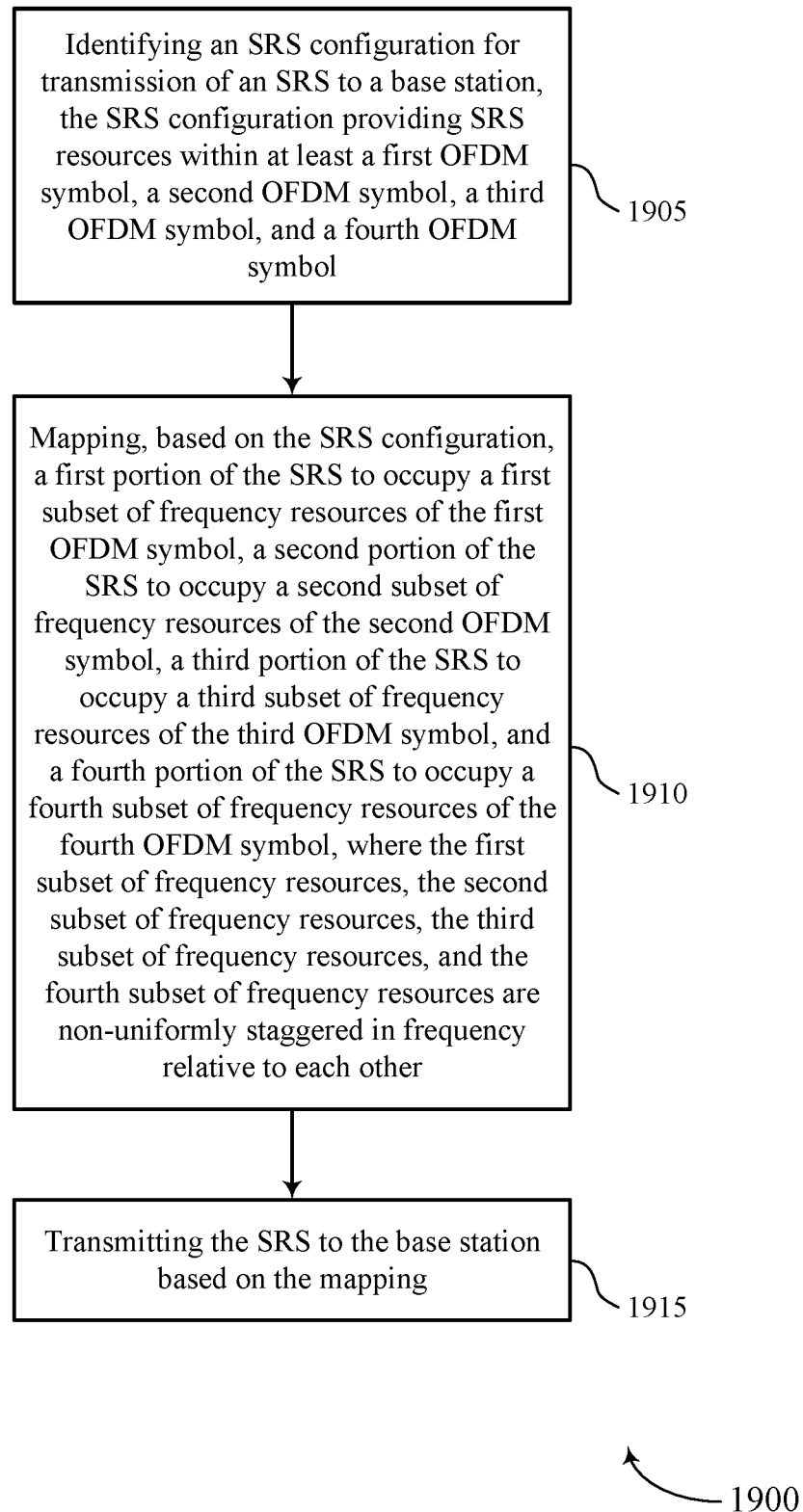
FIGS. 19 through 23 show flowcharts illustrating methods that support SRS waveform design for wireless communications in accordance with aspects of the present disclosure.

FIG. 19 shows a flowchart illustrating a method 1900 that supports SRS waveform design for wireless communications in accordance with various aspects of the present disclosure. The operations of method 1900 may be implemented by a UE 115 or its components as described herein. For example, the operations of method 1900 may be performed by a communications manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 1905, the UE may identify an SRS configuration for transmission of an SRS to a base station, the SRS configuration providing SRS resources across multiple OFDM symbols. In one illustrative example, the SRS configuration provides SRS resources within at least a first OFDM symbol, a second OFDM symbol, a third OFDM symbol, and a fourth OFDM symbol. The operations of 1905 may be performed according to the methods described herein. In some examples, aspects of the operations of 1905 may be performed by an SRS configuration manager as described with reference to FIGS. 11 through 14.

At 1910, the UE may map, based on the SRS configuration, a first portion of the SRS to occupy a first subset of frequency resources of the first OFDM symbol, a second portion of the SRS to occupy a second subset of frequency resources of the second OFDM symbol, a third portion of the SRS to occupy a third subset of frequency resources of the third OFDM symbol, and a fourth portion of the SRS to occupy a fourth subset of frequency resources of the fourth OFDM symbol, where the first subset of frequency resources, the second subset of frequency resources, the third subset of frequency resources, and the fourth subset of frequency resources are non-uniformly staggered in frequency relative to each other. The operations of 1910 may be performed according to the methods described herein. In some examples, aspects of the operations of 1910 may be performed by an SRS staggering component as described with reference to FIGS. 11 through 14.

At 1915, the UE may transmit the SRS to the base station based on the mapping. The operations of 1915 may be performed according to the methods described herein. In some examples, aspects of the operations of 1915 may be performed by an SRS transmission manager as described with reference to FIGS. 11 through 14.

Figure 20:
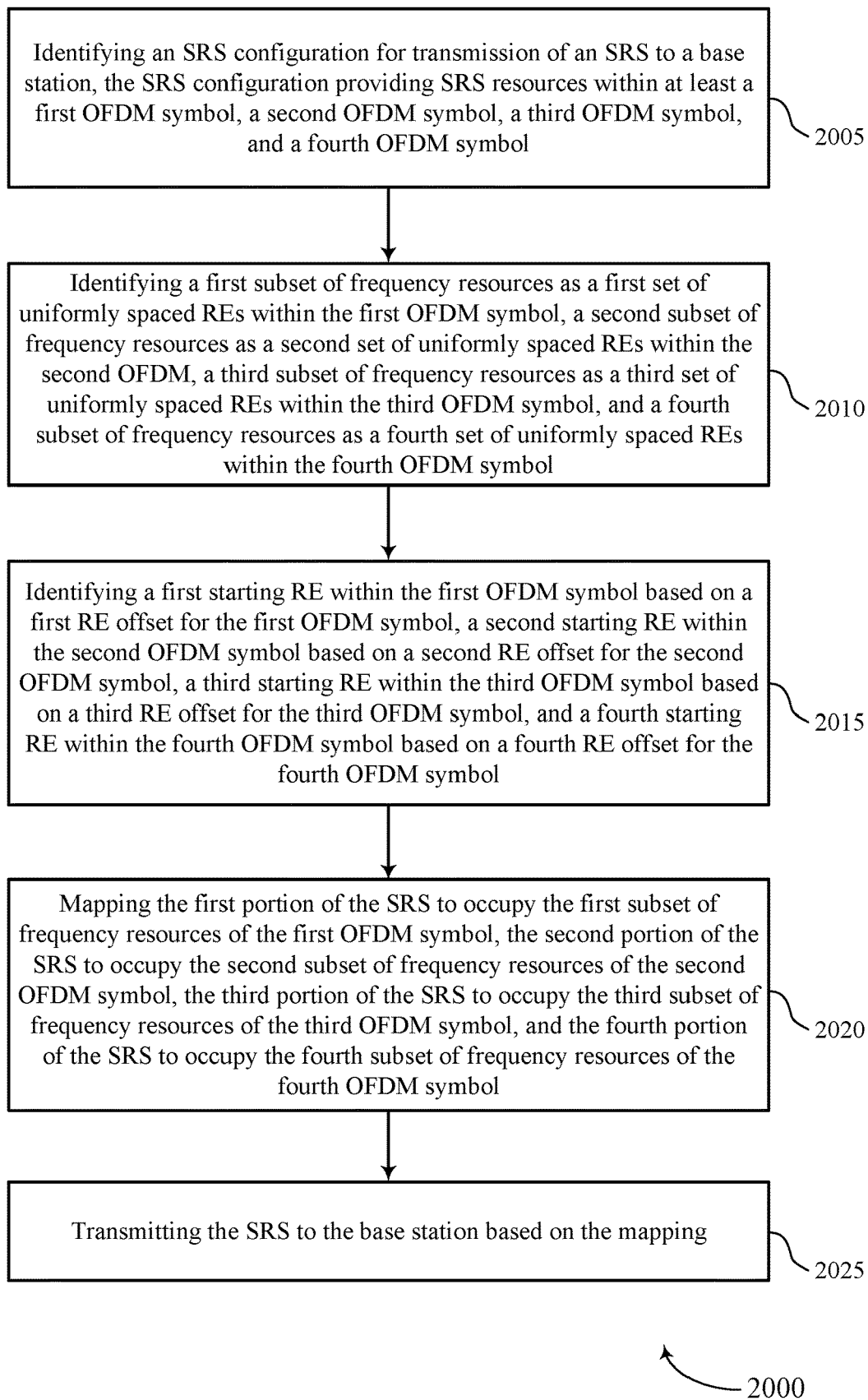

FIG. 20 shows a flowchart illustrating a method 2000 that supports SRS waveform design for wireless communications in accordance with various aspects of the present disclosure. The operations of method 2000 may be implemented by a UE 115 or its components as described herein. For example, the operations of method 2000 may be performed by a communications manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 2005, the UE may identify an SRS configuration for transmission of an SRS to a base station, the SRS configuration providing SRS resources across multiple OFDM symbols. In one illustrative example, the SRS configuration may provide SRS resources within at least a first OFDM symbol, a second OFDM symbol, a third OFDM symbol, and a fourth OFDM symbol. The operations of 2005 may be performed according to the methods described herein. In some examples, aspects of the operations of 2005 may be performed by an SRS configuration manager as described with reference to FIGS. 11 through 14.

At 2010, the UE may identify a first subset of frequency resources as a first set of uniformly spaced REs within the first OFDM symbol, a second subset of frequency resources as a second set of uniformly spaced REs within the second OFDM symbol, a third subset of frequency resources as a third set of uniformly spaced REs within the third OFDM symbol, and a fourth subset of frequency resources as a fourth set of uniformly spaced REs within the fourth OFDM symbol. The operations of 2010 may be performed according to the methods described herein. In some examples, aspects of the operations of 2010 may be performed by an SRS staggering component as described with reference to FIGS. 11 through 14.

At 2015, the UE may identify a first starting RE within the first OFDM symbol based on a first RE offset for the first OFDM symbol, a second starting RE within the second OFDM symbol based on a second RE offset for the second OFDM symbol, a third starting RE within the third OFDM symbol based on a third RE offset for the third OFDM symbol, and a fourth starting RE within the fourth OFDM symbol based on a fourth RE offset for the fourth OFDM symbol. The operations of 2015 may be performed according to the methods described herein. In some examples, aspects of the operations of 2015 may be performed by an SRS staggering component as described with reference to FIGS. 11 through 14. In some cases, the first RE offset and the second RE offset provide a uniform spacing of a combined set of REs that combines the first set of uniformly spaced REs and the second set of uniformly spaced REs.

At 2020, the UE may map the first portion of the SRS to occupy the first subset of frequency resources of the first OFDM symbol, the second portion of the SRS to occupy the second subset of frequency resources of the second OFDM symbol, the third portion of the SRS to occupy the third subset of frequency resources of the third OFDM symbol, and the fourth portion of the SRS to occupy the fourth subset of frequency resources of the fourth OFDM symbol. The operations of 2025 may be performed according to the methods described herein. In some examples, aspects of the operations of 2025 may be performed by an SRS staggering component as described with reference to FIGS. 11 through 14.

At 2025, the UE may transmit the SRS to the base station based on the mapping. The operations of 2030 may be performed according to the methods described herein. In some examples, aspects of the operations of 2030 may be performed by an SRS transmission manager as described with reference to FIGS. 11 through 14.

Figure 21:
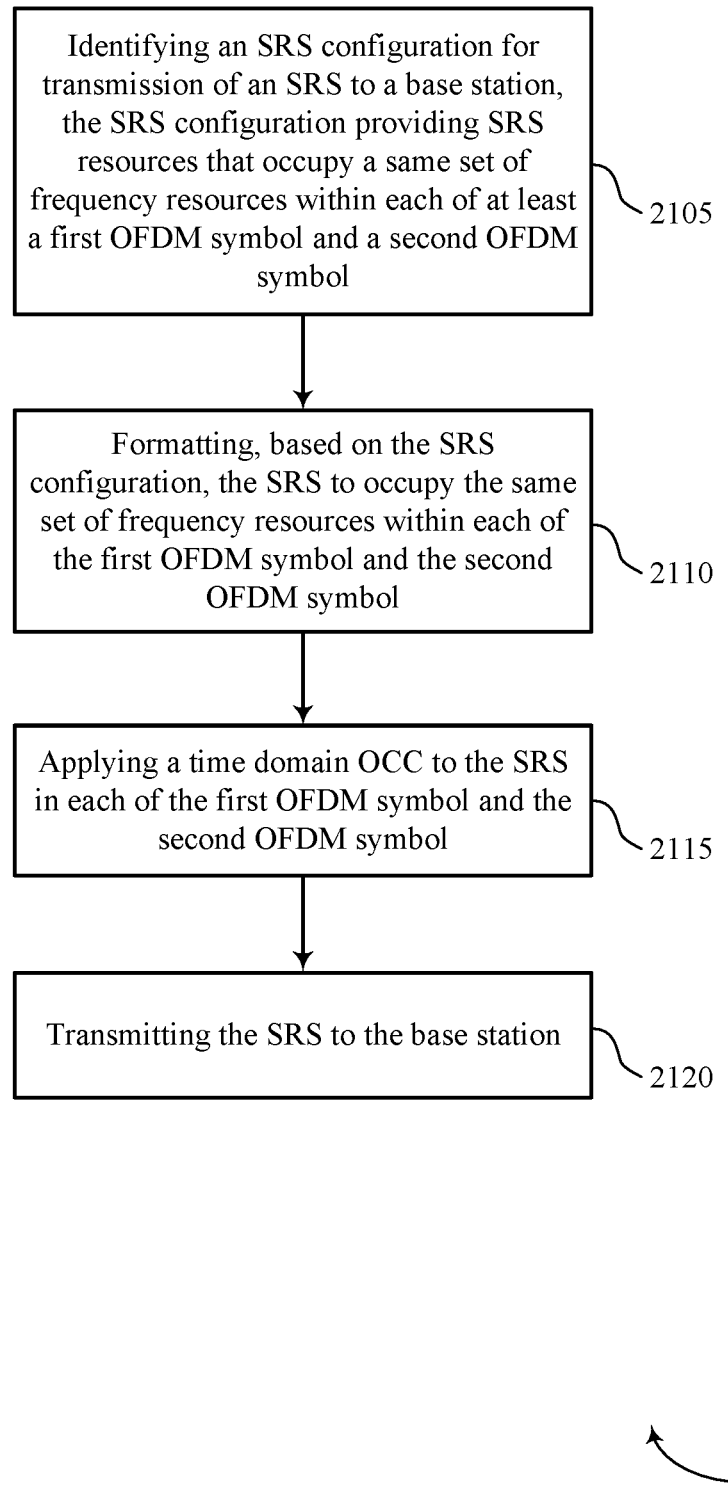

FIG. 21 shows a flowchart illustrating a method 2100 that supports SRS waveform design for wireless communications in accordance with various aspects of the present disclosure. The operations of method 2100 may be implemented by a UE 115 or its components as described herein. For example, the operations of method 2100 may be performed by a communications manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 2105, the UE may identify an SRS configuration for transmission of an SRS to a base station, the SRS configuration providing SRS resources that occupy a same set of frequency resources within each of at least a first OFDM symbol and a second OFDM symbol. The operations of 2105 may be performed according to the methods described herein. In some examples, aspects of the operations of 2105 may be performed by an SRS configuration manager as described with reference to FIGS. 11 through 14.

At 2110, the UE may format, based on the SRS configuration, the SRS to occupy the same set of frequency resources within each of the first OFDM symbol and the second OFDM symbol. The operations of 2110 may be performed according to the methods described herein. In some examples, aspects of the operations of 2110 may be performed by an OCC component as described with reference to FIGS. 11 through 14.

At 2115, the UE may apply a time domain OCC to the SRS in each of the first OFDM symbol and the second OFDM symbol. The operations of 2115 may be performed according to the methods described herein. In some examples, aspects of the operations of 2115 may be performed by an OCC component as described with reference to FIGS. 11 through 14.

At 2120, the UE may transmit the SRS to the base station. The operations of 2120 may be performed according to the methods described herein. In some examples, aspects of the operations of 2120 may be performed by an SRS transmission manager as described with reference to FIGS. 11 through 14.

Figure 22:
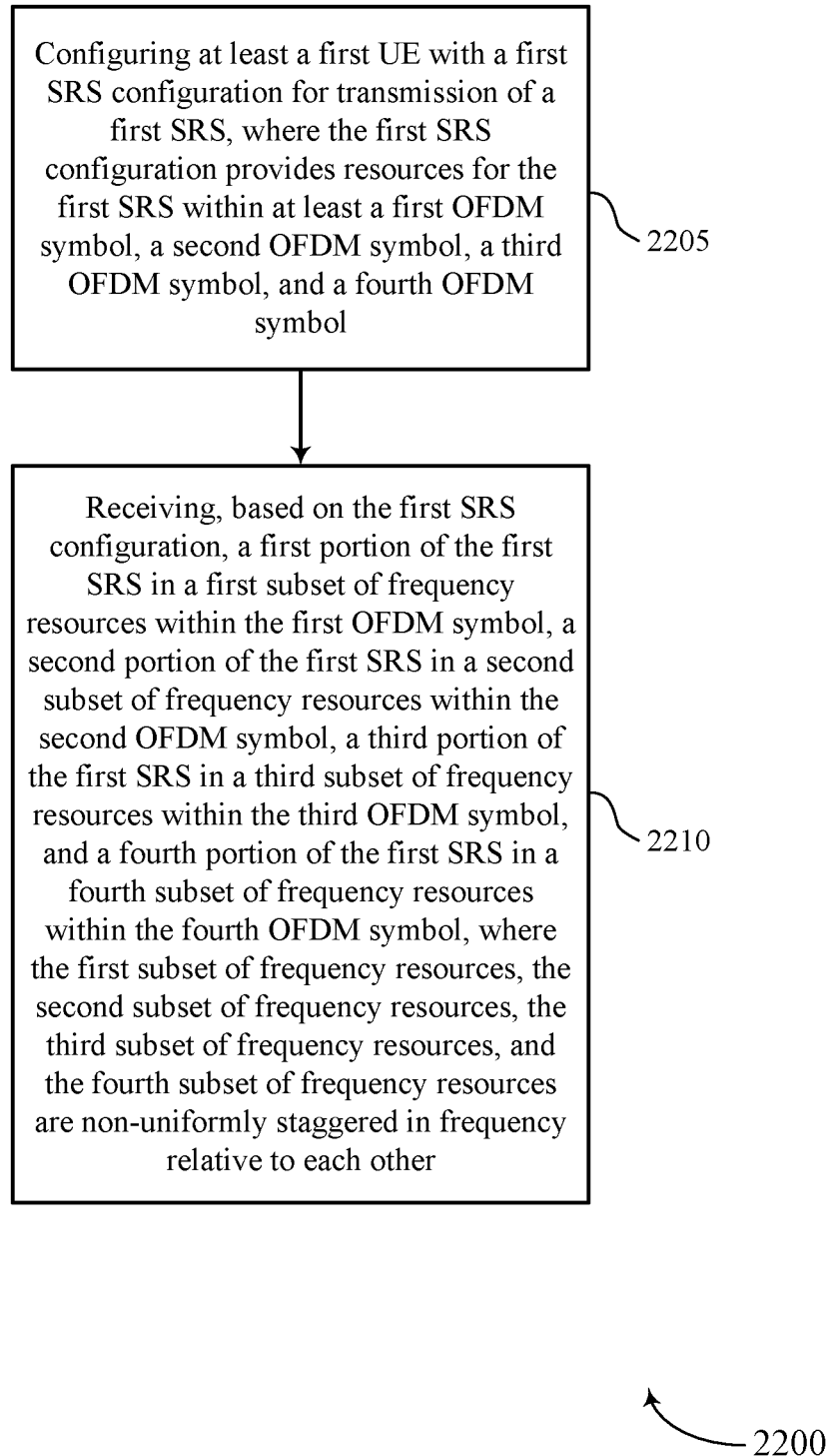

FIG. 22 shows a flowchart illustrating a method 2200 that supports SRS waveform design for wireless communications in accordance with various aspects of the present disclosure. The operations of method 2200 may be implemented by a base station 105 or its components as described herein. For example, the operations of method 2200 may be performed by a communications manager as described with reference to FIGS. 15 through 18. In some examples, a base station may execute a set of instructions to control the functional elements of the base station to perform the functions described herein. Additionally or alternatively, a base station may perform aspects of the functions described herein using special-purpose hardware.

At 2205, the base station may configure at least a first UE with a first SRS configuration for transmission of a first SRS, where the first SRS configuration provides resources for the first SRS across multiple OFDM symbols. In one illustrative example, the first SRS configuration may provide resources for the first SRS within at least a first OFDM symbol, a second OFDM symbol, a third OFDM symbol, and a fourth OFDM symbol. The operations of 2205 may be performed according to the methods described herein. In some examples, aspects of the operations of 2205 may be performed by an SRS configuration manager as described with reference to FIGS. 15 through 18.

At 2210, the base station may receive, based on the first SRS configuration, a first portion of the first SRS in a first subset of frequency resources within the first OFDM symbol, a second portion of the first SRS in a second subset of frequency resources within the second OFDM symbol, a third portion of the first SRS in a third subset of frequency resources within the third OFDM symbol, and a fourth portion of the first SRS in a fourth subset of frequency resources within the fourth OFDM symbol, where the first subset of frequency resources, the second subset of frequency resources, the third subset of frequency resources, and the fourth subset of frequency resources are non-uniformly staggered in frequency relative to each other. The operations of 2210 may be performed according to the methods described herein. In some examples, aspects of the operations of 2210 may be performed by an SRS staggering component as described with reference to FIGS. 15 through 18.

Figure 23:
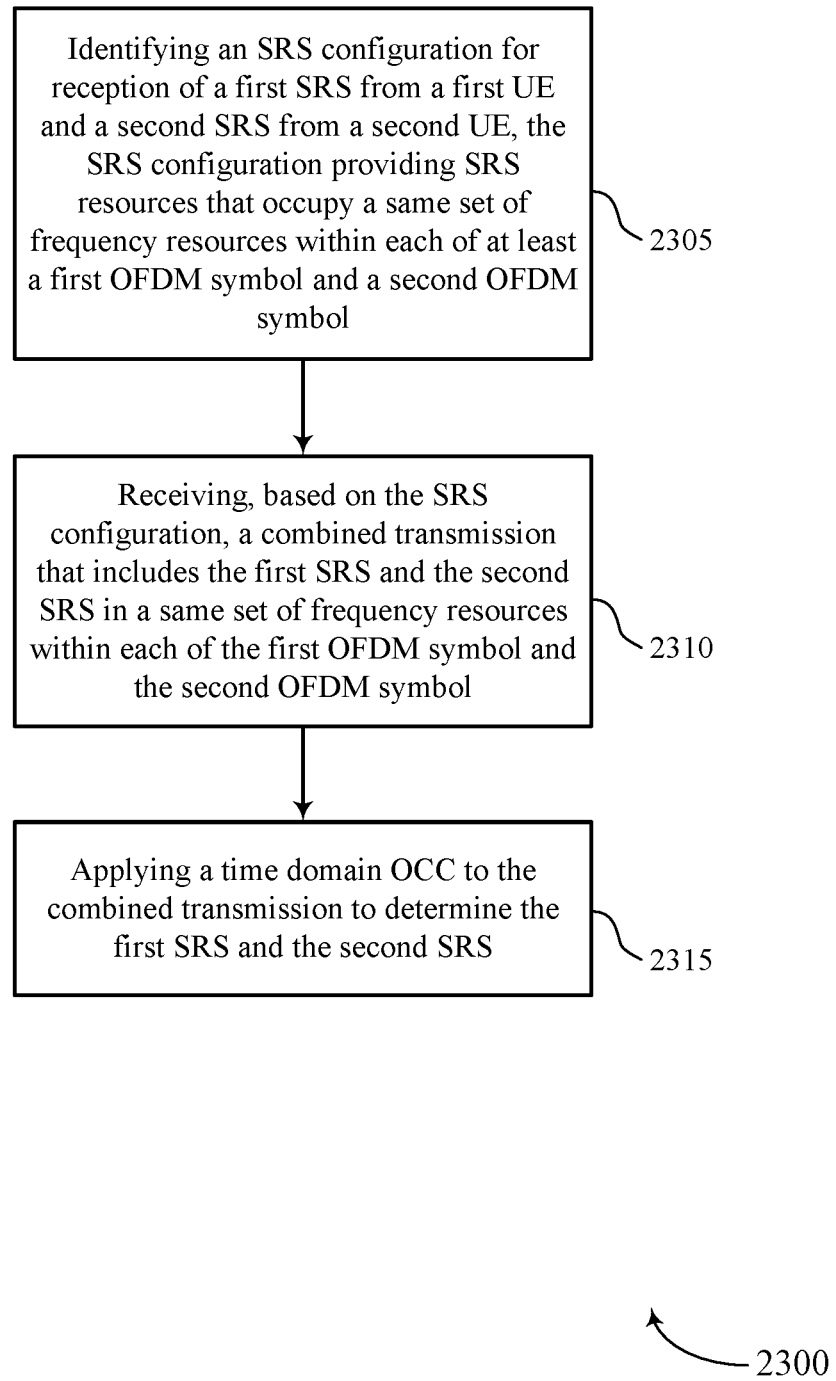

FIG. 23 shows a flowchart illustrating a method 2300 that supports SRS waveform design for wireless communications in accordance with various aspects of the present disclosure. The operations of method 2300 may be implemented by a base station 105 or its components as described herein. For example, the operations of method 2300 may be performed by a communications manager as described with reference to FIGS. 15 through 18. In some examples, a base station may execute a set of instructions to control the functional elements of the base station to perform the functions described herein. Additionally or alternatively, a base station may perform aspects of the functions described herein using special-purpose hardware.

At 2305, the base station may identify an SRS configuration for reception of a first SRS from a first UE and a second SRS from a second UE, the SRS configuration providing SRS resources that occupy a same set of frequency resources within each of at least a first OFDM symbol and a second OFDM symbol. The operations of 2305 may be performed according to the methods described herein. In some examples, aspects of the operations of 2305 may be performed by an SRS configuration manager as described with reference to FIGS. 15 through 18.

At 2310, the base station may receive, based on the SRS configuration, a combined transmission that includes the first SRS and the second SRS in a same set of frequency resources within each of the first OFDM symbol and the second OFDM symbol. The operations of 2310 may be performed according to the methods described herein. In some examples, aspects of the operations of 2310 may be performed by an OCC component as described with reference to FIGS. 15 through 18.

At 2315, the base station may apply a time domain OCC to the combined transmission to determine the first SRS and the second SRS. The operations of 2315 may be performed according to the methods described herein. In some examples, aspects of the operations of 2315 may be performed by an OCC component as described with reference to FIGS. 15 through 18.

It should be noted that the methods described herein describe possible implementations, and that the operations and the steps may be rearranged or otherwise modified and that other implementations are possible. Further, aspects from two or more of the methods may be combined.

The following examples are given by way of illustration. Aspects of the following examples may be combined with aspects or embodiments shown or discussed in relation to the figures or elsewhere herein.

Example 1 is a method for wireless communications at a UE that may include identifying a SRS configuration for transmission of a SRS to a base station, the SRS configuration providing SRS resources within at least a first OFDM symbol, a second OFDM symbol, a third OFDM symbol, and a fourth OFDM symbol, mapping, based at least in part on the SRS configuration, a first portion of the SRS to occupy a first subset of frequency resources of the first OFDM symbol, a second portion of the SRS to occupy a second subset of frequency resources of the second OFDM symbol, a third portion of the SRS to occupy a third subset of frequency resources of the third OFDM symbol, and a fourth portion of the SRS to occupy a fourth subset of frequency resources of the fourth OFDM symbol, wherein the first subset of frequency resources, the second subset of frequency resources, the third subset of frequency resources, and the fourth subset of frequency resources are non-uniformly staggered in frequency relative to each other, and transmitting the SRS to the base station based at least in part on the mapping.

In example 2, the first subset of frequency resources of example 1 is offset by zero REs relative to a reference point, the second subset of frequency resources of example 1 is offset by four REs relative to the reference point, the third subset of frequency resources of example 1 is offset by two REs relative to the reference point, and the fourth subset of frequency resources of example 1 is offset by six REs relative to the reference point.

In example 3, the first subset of frequency resources, the second subset of frequency resources, the third subset of frequency resources, and the fourth subset of frequency resources of any of examples 1 or 2 are staggered from a single antenna port.

In example 4, the first subset of frequency resources, the second subset of frequency resources, the third subset of frequency resources, and the fourth subset of frequency resources of any of examples 1-3 have an overlapping bandwidth span.

In example 5, the first subset of frequency resources, the second subset of frequency resources, the third subset of frequency resources, and the fourth subset of frequency resources of example 4 lie in the same set of physical RBs.

In example 6, the method of any of examples 1-5 may include identifying the first subset of frequency resources as a first set of uniformly spaced REs within the first OFDM symbol, the second subset of frequency resources as a second set of uniformly spaced REs within the second OFDM symbol, the third subset of frequency resources as a third set of uniformly spaced REs within the third OFDM symbol, and the fourth subset of frequency resources as a fourth set of uniformly spaced REs within the fourth OFDM symbol.

In example 7, the mapping of example 6 may include identifying a first starting RE within the first OFDM symbol based at least in part on a first RE offset for the first OFDM symbol, identifying a second starting RE within the second OFDM symbol based at least in part on a second RE offset for the second OFDM symbol, identifying a third starting RE within the third OFDM symbol based at least in part on a third RE offset for the third OFDM symbol, and identifying a fourth starting RE within the fourth OFDM symbol based at least in part on a fourth RE offset for the fourth OFDM symbol.

In example 8, the first RE offset, the second RE offset, the third RE offset, and the fourth RE offset of example 7 may provide a uniform spacing of a combined set of REs that combines the first set of uniformly spaced REs, the second set of uniformly spaced REs, the third set of uniformly spaced REs, and the fourth set of uniformly spaced REs.

In example 9, the method of any of examples 1-8 may include determining a SRS sequence for each of the first portion of the SRS, the second portion of the SRS, the third portion of the SRS, and the fourth portion of the SRS based at least in part on an amount of frequency resources in each of the first subset of frequency resources, the second subset of frequency resources, the third subset of frequency resources, and the fourth subset of frequency resources.

In example 10, the method of example 9, wherein a same SRS sequence may be determined for each of the first portion of the SRS, the second portion of the SRS, the third portion of the SRS, and the fourth portion of the SRS.

In example 11, the first OFDM symbol, the second OFDM symbol, the third OFDM symbol, and the fourth OFDM symbol of any of examples 1-10 may each include a plurality of RBs, and wherein each of the first portion of the SRS, the second portion of the SRS, the third portion of the SRS, and the fourth portion of the SRS occupy frequency resources according to a pattern that repeats every two or more RBs within each OFDM symbol.

In example 12, the method of any of examples 1-11 may include transmitting one or more repetitions of at least a portion of the SRS to the base station.

In example 13, the one or more repetitions of example 12 may be transmitted in groups of SRS symbols, and wherein each group of SRS symbols may be mapped according to the SRS configuration to provide associated portions of the SRS that are staggered in frequency.

In example 14, the one or more repetitions of at least the portion of the SRS of any of examples 12 or 13 may be transmitted to the base station according to a frequency hopping pattern.

In example 15, the frequency hopping of example 14 is performed in groups of SRS symbols, wherein each group of SRS symbols may be formatted according to the SRS configuration to provide associated portions of the SRS that are staggered in frequency.

In example 16, the SRS configuration of any of examples 12-15 may indicate a number of OFDM symbols across which the SRS is to be sent using different staggering offsets and an index that indicates a number of staggering offsets to be used on the number of OFDM symbols.

Example 17 is a method for wireless communication at a base station that may include configuring at least a first UE with a first SRS configuration for transmission of a first SRS, wherein the first SRS configuration provides resources for the first SRS within at least a first OFDM symbol, a second OFDM symbol, a third OFDM symbol, and a fourth OFDM symbol, and receiving, based at least in part on the first SRS configuration, a first portion of the first SRS in a first subset of frequency resources within the first OFDM symbol, a second portion of the first SRS in a second subset of frequency resources within the second OFDM symbol, a third portion of the first SRS in a third subset of frequency resources within the third OFDM symbol, and a fourth portion of the first SRS in a fourth subset of frequency resources within the fourth OFDM symbol, wherein the first subset of frequency resources, the second subset of frequency resources, the third subset of frequency resources, and the fourth subset of frequency resources are non-uniformly staggered in frequency relative to each other.

In example 18, the first subset of frequency resources of example 17 is offset by zero REs relative to a reference point, the second subset of frequency resources of example 17 is offset by four REs relative to the reference point, the third subset of frequency resources of example 17 is offset by two REs relative to the reference point, and the fourth subset of frequency resources of example 17 is offset by six REs relative to the reference point.

In example 19, the method of any of examples 17 or 18 may include configuring at least a second UE with a second SRS configuration for transmission of a second SRS, wherein the second SRS configuration provides resources for the second SRS within at least the first OFDM symbol, the second OFDM symbol, the third OFDM symbol, and the fourth OFDM symbol, and receiving, based at least in part on the second SRS configuration, a first portion of the second SRS in a fifth subset of frequency resources within the first OFDM symbol, a second portion of the second SRS in a sixth subset of frequency resources within the second OFDM symbol, a third portion of the second SRS in a seventh subset of frequency resources within the third OFDM symbol, and a fourth portion of the second SRS in an eighth subset of frequency resources within the fourth OFDM symbol, wherein the fourth subset of frequency resources is staggered in frequency relative to the eighth subset of frequency resources.

In example 20, the method of example 19, wherein the base station may configure each of a plurality of UEs for SRS transmissions in the first OFDM symbol, the second OFDM symbol, the third OFDM symbol, and the fourth OFDM symbol based at least in part on a number of UEs in the plurality of UEs exceeding a threshold value.

In example 21, configuring the first UE of any of examples 17-20 may include configuring the first subset of frequency resources as a first set of uniformly spaced REs within the first OFDM symbol, the second subset of frequency resources as a second set of uniformly spaced REs within the second OFDM symbol, the third subset of frequency resources as a third set of uniformly spaced REs within the third OFDM symbol, and the fourth subset of frequency resources as a fourth set of uniformly spaced REs within the fourth OFDM symbol.

In example 22, configuring the first UE of example 21 may include indicating a first RE offset for the first OFDM symbol that provides RE locations for the first set of uniformly spaced REs, indicating a second RE offset for the second OFDM symbol that provides RE locations for the second set of uniformly spaced REs, indicating a third RE offset for the third OFDM symbol that provides RE locations for the third set of uniformly spaced REs, and indicating a fourth RE offset for the fourth OFDM symbol that provides RE locations for the fourth set of uniformly spaced REs.

In example 23, the method of any of examples 17 and 21-22 may include receiving the first set of uniformly spaced REs within the first OFDM symbol, the second set of uniformly spaced REs within the second OFDM symbol, the third set of uniformly spaced REs within the third OFDM symbol, and the fourth set of uniformly spaced REs within the fourth OFDM symbol, where the first RE offset, the second RE offset, the third RE offset, and the fourth RE offset of example 22 may provide a uniform spacing of a combined set of REs that combines the first set of uniformly spaced REs, the second set of uniformly spaced REs, the third set of uniformly spaced REs, and the fourth set of uniformly spaced REs.

In example 24, configuring the first UE of any of examples 17-23 may include configuring a SRS sequence for each of the first portion of the SRS, the second portion of the SRS, the third portion of the SRS, and the fourth portion of the SRS based at least in part on an amount of frequency resources in each of the first subset of frequency resources, the second subset of frequency resources, the third subset of frequency resources, and the fourth subset of frequency resources.

In example 25, the method of example 24, wherein a same SRS sequence may be configured for each of the first portion of the SRS, the second portion of the SRS, the third portion of the SRS, and the fourth portion of the SRS.

In example 26, the first OFDM symbol, the second OFDM symbol, the third OFDM symbol, and the fourth OFDM symbol of any of examples 17-25 may each include a plurality of RBs, and wherein each of the first portion of the SRS, the second portion of the SRS, the third portion of the SRS, and the fourth portion of the SRS occupy uniform frequency resources that span two or more RBs within each OFDM symbol.

In example 27, the method of any of examples 17-26 may include receiving one or more repetitions of at least a portion of the first SRS from the first UE.

In example 28, the one or more repetitions of example 27 may be received in groups of SRS symbols, and wherein each group of SRS symbols is mapped according to the first SRS configuration to provide associated portions of the first SRS that are staggered in frequency.

Example 29 is an apparatus for wireless communication at a UE that may include a processor, memory coupled with the processor, and instructions stored in the memory and executable by the processor to cause the apparatus to perform a method of any of examples 1-16.

Example 30 is an apparatus for wireless communications at a UE that may include at least one means for performing a method of any of examples 1-16.

Example 31 is a non-transitory computer-readable medium storing code for wireless communications at a UE, the code including instructions executable by a processor to perform a method of any of examples 1-16.

Example 32 is an apparatus for wireless communication at a UE that may include a processor, memory coupled with the processor, and instructions stored in the memory and executable by the processor to cause the apparatus to perform a method of any of examples 17-28.

Example 33 is an apparatus for wireless communications at a UE that may include at least one means for performing a method of any of examples 17-28.

Example 34 is a non-transitory computer-readable medium storing code for wireless communications at a UE, the code including instructions executable by a processor to perform a method of any of examples 17-28.

Aspects of these examples may be combined with aspects or embodiments disclosed in other implementations.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the various techniques of the present disclosure. These techniques, however, may be practiced without these specific details. In some instances, well-known structures and devices are shown in block diagram form in order to avoid obscuring the concepts of the techniques.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a sounding reference signal configuration for transmission of a sounding reference signal to a base station, the sounding reference signal configuration providing sounding reference signal resources within at least a first orthogonal frequency division multiplexing symbol, a second orthogonal frequency division multiplexing symbol, a third orthogonal frequency division multiplexing symbol, and a fourth orthogonal frequency division multiplexing symbol;
    mapping, based at least in part on the sounding reference signal configuration, a first portion of the sounding reference signal to occupy a first subset of frequency resources of the first orthogonal frequency division multiplexing symbol, a second portion of the sounding reference signal to occupy a second subset of frequency resources of the second orthogonal frequency division multiplexing symbol, a third portion of the sounding reference signal to occupy a third subset of frequency resources of the third orthogonal frequency division multiplexing symbol, and a fourth portion of the sounding reference signal to occupy a fourth subset of frequency resources of the fourth orthogonal frequency division multiplexing symbol, wherein the first subset of frequency resources, the second subset of frequency resources, the third subset of frequency resources, and the fourth subset of frequency resources are non-uniformly staggered in frequency relative to each other, wherein the first subset of frequency resources is offset by zero resource elements relative to a reference point, the second subset of frequency resources is offset by four resource elements relative to the reference point, the third subset of frequency resources is offset by two resource elements relative to the reference point, and the fourth subset of frequency resources is offset by six resource elements relative to the reference point; and
    transmitting the sounding reference signal to the base station based at least in part on the mapping.

2. The method of claim 1, wherein the first subset of frequency resources, the second subset of frequency resources, the third subset of frequency resources, and the fourth subset of frequency resources are staggered from a single antenna port.

3. The method of claim 1, wherein the first subset of frequency resources, the second subset of frequency resources, the third subset of frequency resources, and the fourth subset of frequency resources have an overlapping bandwidth span.

4. The method of claim 3, wherein the first subset of frequency resources, the second subset of frequency resources, the third subset of frequency resources, and the fourth subset of frequency resources are in a same set of physical resource blocks.

5. The method of claim 1, wherein the mapping further comprises:
    identifying the first subset of frequency resources as a first set of uniformly spaced resource elements within the first orthogonal frequency division multiplexing symbol, the second subset of frequency resources as a second set of uniformly spaced resource elements within the second orthogonal frequency division multiplexing symbol, the third subset of frequency resources as a third set of uniformly spaced resource elements within the third orthogonal frequency division multiplexing symbol, and the fourth subset of frequency resources as a fourth set of uniformly spaced resource elements within the fourth orthogonal frequency division multiplexing symbol.

6. The method of claim 5, wherein the mapping further comprises:
    identifying a first starting resource element within the first orthogonal frequency division multiplexing symbol based at least in part on a first resource element offset for the first orthogonal frequency division multiplexing symbol;
    identifying a second starting resource element within the second orthogonal frequency division multiplexing symbol based at least in part on a second resource element offset for the second orthogonal frequency division multiplexing symbol;

identifying a third starting resource element within the third orthogonal frequency division multiplexing symbol based at least in part on a third resource element offset for the third orthogonal frequency division multiplexing symbol; and identifying a fourth starting resource element within the fourth orthogonal frequency division multiplexing symbol based at least in part on a fourth resource element offset for the fourth orthogonal frequency division multiplexing symbol.

7. The method of claim 6, wherein the first resource element offset, the second resource element offset, the third resource element offset, and the fourth resource element offset provide a uniform spacing of a combined set of resource elements that combines the first set of uniformly spaced resource elements, the second set of uniformly spaced resource elements, the third set of uniformly spaced resource elements, and the fourth set of uniformly spaced resource elements.

8. The method of claim 1, further comprising:
determining a sounding reference signal sequence for each of the first portion of the sounding reference signal, the second portion of the sounding reference signal, the third portion of the sounding reference signal, and the fourth portion of the sounding reference signal based at least in part on an amount of frequency resources in each of the first subset of frequency resources, the second subset of frequency resources, the third subset of frequency resources, and the fourth subset of frequency resources.

9. The method of claim 8, wherein a same sounding reference signal sequence is determined for each of the first portion of the sounding reference signal, the second portion of the sounding reference signal, the third portion of the sounding reference signal, and the fourth portion of the sounding reference signal.

10. The method of claim 1, wherein the first orthogonal frequency division multiplexing symbol, the second orthogonal frequency division multiplexing symbol, the third orthogonal frequency division multiplexing symbol, and the fourth orthogonal frequency division multiplexing symbol each include a plurality of resource blocks, and wherein each of the first portion of the sounding reference signal, the second portion of the sounding reference signal, the third portion of the sounding reference signal, and the fourth portion of the sounding reference signal occupy frequency resources according to a pattern that repeats every two or more resource blocks within each orthogonal frequency division multiplexing symbol.

11. The method of claim 1, further comprising:
transmitting one or more repetitions of at least a portion of the sounding reference signal to the base station.

12. The method of claim 11, wherein the one or more repetitions are transmitted in groups of sounding reference signal symbols, and wherein each group of sounding reference signal symbols is mapped according to the sounding reference signal configuration to provide associated portions of the sounding reference signal that are staggered in frequency.

13. The method of claim 11, wherein the one or more repetitions of at least the portion of the sounding reference signal are transmitted to the base station according to a frequency hopping pattern.

14. The method of claim 13, wherein the frequency hopping is performed in groups of sounding reference signal symbols, and wherein each group of sounding reference signal symbols is formatted according to the sounding reference signal configuration to provide associated portions of the sounding reference signal that are staggered in frequency.

15. The method of claim 11, wherein the sounding reference signal configuration indicates a number of orthogonal frequency division multiplexing symbols across which the sounding reference signal is to be sent using different staggering offsets and an index that indicates a number of staggering offsets to be used on the number of orthogonal frequency division multiplexing symbols.

16. A method for wireless communication at a base station, comprising:
configuring at least a first user equipment (UE) with a first sounding reference signal configuration for transmission of a first sounding reference signal, wherein the first sounding reference signal configuration provides resources for the first sounding reference signal within at least a first orthogonal frequency division multiplexing symbol, a second orthogonal frequency division multiplexing symbol, a third orthogonal frequency division multiplexing symbol, and a fourth orthogonal frequency division multiplexing symbol; and receiving, based at least in part on the first sounding reference signal configuration, a first portion of the first sounding reference signal in a first subset of frequency resources within the first orthogonal frequency division multiplexing symbol, a second portion of the first sounding reference signal in a second subset of frequency resources within the second orthogonal frequency division multiplexing symbol, a third portion of the first sounding reference signal in a third subset of frequency resources within the third orthogonal frequency division multiplexing symbol, and a fourth portion of the first sounding reference signal in a fourth subset of frequency resources within the fourth orthogonal frequency division multiplexing symbol, wherein the first subset of frequency resources, the second subset of frequency resources, the third subset of frequency resources, and the fourth subset of frequency resources are non-uniformly staggered in frequency relative to each other, wherein the first subset of frequency resources is offset by zero resource elements relative to a reference point, the second subset of frequency resources is offset by four resource elements relative to the reference point, the third subset of frequency resources is offset by two resource elements relative to the reference point, and the fourth subset of frequency resources is offset by six resource elements relative to the reference point.

17. The method of claim 16, further comprising:
configuring at least a second UE with a second sounding reference signal configuration for transmission of a second sounding reference signal, wherein the second sounding reference signal configuration provides resources for the second sounding reference signal within at least the first orthogonal frequency division multiplexing symbol, the second orthogonal frequency division multiplexing symbol, the third orthogonal frequency division multiplexing symbol, and the fourth orthogonal frequency division multiplexing symbol; and receiving, based at least in part on the second sounding reference signal configuration, a first portion of the second sounding reference signal in a fifth subset of frequency resources within the first orthogonal frequency division multiplexing symbol, a second portion of the second sounding reference signal in a sixth subset of frequency resources within the second orthogonal frequency division multiplexing symbol, a third portion of the second sounding reference signal in a seventh subset of frequency resources within the third orthogonal frequency division multiplexing symbol, and a fourth portion of the second sounding reference signal in an eighth subset of frequency resources within the fourth orthogonal frequency division multiplexing symbol, wherein the fourth subset of frequency resources is staggered in frequency relative to the eighth subset of frequency resources.

18. The method of claim 17, wherein the base station configures each of a plurality of UEs for sounding reference signal transmissions in the first orthogonal frequency division multiplexing symbol, the second orthogonal frequency division multiplexing symbol, the third orthogonal frequency division multiplexing symbol, and the fourth orthogonal frequency division multiplexing symbol based at least in part on a number of UEs in the plurality of UEs exceeding a threshold value.

19. The method of claim 16, wherein the configuring at least the first UE further comprises:
    configuring the first subset of frequency resources as a first set of uniformly spaced resource elements within the first orthogonal frequency division multiplexing symbol, the second subset of frequency resources as a second set of uniformly spaced resource elements within the second orthogonal frequency division multiplexing symbol, the third subset of frequency resources as a third set of uniformly spaced resource elements within the third orthogonal frequency division multiplexing symbol, and the fourth subset of frequency resources as a fourth set of uniformly spaced resource elements within the fourth orthogonal frequency division multiplexing symbol.

20. The method of claim 19, wherein the configuring at least the first UE further comprises:
    indicating a first resource element offset for the first orthogonal frequency division multiplexing symbol that provides resource element locations for the first set of uniformly spaced resource elements;
    indicating a second resource element offset for the second orthogonal frequency division multiplexing symbol that provides resource element locations for the second set of uniformly spaced resource elements;
    indicating a third resource element offset for the third orthogonal frequency division multiplexing symbol that provides resource element locations for the third set of uniformly spaced resource elements; and
    indicating a fourth resource element offset for the fourth orthogonal frequency division multiplexing symbol that provides resource element locations for the fourth set of uniformly spaced resource elements.

21. The method of claim 20, further comprising:
    receiving the first set of uniformly spaced resource elements within the first orthogonal frequency division multiplexing symbol, the second set of uniformly spaced resource elements within the second orthogonal frequency division multiplexing symbol, the third set of uniformly spaced resource elements within the third orthogonal frequency division multiplexing symbol, and the fourth set of uniformly spaced resource elements within the fourth orthogonal frequency division multiplexing symbol, wherein the first resource element offset, the second resource element offset, the third resource element offset, and the fourth resource element offset provide a uniform spacing of a combined set of resource elements that combines the first set of uniformly spaced resource elements, the second set of uniformly spaced resource elements, the third set of uniformly spaced resource elements, and the fourth set of uniformly spaced resource elements.

22. The method of claim 16, wherein the configuring at least the first UE further comprises:
    configuring a sounding reference signal sequence for each of the first portion of the first sounding reference signal, the second portion of the first sounding reference signal, the third portion of the first sounding reference signal, and the fourth portion of the first sounding reference signal based at least in part on an amount of frequency resources in each of the first subset of frequency resources, the second subset of frequency resources, the third subset of frequency resources, and the fourth subset of frequency resources.

23. The method of claim 22, wherein a same sounding reference signal sequence is configured for each of the first portion of the first sounding reference signal, the second portion of the first sounding reference signal, the third portion of the first sounding reference signal, and the fourth portion of the first sounding reference signal.

24. The method of claim 16, wherein the first orthogonal frequency division multiplexing symbol, the second orthogonal frequency division multiplexing symbol, the third orthogonal frequency division multiplexing symbol, and the fourth orthogonal frequency division multiplexing symbol each include a plurality of resource blocks, and wherein each of the first portion of the first sounding reference signal, the second portion of the first sounding reference signal, the third portion of the first sounding reference signal, and the fourth portion of the first sounding reference signal occupy uniform frequency resources that span two or more resource blocks within each orthogonal frequency division multiplexing symbol.

25. The method of claim 16, further comprising:
    receiving one or more repetitions of at least a portion of the first sounding reference signal from the first UE.

26. The method of claim 25, wherein the one or more repetitions are received in groups of sounding reference signal symbols, and wherein each group of sounding reference signal symbols is mapped according to the first sounding reference signal configuration to provide associated portions of the first sounding reference signal that are staggered in frequency.

27. An apparatus for wireless communication at a user equipment (UE), comprising:
    a processor,
    memory in electronic communication with the processor; and
    instructions stored in the memory and executable by the processor to cause the apparatus to:
        identify a sounding reference signal configuration for transmission of a sounding reference signal to a base station, the sounding reference signal configuration providing sounding reference signal resources within at least a first orthogonal frequency division multiplexing symbol, a second orthogonal frequency division multiplexing symbol, a third orthogonal frequency division multiplexing symbol, and a fourth orthogonal frequency division multiplexing symbol;
        map, based at least in part on the sounding reference signal configuration, a first portion of the sounding reference signal to occupy a first subset of frequency resources of the first orthogonal frequency division multiplexing symbol, a second portion of the sounding reference signal to occupy a second subset of frequency resources of the second orthogonal frequency division multiplexing symbol, a third portion of the sounding reference signal to occupy a third subset of frequency resources of the third orthogonal frequency division multiplexing symbol, and a fourth portion of the sounding reference signal to occupy a fourth subset of frequency resources of the fourth orthogonal frequency division multiplexing symbol, wherein the first subset of frequency resources, the second subset of frequency resources, the third subset of frequency resources, and the fourth subset of frequency resources are non-uniformly staggered in frequency relative to each other, wherein the first subset of frequency resources is offset by zero resource elements relative to a reference point, the second subset of frequency resources is offset by four resource elements relative to the reference point, the third subset of frequency resources is offset by two resource elements relative to the reference point, and the fourth subset of frequency resources is offset by six resource elements relative to the reference point; and transmit the sounding reference signal to the base station based at least in part on the mapping.

28. An apparatus for wireless communication at a base station, comprising:

a processor, memory in electronic communication with the processor; and instructions stored in the memory and executable by the processor to cause the apparatus to:

configure at least a first user equipment (UE) with a first sounding reference signal configuration for transmission of a first sounding reference signal, wherein the first sounding reference signal configuration provides resources for the first sounding reference signal within at least a first orthogonal frequency division multiplexing symbol, a second orthogonal frequency division multiplexing symbol, a third orthogonal frequency division multiplexing symbol, and a fourth orthogonal frequency division multiplexing symbol; and receive, based at least in part on the first sounding reference signal configuration, a first portion of the first sounding reference signal in a first subset of frequency resources within the first orthogonal frequency division multiplexing symbol, a second portion of the first sounding reference signal in a second subset of frequency resources within the second orthogonal frequency division multiplexing symbol, a third portion of the first sounding reference signal in a third subset of frequency resources within the third orthogonal frequency division multiplexing symbol, and a fourth portion of the first sounding reference signal in a fourth subset of frequency resources within the fourth orthogonal frequency division multiplexing symbol, wherein the first subset of frequency resources, the second subset of frequency resources, the third subset of frequency resources, and the fourth subset of frequency resources are non-uniformly staggered in frequency relative to each other, wherein the first subset of frequency resources is offset by zero resource elements relative to a reference point, the second subset of frequency resources is offset by four resource elements relative to the reference point, the third subset of frequency resources is offset by two resource elements relative to the reference point, and the fourth subset of frequency resources is offset by six resource elements relative to the reference point.

\* \* \* \* \*